(12) United States Patent
Lautzenheiser et al.

(10) Patent No.: US 11,813,554 B2
(45) Date of Patent: Nov. 14, 2023

(54) WATER TREATMENT SYSTEM

(71) Applicant: Access Business Group International LLC, Ada, MI (US)

(72) Inventors: Terry L Lautzenheiser, Nunica, MI (US); Bradley J. Pippel, Grandville, MI (US); Tedmund A. Robbins, Hastings, MI (US); Roger A Schenkel, Greenville, MI (US)

(73) Assignee: Access Business Group International LLC, Ada, MI (US)

( * ) Notice: Subject to any disclaimer, the term of this patent is extended or adjusted under 35 U.S.C. 154(b) by 719 days.

(21) Appl. No.: 16/857,255

(22) Filed: Apr. 24, 2020

(65) Prior Publication Data

US 2020/0339438 A1    Oct. 29, 2020

Related U.S. Application Data

(60) Provisional application No. 62/839,145, filed on Apr. 26, 2019.

(51) Int. Cl.
*B01D 29/15* (2006.01)
*B01D 29/96* (2006.01)
(Continued)

(52) U.S. Cl.
CPC ............ *B01D 29/15* (2013.01); *B01D 29/96* (2013.01); *C02F 1/003* (2013.01); *C02F 1/006* (2013.01); *C02F 1/008* (2013.01); *C02F 1/44* (2013.01); *B01D 29/114* (2013.01); *B01D 2201/291* (2013.01); *B01D 2201/56* (2013.01); *C02F 1/325* (2013.01); *C02F 2201/004* (2013.01); *C02F 2201/005* (2013.01); *C02F 2201/006* (2013.01); *C02F 2201/322* (2013.01); *C02F 2201/3222* (2013.01);
(Continued)

(58) Field of Classification Search
None
See application file for complete search history.

(56) References Cited

U.S. PATENT DOCUMENTS 5,397,462 A    3/1995  Higashijima et al.
5,529,689 A    6/1996  Korin
(Continued)

FOREIGN PATENT DOCUMENTS

CN    202314390    7/2012
CN    108014533    5/2018
(Continued)

OTHER PUBLICATIONS

Invitation to Pay Additional Fees, Partial International Search Report, and Provisional Opinion Accompanying the Partial Search Report for International Application No. PCT/US2020/-029681 dated Jul. 10, 2020.
(Continued)

*Primary Examiner* — Richard C Gurtowski
(74) *Attorney, Agent, or Firm* — Warner Norcross + Judd LLP

(57) ABSTRACT

A water treatment system having a base assembly and a treatment assembly. The treatment assembly of the system may be configured to filter particulates from water. The base assembly may include a UV reactor operable to disinfect water for consumption.

18 Claims, 59 Drawing Sheets

(51) Int. Cl.
*C02F 1/00* (2023.01)
*C02F 1/44* (2023.01)
*C02F 1/32* (2023.01)
*B01D 29/11* (2006.01)

(52) U.S. Cl.
CPC .... *C02F 2209/008* (2013.01); *C02F 2303/04* (2013.01); *C02F 2303/14* (2013.01); *C02F 2307/10* (2013.01)

(56) References Cited

U.S. PATENT DOCUMENTS

| | | | |
|---|---|---|---|
| 6,099,735 | A | 8/2000 | Kelada |
| 7,056,436 | B2 | 6/2006 | Stankowski et al. |
| 7,166,216 | B2 | 1/2007 | Woodward, Jr. et al. |
| 2008/0060983 | A1 | 3/2008 | Kleber |
| 2010/0065484 | A1 | 3/2010 | Bruggink et al. |
| 2011/0198271 | A1 | 8/2011 | Lee et al. |
| 2012/0257406 | A1 | 10/2012 | Minami |
| 2013/0068673 | A1 | 3/2013 | Maggiore et al. |
| 2013/0168327 | A1* | 7/2013 | Clark .................. G01N 21/78 210/749 |
| 2016/0340202 | A1 | 11/2016 | Lautzenheiser et al. |
| 2018/0117508 | A1 | 5/2018 | Paluszewski et al. |
| 2018/0216221 | A1* | 8/2018 | Ji .......................... C23C 14/24 |
| 2019/0054411 | A1 | 2/2019 | Miller et al. |

FOREIGN PATENT DOCUMENTS

| | | |
|---|---|---|
| EP | 0 732 679 | 9/1996 |
| EP | 3 315 183 | 5/2018 |
| GB | 2 271 106 | 4/1994 |
| WO | 2007/113927 | 10/2007 |
| WO | 2008/120902 | 10/2008 |
| WO | 2010/081075 | 7/2010 |
| WO | 2013/037438 | 3/2013 |
| WO | 2016/191233 | 12/2016 |

OTHER PUBLICATIONS

International Search Report and the Written Opinion of the International Searching Authority for International Application No. PCT/US2020/029681 dated Oct. 8, 2020.

* cited by examiner

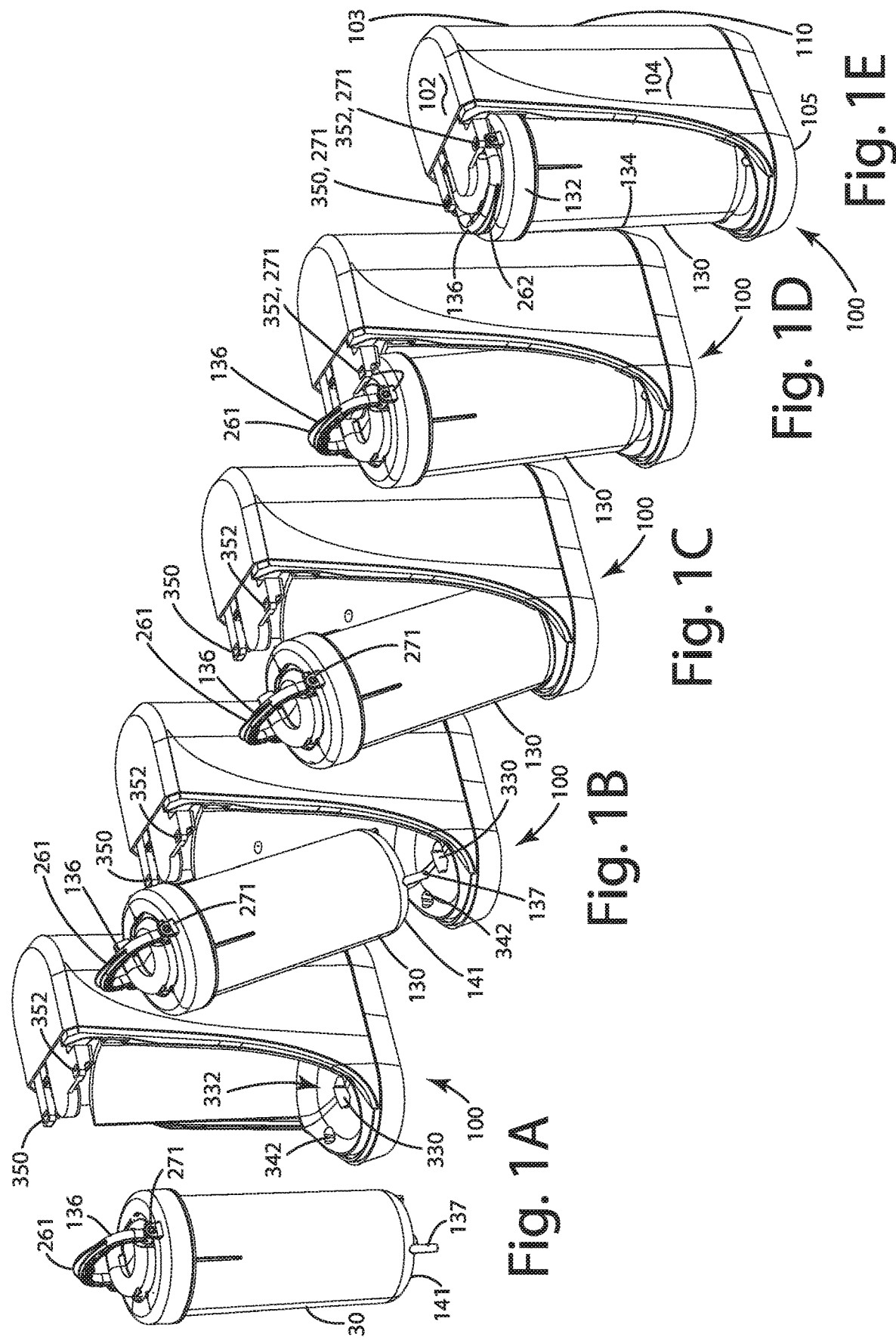

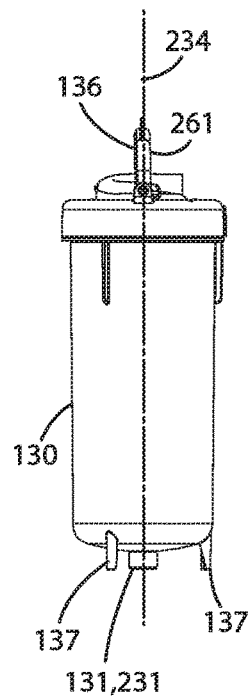 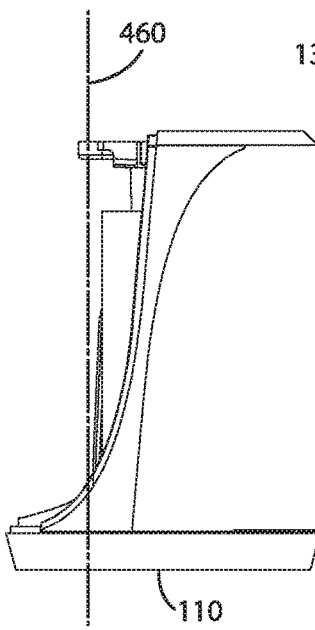 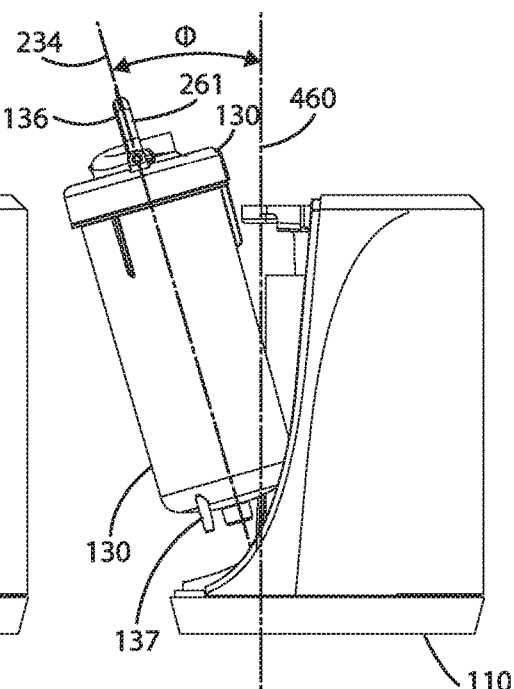
Fig. 2A   Fig. 2B   Fig. 2C
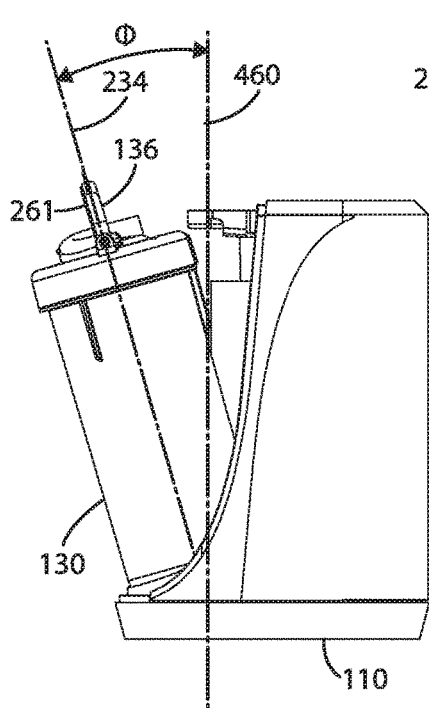 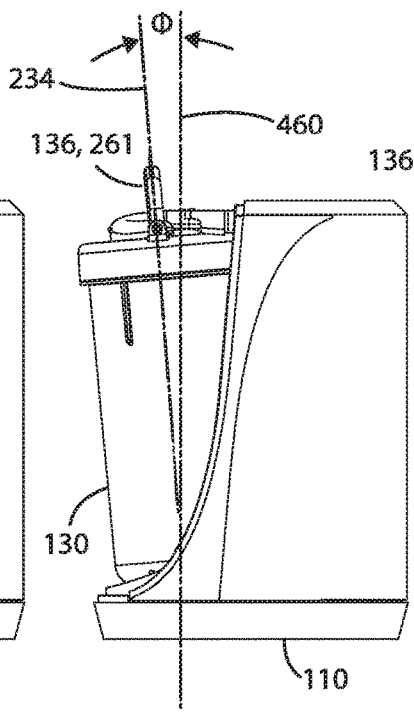 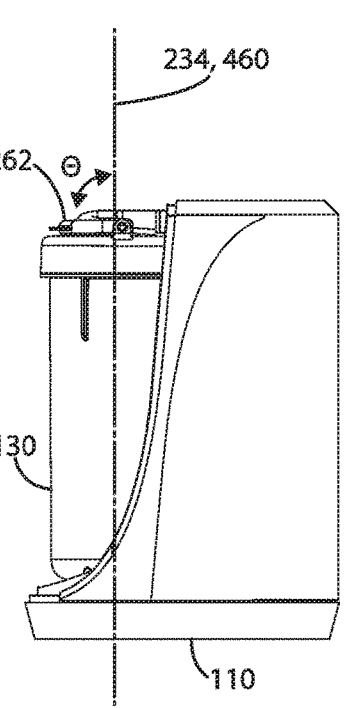
Fig. 2D   Fig. 2E   Fig. 2F

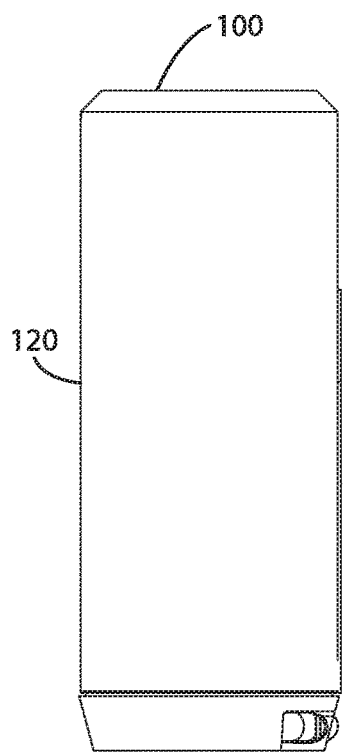
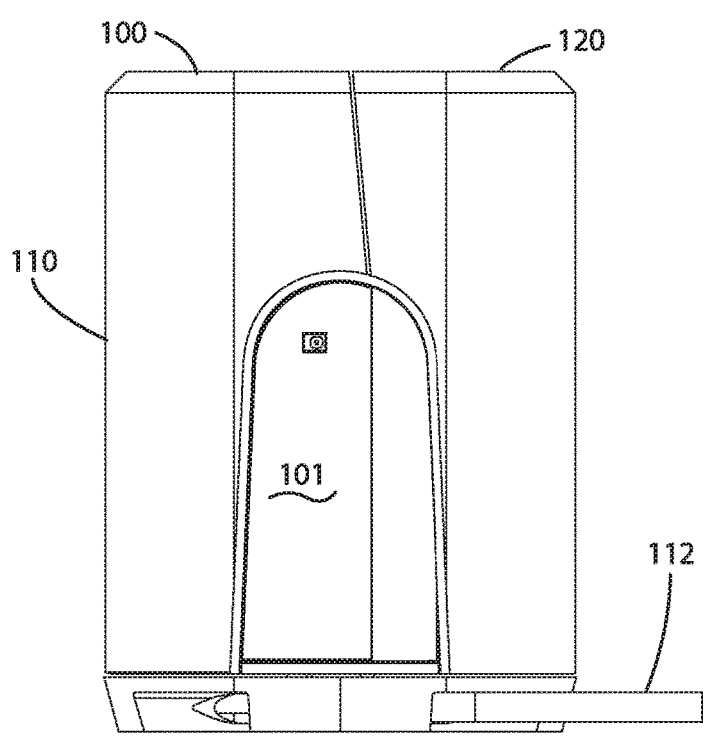
Fig. 3E  Fig. 3F
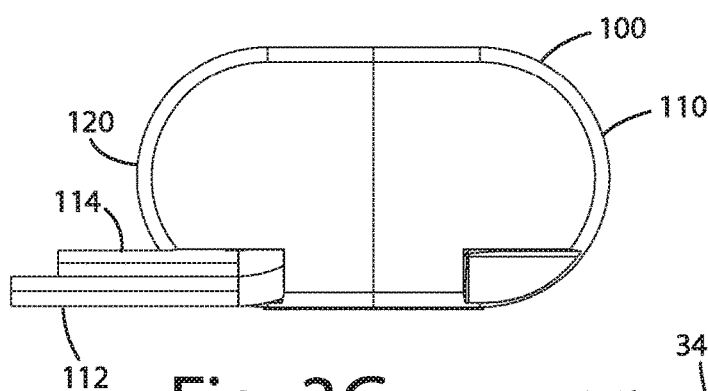
Fig. 3G
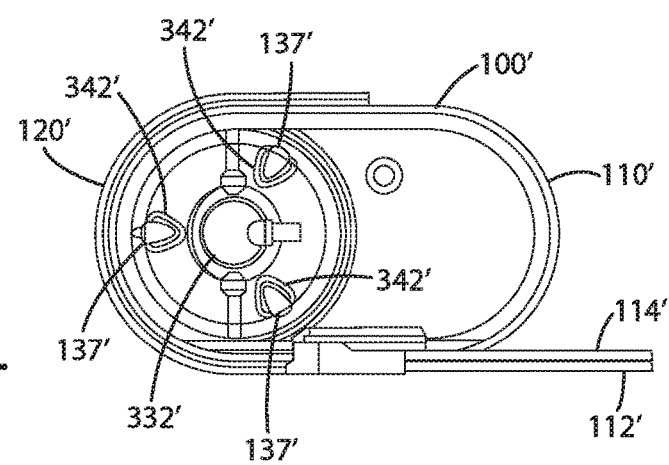
Fig. 4

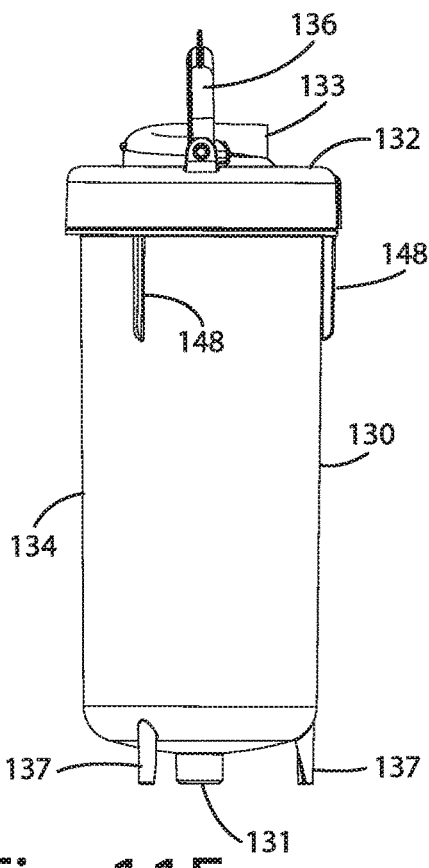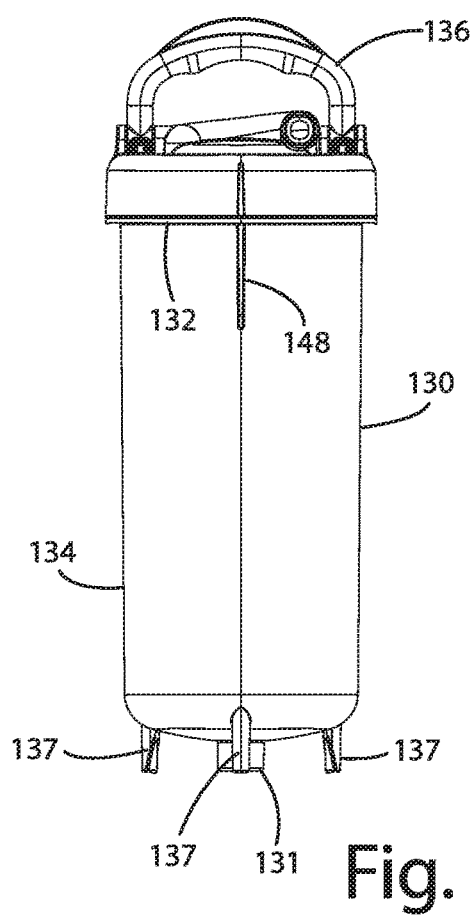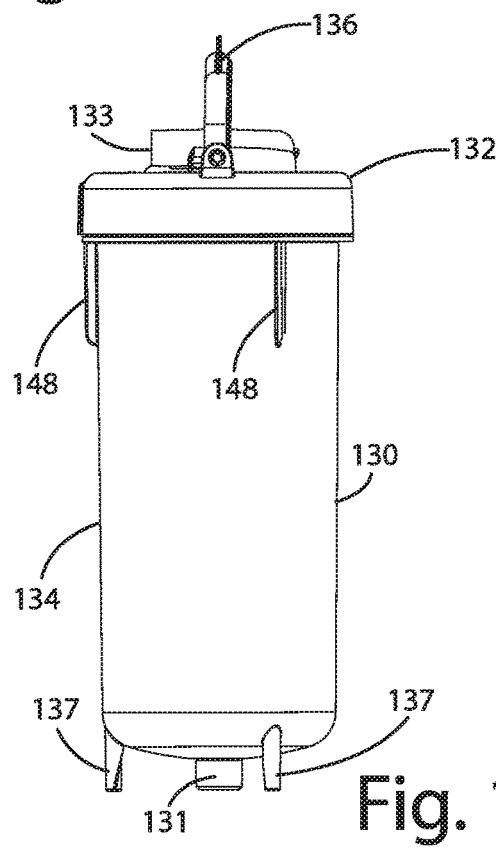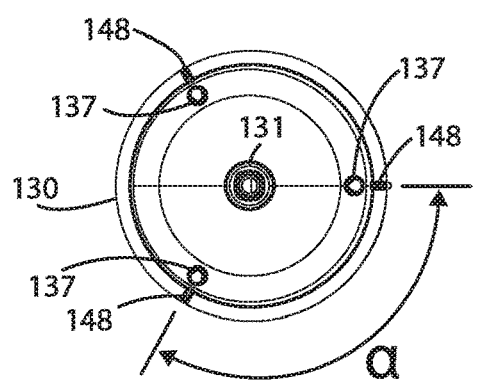
Fig. 11E
Fig. 11F
Fig. 11G
Fig. 11H

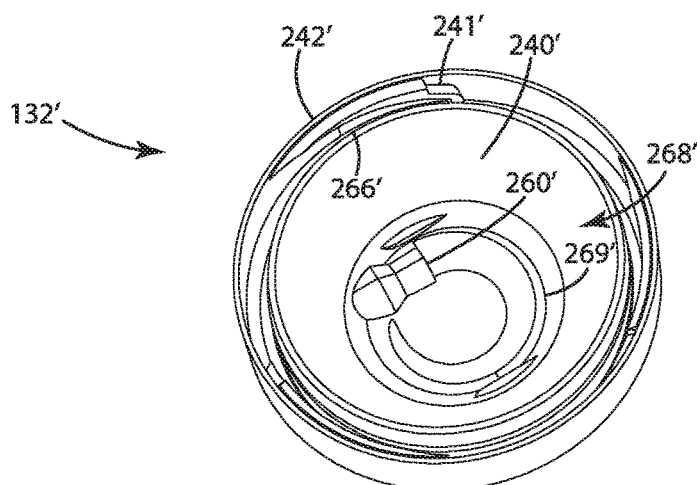
Fig. 16
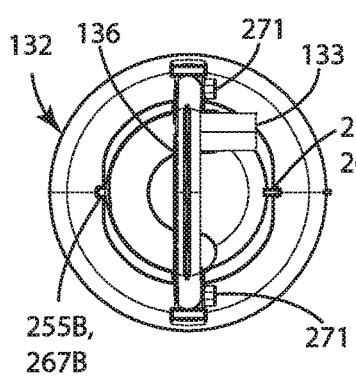
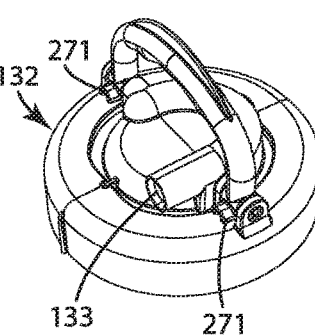
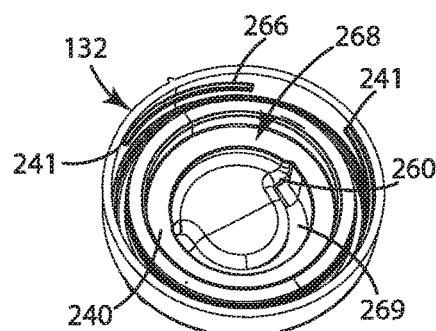
Fig. 17A  Fig. 17B  Fig. 17C
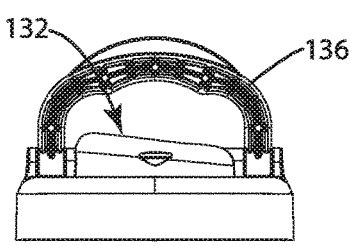
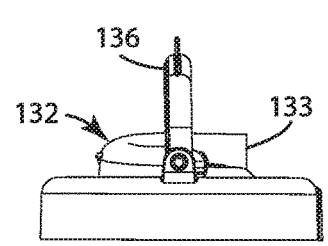
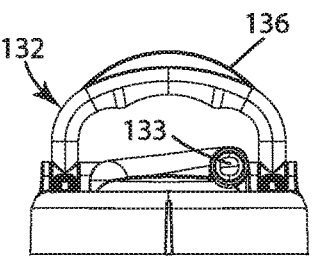
Fig. 17D  Fig. 17E  Fig. 17F
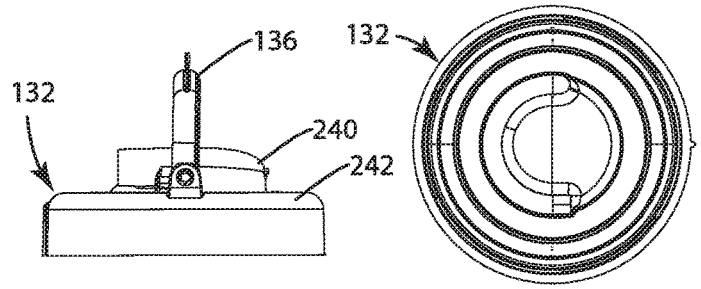
Fig. 17G  Fig. 17H

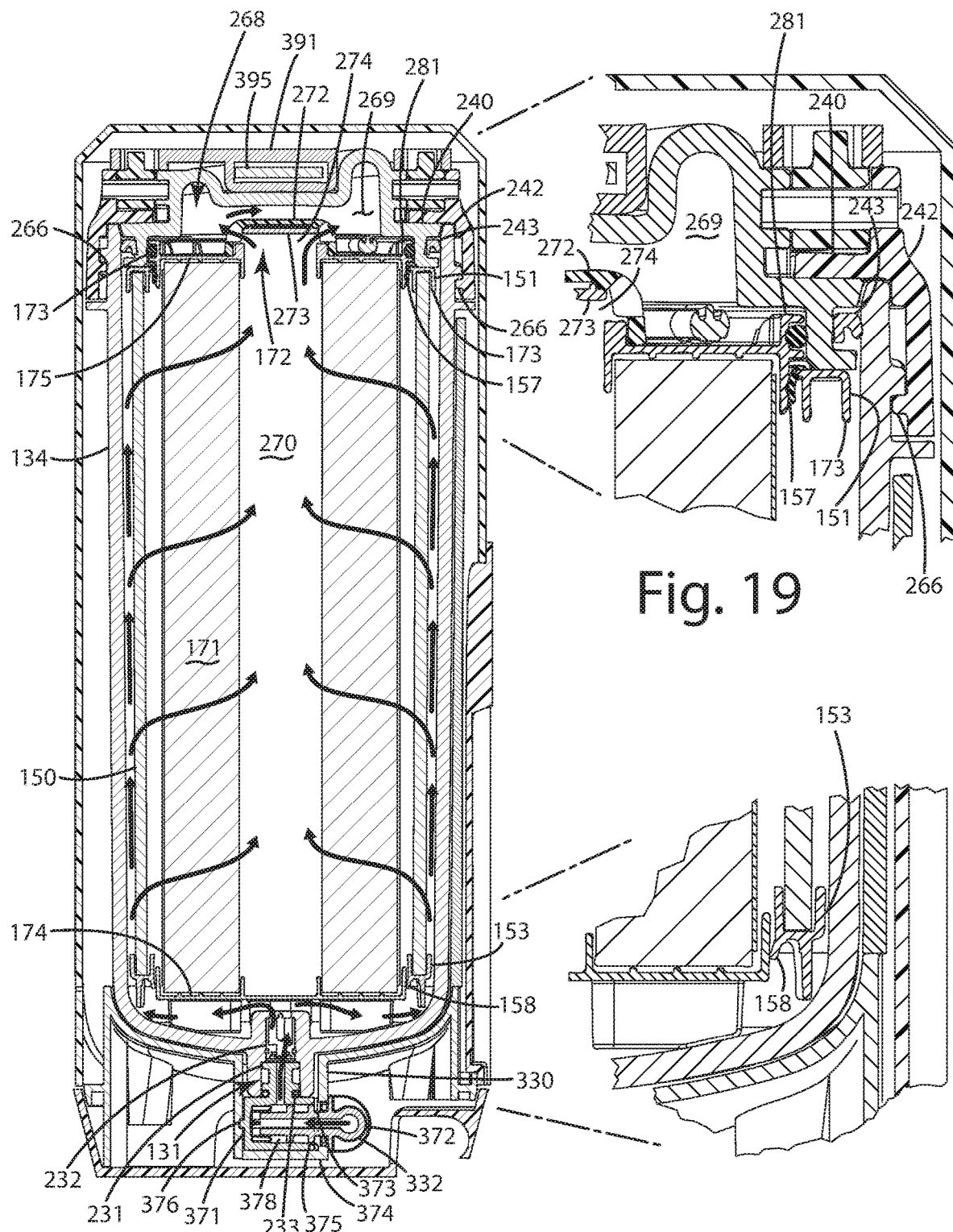

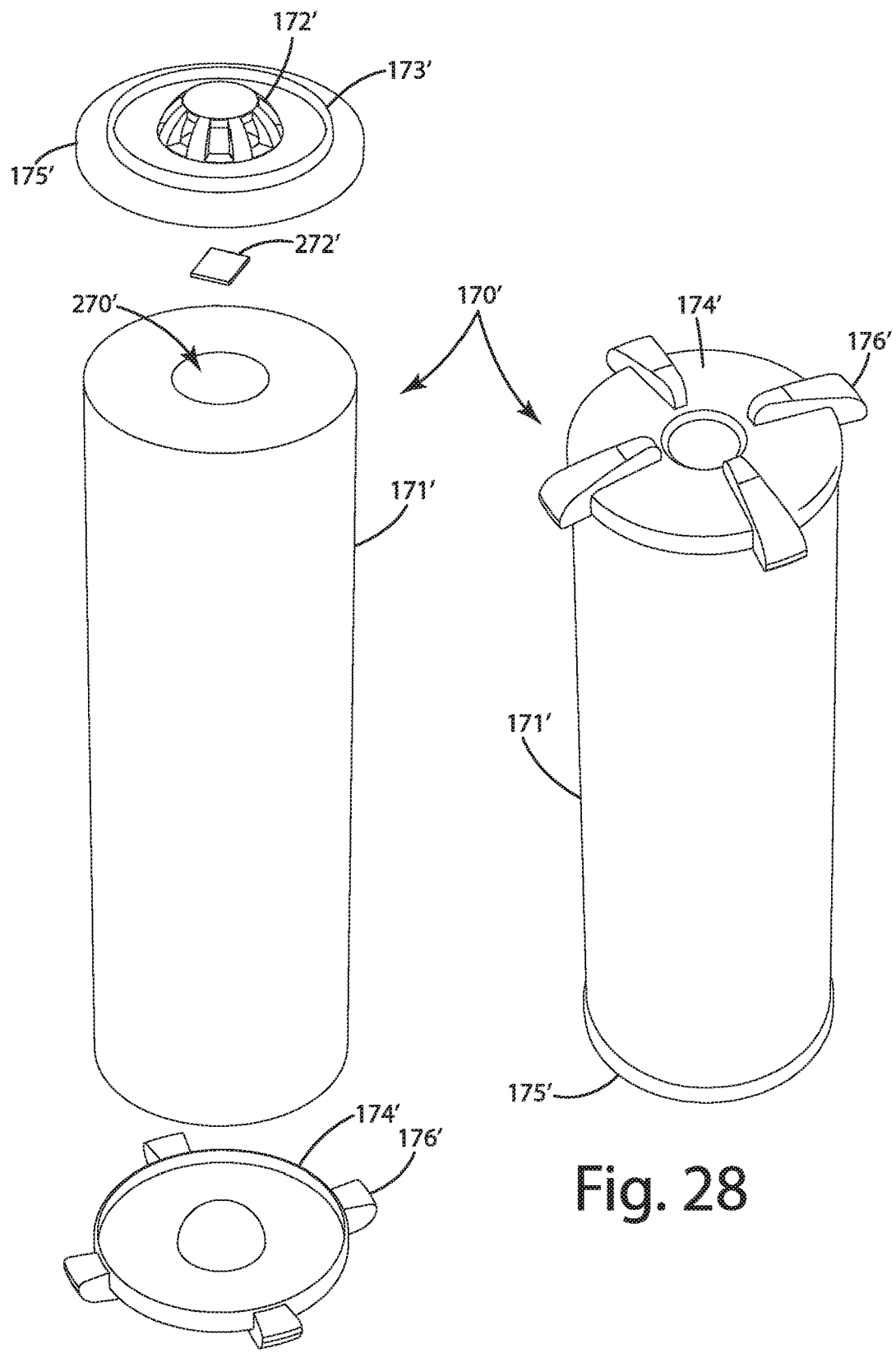

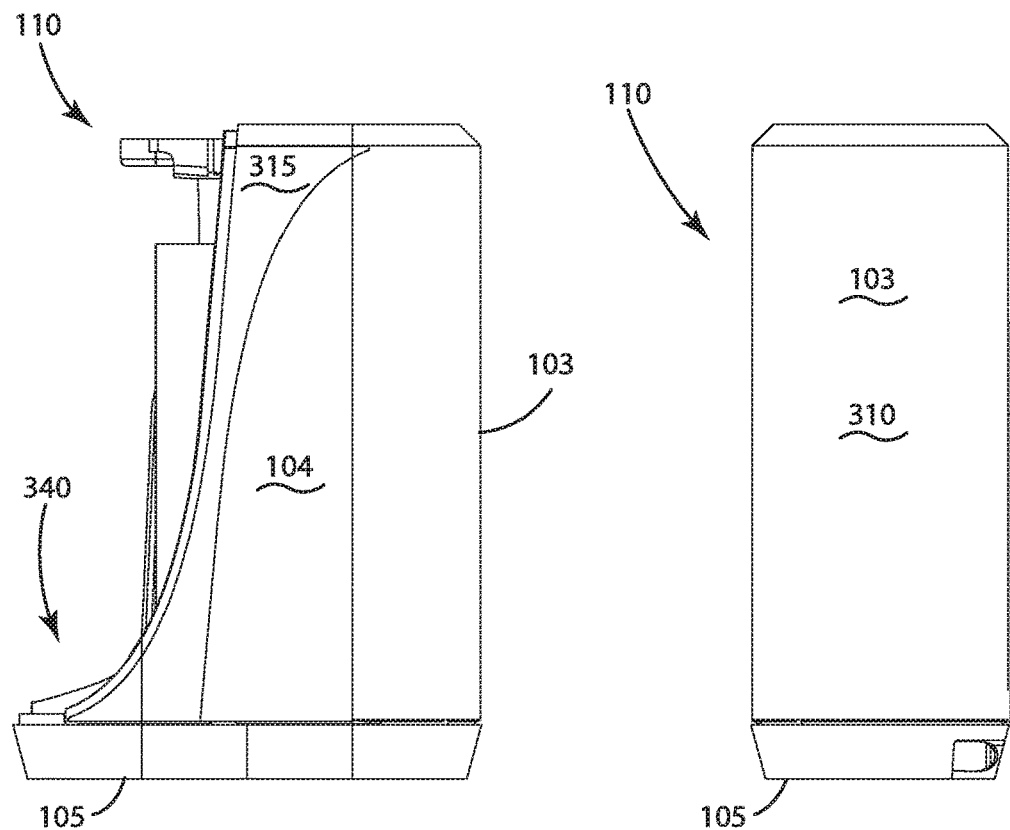
Fig. 32E
Fig. 32F
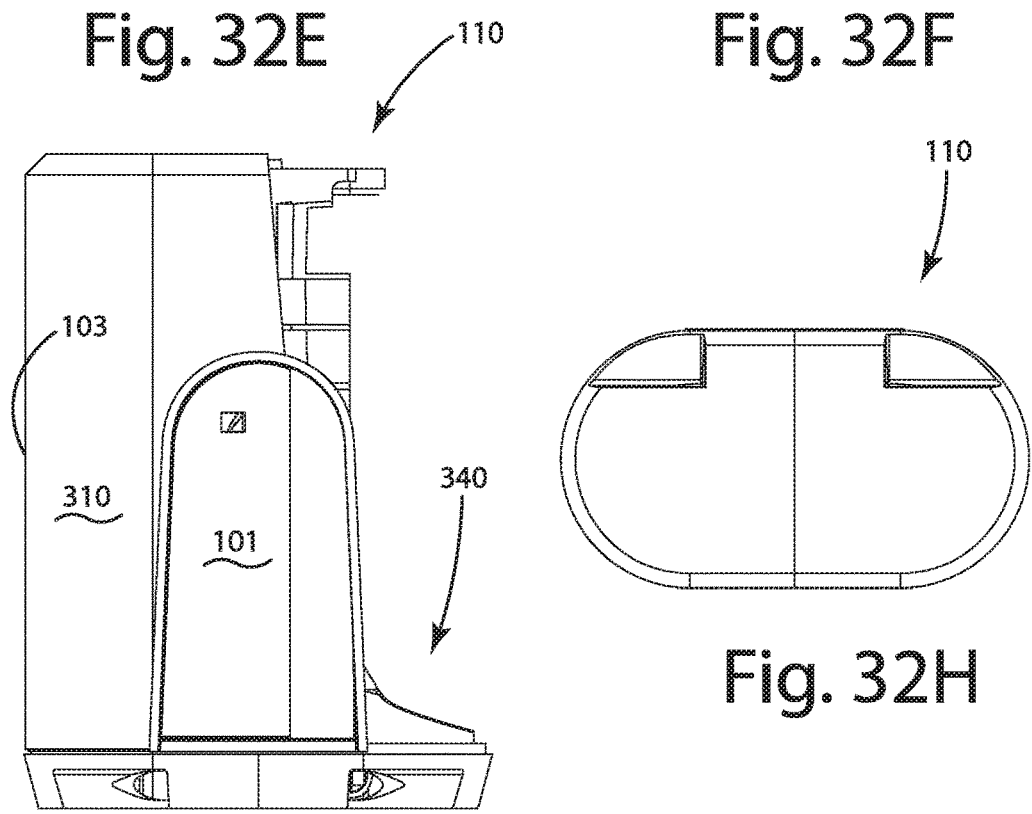
Fig. 32G
Fig. 32H

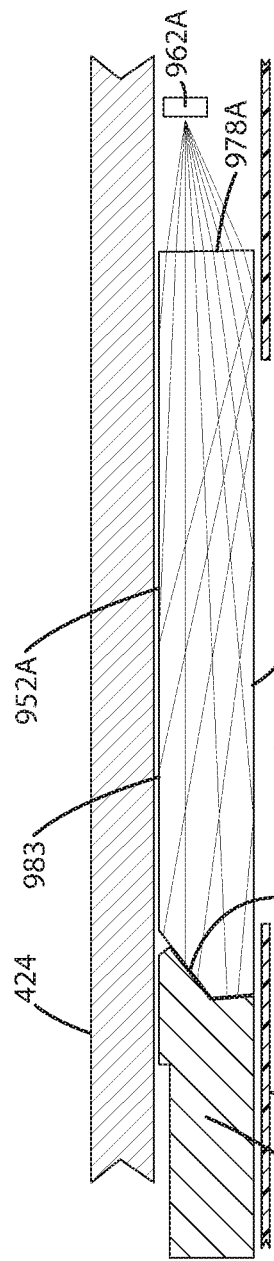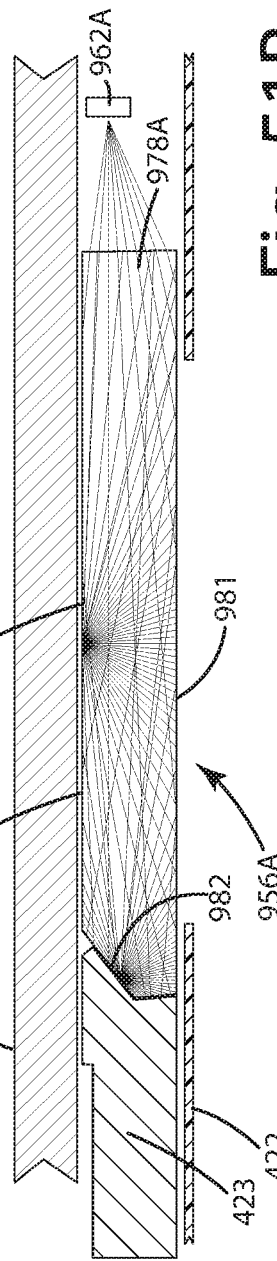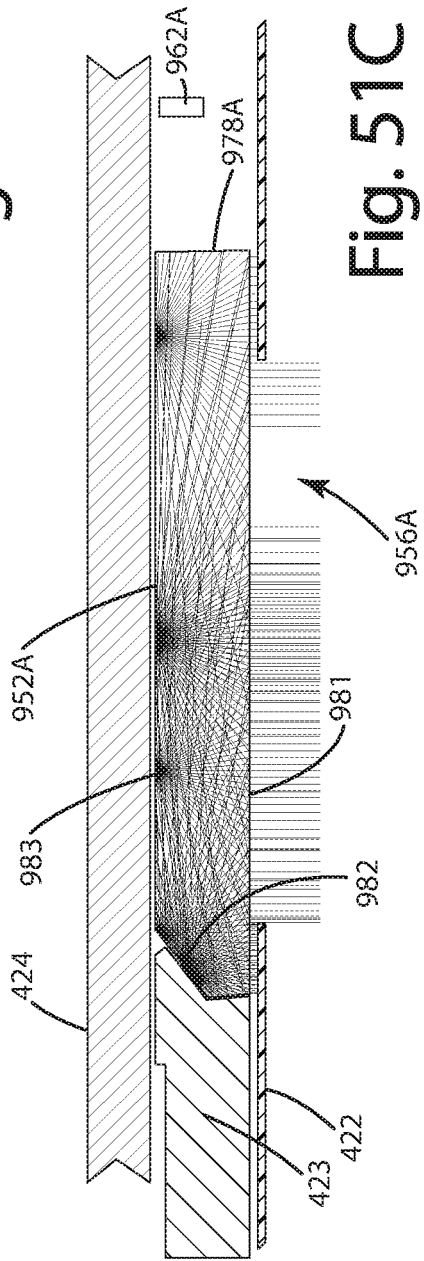

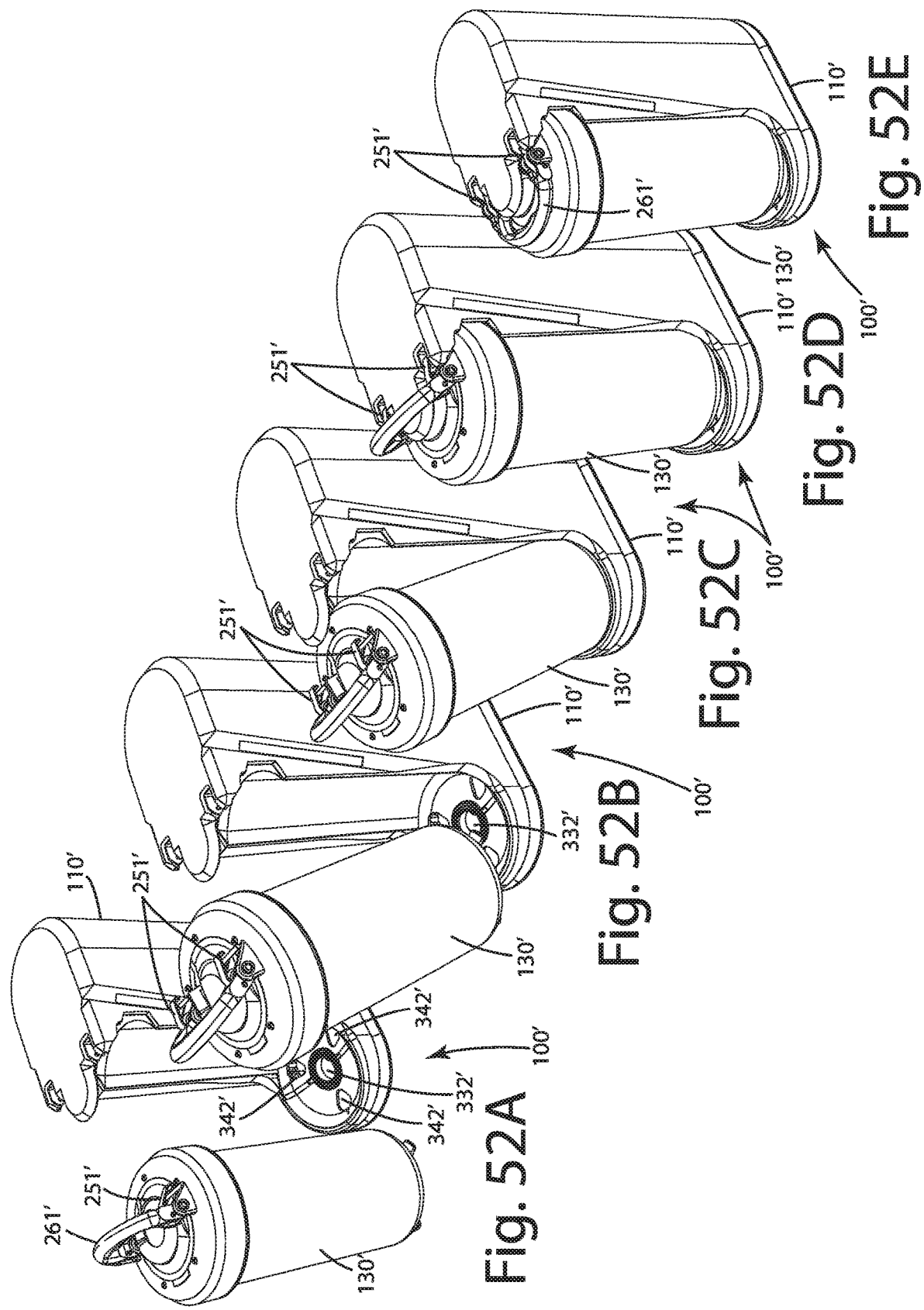

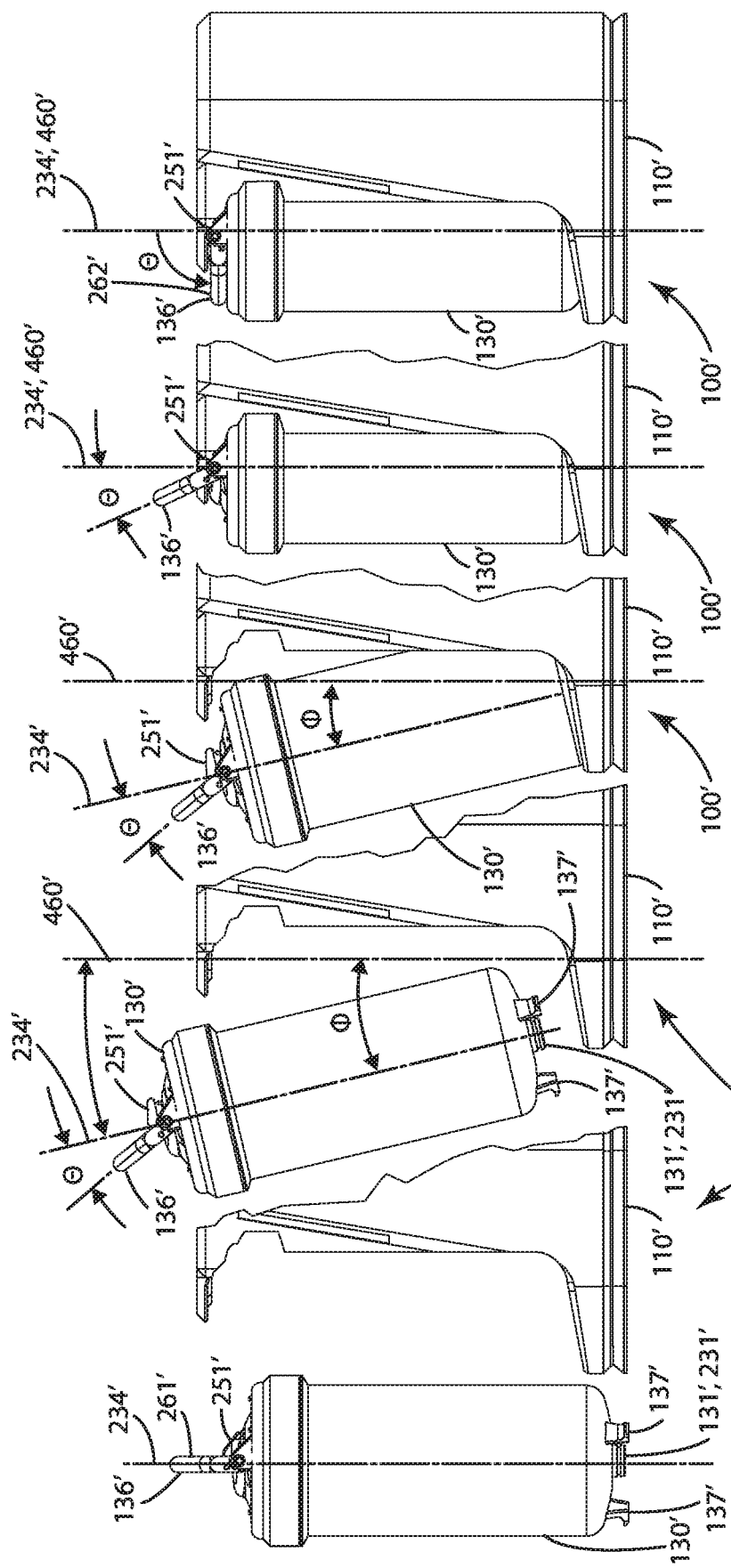

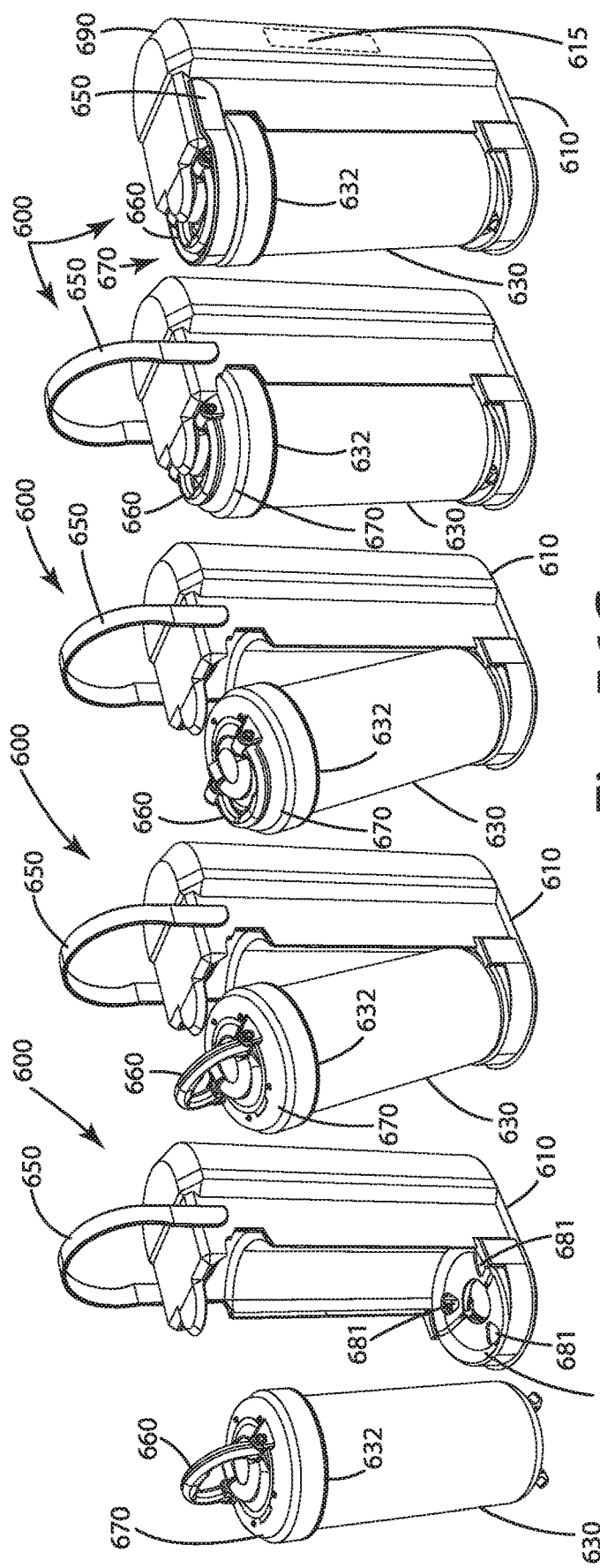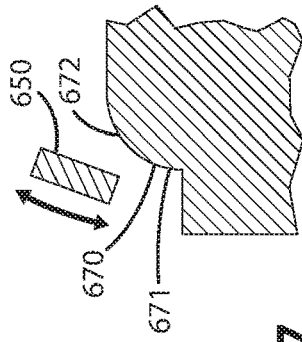

WATER TREATMENT SYSTEM

FIELD OF INVENTION

The present disclosure relates to a water treatment system, and more particularly toward a point-of-use water treatment system for a residential application.

BACKGROUND

Conventional water treatment systems are often used to treat water intended for human consumption. Such treatment systems can be configured to remove pathogens, chemical contaminants, and turbidity from water. Many conventional treatment methods can be broadly classified as either solid separation using physical processes and/or chemical processes or as sterilization using heat, irradiation, or chemical additives. For example, conventional water treatment systems often include carbon filtration, non-carbon filtration, distillation, ozone treatment, reverse osmosis, ion exchange components, chlorination components, aeration components, advanced oxidation process components, coagulation components, sedimentation components, or ultraviolet radiation components.

Conventional point-of-use water treatment systems are designed for use at a single water outlet, such as a sink or water dispenser. The conventional point-of-use water treatment system is connected to a pressurized water supply to treat water as it is being dispensed. In some applications, the water treatment system is positioned on a countertop adjacent to a sink. In countertop applications, the water treatment system is often times connected to the end of the water faucet so that water exiting the faucet can be routed through the water treatment system before it is dispensed. Countertop space is limited in many applications, particularly for conventional water treatment systems that are unlikely to be readily relocated for storage in contrast to kitchen utensils or a cutting board. For this reason, many times, a conventional countertop treatment system is disposed in an area that is used less than other areas of the countertop, such as against a wall and beneath an upper cabinet in a kitchen. This positioning of a conventional water treatment system, while being considered an acceptable use of counter space, often times requires removal or significant repositioning of the system for maintenance (e.g., filter maintenance).

In other applications, the water treatment system is positioned below the countertop, for example, in a cabinet under the sink. In a typical under-counter application, the water treatment system is connected to the water supply line upstream from the standard faucet. In such applications, the water treatment system may be coupled to an auxiliary faucet installed adjacent to the sink above the counter to dispense treated water. Space under the sink can be limited such as when plumbing and other appliances are present (e.g., a garbage disposal). Due to this limited space, similar to the countertop arrangement, the water treatment system is often times disposed in a position, such as a back corner, that is considered unlikely to obstruct everyday use of the space under the sink. While this positioning may be deemed acceptable, maintenance efforts (e.g., filter replacement) can be hindered by the positioning.

SUMMARY

A water treatment system is provided having a base assembly and a treatment assembly. The treatment assembly of the system may be configured to filter particulates from water. The base assembly may include a UV reactor operable to disinfect water for consumption.

In one embodiment, a water treatment system is provided with one or more of the following: a treatment assembly, a base assembly, and a UV reactor. The treatment assembly may include a treatment assembly inlet and a treatment assembly outlet, where the treatment assembly is operable to direct water received via said treatment assembly inlet to a filter assembly that is capable of removing particulates from water. The treatment assembly may be operable to discharge water output from said filter assembly to said treatment assembly outlet, and the filter assembly may be replaceable.

The base assembly in one embodiment may include a water inlet operable to receive untreated water, and a water outlet operable to discharge treated water to a point-of-use. The base assembly may include a water supply connector operable to removably couple to the treatment assembly inlet, and a treated water inlet operable to removably couple to said treatment assembly outlet.

The UV reactor may be configured to disinfect water by applying UV energy to water flowing through said UV reactor. The UV reactor may be fixedly coupled to the base assembly.

In one embodiment, the base assembly may be configured to provide the untreated water received via the water inlet to the treatment assembly inlet and to direct water, received via the treated water inlet from the treatment assembly, to the UV reactor for disinfection, and the base assembly may be operable to discharge water output from the UV reactor to the water outlet for consumption.

In one embodiment, the treatment assembly may include a vessel with an opening and a closure assembly operable to close the opening of the vessel, where the closure assembly includes a treatment assembly outlet. The closure assembly may provide a vessel interface operable to seat at least partially within the opening of the vessel and an interface seal disposed between the vessel interface and an interior wall of the vessel.

In one embodiment, the closure assembly includes a handle and a releasable coupling operable to engage a base receiver of the base assembly in response to pivoting the handle from an operable position to an engaged position.

The closure assembly, in one embodiment, may include a collar configured to couple to an external wall of the vessel. The external wall may include at least one ramp operable to translate rotational movement of the collar to linear movement of the collar relative to the vessel. The external wall may include at least one stop that the collar is configured to interface with at a closure position, where the stop is aligned with at least one alignment element disposed external to the vessel and operable to facilitate alignment of the treatment assembly with the base assembly for engagement therebetween.

In one embodiment, a water treatment system is provided with a treatment assembly and a base assembly. The treatment assembly may include a filter assembly that is capable of removing particulates from water. The filter assembly may include a replaceable filter medium. The base assembly may be operable to discharge treated water to a point-of-use, and may include a frame configured to support the treatment assembly. The treatment assembly may be operable to removably couple to the base assembly.

The base assembly may include a UV reactor configured to disinfect water by applying UV energy (e.g., UV-C energy) to water flowing through the UV reactor for disinfection. The UV reactor may be fixedly coupled to the frame of the base assembly. The UV energy may attack biological cell structures for disruption thereof.

In one embodiment, the base assembly may include a treatment assembly receiver operable to support a lower part of the treatment assembly in a tip-out position and an engaged position. The treatment assembly may be pivotable from the tip-out position to the engaged position at which the treatment assembly can be removably coupled to the base assembly. The treatment assembly, in the tip-out position, may be operable to be removed from the base assembly for replacement of the replaceable filter medium.

In one embodiment, the base assembly may include a water supply connector operable to connect to a treatment assembly inlet of the treatment assembly, where the treatment assembly inlet is disposed on the lower part of the treatment assembly.

In one embodiment, the treatment assembly inlet is connectable to the water supply connector in the tip-out position, and the water supply connector of the base assembly may be rotatable such that the water supply connector is operable to rotate to align and engage with the water path and to connect to the treatment assembly inlet in response to pivoting of the treatment assembly from the tip-out position to the engaged position. The water supply connector, in one embodiment, may support the treatment assembly in the tip-out position. In one embodiment, the water supply connector may be operable to rotate while connected to the treatment assembly inlet in response to pivoting of the treatment assembly from the tip-out position to the engaged position, at which the treatment assembly outlet is coupled to a treated water inlet of the base assembly.

In one embodiment, a method of removably coupling a treatment assembly to a base assembly is provided. The treatment assembly and the base assembly may be operable to treat water received from a supply and to discharge treated water to a water outlet for consumption. The method may include providing a treatment vessel having a filter assembly with a filter medium capable of removing particulates from water, and providing a UV reactor fixedly coupled to the base assembly, where the UV reactor is operable to disinfect water by applying UV energy to water flowing through the UV reactor. The method may include decoupling the treatment vessel from the base assembly to replace the filter medium, and coupling the treatment vessel to the base assembly for treating water for consumption.

In one embodiment, the method may include coupling a treatment assembly inlet to a pivotable water supply connector of the base assembly, and pivoting an upper portion of the treatment assembly relative to the pivotable water supply connector to engage a treated water inlet of the base assembly to a treatment assembly outlet of the treatment vessel.

In one embodiment, a filter assembly is provided that is operable to filter particulates in a water treatment system. The water treatment system may include a base assembly capable of supporting a treatment assembly. The filter assembly may include a filtration media operable to remove particulates from water flowing through the filtration media, and may include an upper end and a lower end with an exterior surface defined between the upper and lower ends. The filtration media may include an internal void to accommodate the water flow of treated water through the filter assembly The filter assembly may include a lower end cap disposed on the lower end of the filtration media, and an upper end cap disposed on the upper end of the filtration media. The upper end cap may include a filter assembly outlet having at least one fluid opening in fluid communication with the internal void.

The filter assembly may include a central axis defined between the upper and lower ends of the filtration media, and a wireless communicator disposed on the upper end cap. The wireless communicator may be configured to communicate with a base wireless communicator of the base assembly.

In one embodiment, the filter assembly is positionable within the treatment assembly for filtering particulates from water flowing through the treatment assembly, where the filter assembly is positionable within the treatment assembly at first and second orientations about a longitudinal axis of the treatment assembly. The wireless communicator may be disposed to communicate with the base wireless communicator in the first and second orientations.

In one embodiment, with the filter assembly within the treatment assembly, the central axis of the filter assembly may be substantially aligned with the longitudinal axis of the treatment assembly, wherein the wireless communicator is proximal to or aligned with the central axis of the filter assembly, whereby regardless of an angular orientation of the filter assembly with respect to the longitudinal axis of the treatment assembly, the wireless communicator remains proximal to or aligned with the longitudinal axis of the treatment assembly.

In one embodiment, the filter assembly may be provided in conjunction with a preliminary filter assembly to form a filter set. The preliminary filter assembly may include a preliminary filtration media having a preliminary filter opening, and including an upper end and a lower end. The preliminary filter assembly may include an upper retainer and a lower retainer disposed respectively on the upper end and the lower end of the preliminary filtration media, where the upper retainer and the lower retainer include respective upper and lower wiping seals. The upper and lower wiping seals are operable to seal respectively against the upper and lower end caps of the filter assembly.

A method of assembling a filter assembly in accordance with one embodiment is provided. The method may include providing a filtration media for removal of particulates flowing through the filtration media. The filtration media may include an upper end and a lower end with an exterior surface defined between the upper and lower ends. The filtration media may include an internal void and a central axis defined between the upper and lower ends.

The method may include affixing a lower end cap to the lower end of the filtration media, and providing an upper end cap having an opening for fluid flow.

In one embodiment, a wireless communicator may be coupled to the upper end cap at an operable position. The wireless communicator may be operable to communicate wirelessly with a base wireless communicator of a base assembly that is separate from the filter assembly, where the wireless communicator at the operable position is disposed to communicate with the base assembly in first and second orientations of the filter assembly with respect to the base assembly.

The method may include affixing a filter assembly outlet to the upper end cap such that a fluid flow path of the filter assembly outlet is capable of fluid communication with the opening of the upper end cap, and affixing an upper end cap to the upper end of the filtration media.

In one embodiment, a display for a water treatment system is provided. The display may include first and second light sources operable to generate brightness (which may be visually detectable as it interacts with physical structures), where the first and second light sources are separated by a light source distance. The display may include a graphic mask including a graphic element configured to allow passage of light, and an optical element having first and second light receiving surfaces operable to receive light respectively from the first and second light sources. The first and second light receiving surfaces may be opposed by an optical element surface of the optical element, wherein at least one of the first and second light sources is spaced from the optical element surface by an optical element distance.

The optical element, in one embodiment, may include a mask facing surface adjacent to the graphic mask and defined between a) at least one of the first and second surfaces and b) the optical element surface. Light received by the first and second light receiving surfaces may reflect internally within the optical element with respect to the optical element surface and the mask facing surface.

In one embodiment, the light source spacing distance is greater than the optical element distance. The light source spacing distance may be N times the optical element distance, where N is greater than 1. For instance, N may be approximately 2. N may be a rational number (e.g., 1.2, 1.5, 2, and 2.3)

In one embodiment, light generated by the first and second light sources and permitted to pass through the graphic element appears substantially uniform with respect to a perspective of an operator.

In one embodiment, a method of displaying information to an end user of a water treatment system is provided. The method may include providing first and second light sources operable to generate light and a housing for the first and second light sources, where the first and second light sources are separated by a light source distance.

The method may include directing light from the first light source to a first light receiving surface of an optical element and toward an optical element surface of the optical element. The optical element surface may be opposite the first light receiving surface, where a first distance is defined between the first light source and the optical element surface, and where the light source distance may be greater than the first distance;

The method may include directing light from the second light source to a second light receiving surface of the optical element and toward the optical element surface. A second distance is defined between the second light source and the optical element surface, where the light source distance may be greater than the second distance;

The method may include reflecting light from the optical element surface internally within the optical element, and allowing light to escape the optical element via a mask facing surface defined between a) at least one of the first and second light receiving surfaces and b) the optical element surface, whereby the escaped light pertains to the information displayed to the end user.

In one embodiment, the light source distance is N times greater than the first distance, and the light source distance is M times greater than the second distance. The N and M are rational numbers (e.g., 2), and may be different from each other.

In one embodiment, a method is provided for installing a treatment assembly into a base assembly that can treat water received from a supply and discharge treated water to a water outlet for consumption. The method may include providing a treatment vessel having an upper portion with a treatment assembly outlet disposed on the upper portion (e.g., a treated water outlet on or near the top of a tank assembly), and a lower portion with a treatment assembly inlet disposed on the lower portion (e.g., a treated water inlet on or near the bottom of the tank assembly). The method may include coupling the treatment assembly inlet to a pivotable water supply connector of the base assembly.

The method may include pivoting the upper portion of the treatment assembly relative to the pivotable water supply connector to engage a treated water inlet of the base assembly and the treatment assembly outlet.

In one embodiment, a display unit is provided for a water treatment system. The display unit may include a housing, first and second light sources, and a light director. The housing may define an opening with an internal space and include a sidewall portion. The sidewall portion may be light transmissive. The first and second light sources may be provided to supply light to the internal space of the housing, and where the second light source is in optical communication with the sidewall portion. The light director may be disposed at least partially within the internal space of the housing and in optical communication with the first light source.

In one embodiment, a water treatment system is provided with a display unit, a display unit receiver and a reflector. The display unit may include a sidewall portion that is light transmissive and a light director. The display unit may include a first light source in optical communication with the light director, and a second light source in optical communication with the sidewall portion.

The display unit receiver may be operable to receive said display unit.

The reflector may be disposed in a spaced relationship relative to the sidewall portion to form a light passage, and may be disposed in optical communication with the sidewall portion. The reflector may be configured to reflect light back toward the sidewall portion. The reflector in conjunction with the sidewall portion may provide a lighting effect within the light passage and visible exterior to the water treatment system.

In one embodiment, a method is provided for displaying information to an end user of a water treatment system. The method may include providing first and second light sources operable to generate light and a housing for the first and second light sources. The method may include directing light from the first light source, with an optical director, to an optically transmissive external surface of the water treatment system, and directing light from the second light source to external sidewall surface of the housing, where the external sidewall surface is light transmissive.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIGS. 1A-E depict a perspective view of the water treatment system in accordance with one embodiment without a cover.

FIGS. 2A-F show a side view of the water treatment system of FIGS. 1A-E.

FIGS. 3A-G show the water treatment system of FIGS. 1A-E with a cover in place respectively in a top view, a front, top perspective view, a rear, bottom perspective view, a right side view, a rear view, a left side view, and a bottom view.

FIG. 4 shows an alternative embodiment of the water treatment system.

FIGS. 11A-H show a treatment assembly respectively in a top, front perspective view, a bottom, rear perspective view, a top view, a left side view, a front view, a right view, a rear view, and a bottom view.

FIG. 16 shows the closure assembly of FIG. 15 in a bottom view.

FIGS. 17A-H show the closure assembly of FIG. 14 respectively in a top view, a top, front perspective view, a bottom, rear perspective view, a left side view, a front view, a right side view, a rear view, and a bottom view.

FIG. 18 depicts a sectional view of the treatment assembly and base assembly in accordance with one embodiment.

FIG. 19 shows an expanded view of FIG. 18.

FIG. 20 shows an expanded view of FIG. 18.

FIG. 27 depicts an exploded view of a filter assembly in accordance with an alternative embodiment.

FIG. 28 depicts a bottom view of the filter assembly in FIG. 27.

FIGS. 32A-H depict the base assembly of FIG. 31 respectively in a rear, bottom perspective view, a top view, a front, top perspective view, a front view, a right side view, a rear view, a left side view, a bottom view.

FIGS. 51A-C show a sectional view of FIGS. 50A-B in various modes of operation.

FIGS. 52A-E show perspective views of various stages for installation and removal of a treatment assembly from a base assembly in accordance with an alternative embodiment.

FIGS. 53A-E show right side views of various stages for installation removal of the treatment assembly from the base assembly in FIGS. 52A-E.

FIGS. 56A-E show perspective views of various stages for installation and removal of a treatment assembly from a base assembly in accordance with one embodiment.

FIG. 57 shows a sectional view of the treatment assembly and base assembly of FIGS. 56A-E.

DETAILED DESCRIPTION

I. Water Treatment System Overview

Figure 3A:
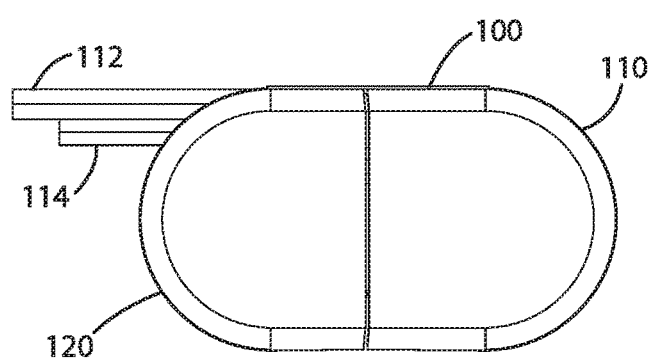
Figure 3B:
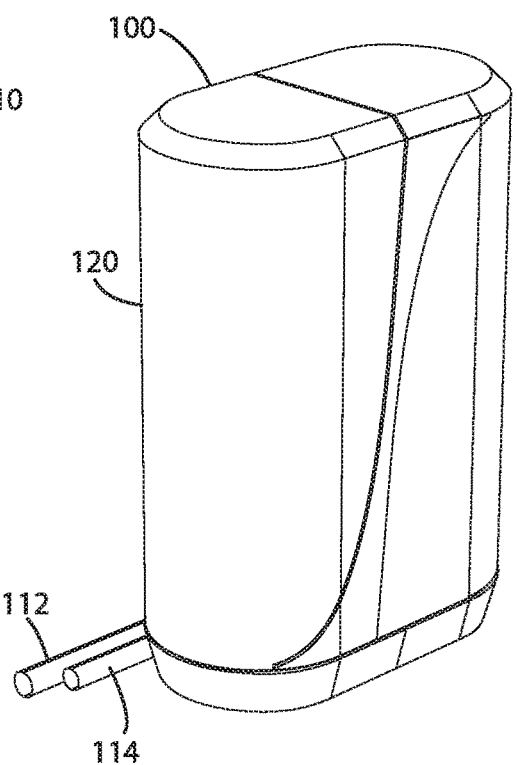
Figure 3C:
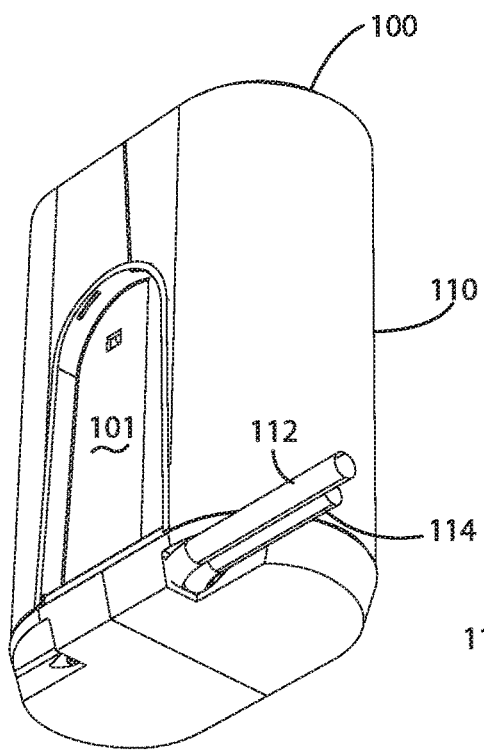
Figure 3D:
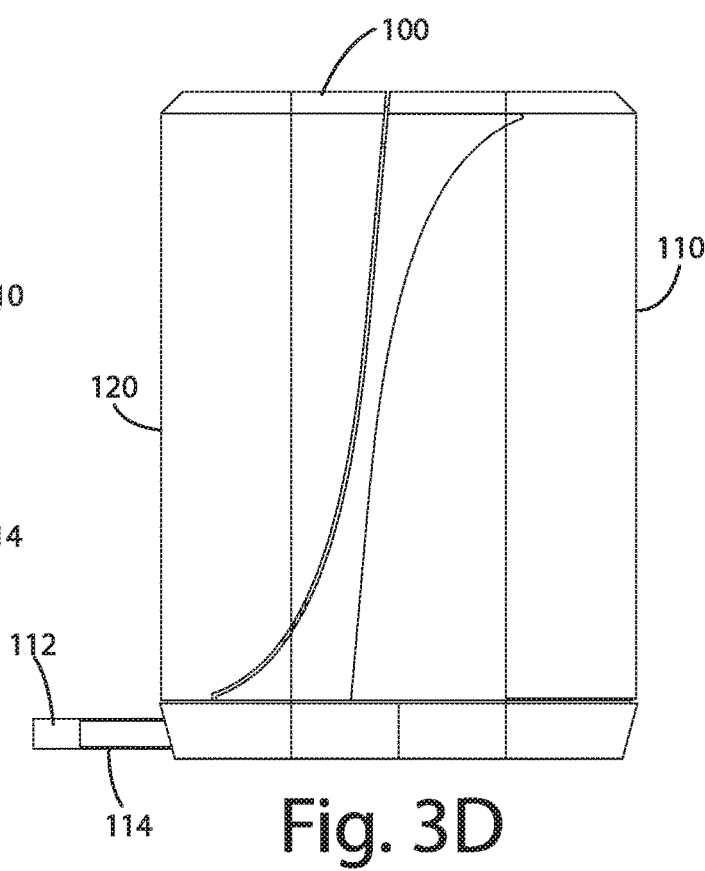

A water treatment system 100 in accordance with one embodiment of the present disclosure is shown in FIGS. 1A-E and 2A-G and generally designated 100. The water treatment system 100 in the illustrated embodiment includes a treatment assembly 130 and a base assembly 110. The water treatment system 100 may include a removable cover 120 configured to interface with the base assembly 110 to conceal one or more or all aspects of the treatment assembly 130. In one embodiment, the removable cover 120 may conceal the treatment assembly 130 to provide an aesthetic appeal to the water treatment system 100 for positioning the water treatment system 100 on a countertop or visible during daily use.

The removable cover 120 may provide a separable and/or replaceable aesthetic shell structure that enables updates or changes to form, material, and color to the water treatment system 100. For instance, the removable cover 120 in one application may be replaced with another removable cover 120 with one or more different aspects related to form, material, or color, or a combination thereof. Additionally, or alternatively, the back cover 310 may provide an aesthetic shell structure similar to the removable cover 120. The back cover 310 may be separable and/or replaceable in one embodiment to facilitate changing the appearance.

In one embodiment, the water treatment system 100 may include UV disinfection capabilities. The water treatment system 100 may include a UV disinfection assembly, described herein, that provides such UV disinfection capabilities. The UV disinfection assembly, in one embodiment, may include a long life/permanent LED reactor assembly that may require substantially no routine maintenance or consumable lamp replacement, and is housed in a permanently installed position within the base assembly 110. It is to be understood that the present disclosure is not limited to a non-serviceable or permanent LED reactor assembly; the LED reactor assembly may be replaceable or serviceable, or both. It is also to be understood that the UV disinfection assembly may incorporate a UV energy source other than an LED source, including for instance a fluorescent UV source (CFL) to provide disinfection capabilities.

The treatment assembly 130 in the illustrated embodiments of FIGS. 1A-E and 3A-G may be removable from the base assembly 110 in a manner that facilitates installation or placement of the water treatment system 100 for operation in a space that limits access to one or more sides or portions of the water treatment system 100, such as an upper portion 102, a rear portion 103, a side portion 104, or a base portion 105, or a combination thereof. As an example, a space between the upper portion 102 and another object such as an upper cabinet, may be sufficiently small such that there is limited access to the upper portion 102 or limited vertical displacement of one or more components of the water treatment system 100 (e.g., the treatment assembly 130). In one embodiment, the water treatment system 100 may be considered to incorporate a 'flat' aspect ratio that preserves usable work space in on-counter installations and substantially minimizes storage space intrusion in below counter placements.

In the illustrated embodiment, as described in further detail herein, the treatment assembly 130 may pivot or tilt relative to a lower portion or the base portion 105 of the base assembly 110 such that an upper part of the treatment assembly 130 separates from the base assembly 110 while a lower part of the treatment assembly 130 maintains contact with the base assembly 110. In other words, the accessible filtration tank or treatment assembly 130 can disengage from the base assembly 110, which may be permanently installed over or under a countertop or sink. In under counter installations, the treatment assembly 130 may disengage from the base assembly 110 to facilitate extraction of a consumable filter from the treatment assembly 130 without disturbance of plumbing that connects the base assembly 110 to a water source and a treated water outlet in fluid communication with a point-of-use dispense outlet. In one embodiment, the treatment assembly 130 or tank assembly may disengage from a locked-in position (in which the treatment assembly 130 is nested into the base assembly 110 or frame assembly) such that the treatment assembly 130 is pivoted relative to the base assembly 110. In a pivoted position, the treatment assembly 130 may be configured to rest securely in a tipped-out arrangement, also described as a secure 'rest' position, to facilitate management of a hand placement and to satisfy lift parameters for lifting and carrying the treatment assembly 130 to a sink for opening and filter replacement activities. In other words, the treatment assembly 130 may pivot from an engaged position with the base assembly 110 to a pivoted position at which the treatment assembly remains substantially stable. The treatment assembly 130 may be prevented from further pivoting at the pivoted position such that the treatment assembly 130 does not simply fall out, or loosely disengage, from the base assembly 110.

It is to be understood that the present disclosure is not limited to the tilt configuration for removal of the treatment assembly 130 from the base assembly 110, and that the treatment assembly 130 and base assembly 110 may be configured differently for removal of the treatment assembly 130 from the base assembly 110.

In one embodiment, the removable cover 120 may engage and disengage from the base assembly 110 in a direction substantially parallel with a surface upon which the base assembly 110 is disposed. This way, the removable cover 120 may facilitate access to the treatment assembly 130 while the water treatment system 100 is positioned in a space constrained position as described herein, which may restrict access to the water treatment system 100 along one or more sides or portions thereof.

The water treatment system 100 may be operable to receive, via a water inlet tube 112, untreated water from a source, such as a cold water service line configured to supply water under pressure. The water treatment system 100 may also be operable to treat the untreated water received from the source and deliver treated water to a water outlet tube 114, which may be coupled to a dispense point to deliver the treated water to a point-of-use. The dispense point may correspond to an auxiliary faucet, but the present disclosure is not so limited. For instance, the dispense point may be a diverter that attaches to an existing sink faucet.

In one embodiment, the water connections for inlet and outlet piping or tubes are housed or provided in a space under the unit that is accessible to an installer. The connectors may provide rotation capabilities to align system parts during installation.

In one embodiment, the treatment assembly 130 may include a closure assembly 132 or lift off tank cover that enables tool-less access to a vessel 134 (also described as a pressure vessel or removable tank or treatment vessel) and that exposes surfaces of the vessel 134 for cleaning (e.g., enabling access for simple cleaning methods).

The treatment assembly 130 may include a treatment assembly inlet 131 (e.g., a water inlet) operable to receive water from the water inlet tube 112 via a base assembly inlet passage. The treatment assembly inlet 131 of the treatment assembly 130 may include a one-way valve or check valve coupled thereto (such as being disposed in line with the treatment assembly inlet 131 of the vessel 134) to substantially prevent leakage of resident water in the treatment assembly 130 during transport to a maintenance location (e.g., often a water collecting vessel or more commonly the kitchen sink). The check valve also may satisfy certain regulatory requirements that the unit may be required to accommodate.

The closure assembly 132 (e.g., also described as a cover assembly or tank closure assembly) of the treatment assembly 130 may include a handle assembly 136 operable to secure the treatment assembly 130 into a pocket or receiving space provided by the base assembly 110. Operation of the handle assembly 136 from an operable position 261 (e.g., a disengaged position) to an engaged position 262 may facilitate formation of a watertight connection between the base assembly 110 and the treatment assembly 130 so that they resist the tendency of the water connections. For instance, the treatment assembly 130 and the base assembly 110 may engage in response to operation of the handle assembly 136 and engage in a position such that, under pressure as a structural system, both top and bottom of the treatment assembly 130 are prevented from separating and the inlets and outlets are prevented from leaking.

In the illustrated embodiment, the treatment assembly 130 is oriented to the base assembly 110 by alignment members 137 extending from a lower part 141 of the treatment assembly 130 (e.g., 'foot' extensions) that are operable to grossly locate the treatment assembly 130 to the base assembly 110, a water inlet coupler 231 (e.g., a water inlet connector) of the treatment assembly 130 to a water supply coupler 332 (e.g., a water supply connector) of the base assembly 110, and aspects of the handle assembly 136 (e.g., a latch mechanism) to connect at an upper portion of the base assembly 110. The alignment members 137 may be arranged, in one embodiment, such that the treatment assembly 130 can be oriented relative to the base assembly 110 at any of three 120 degree zones (although other spacing may be implemented). Improper orientation is substantially prevented via arrangement of the alignment members 137 and the handle assembly 136 so that it is not possible to seat and engage the lock mechanism without alignment of the treatment assembly 130 and the base assembly 110. As discussed herein, the base assembly 110 may include a corresponding number of base assembly receivers 342 operable to receive alignment members 137 of the treatment assembly 130.

In one embodiment, the handle assembly 136 may be operable to move to an engaged position 262 at which the handle assembly 136 is rotated or folded flat relative to an upper surface of the treatment assembly 130. The treatment assembly 130 and the base assembly 110 may be constructed such that the handle assembly 136 may be disposed in the engagement or engaged position 262 (e.g., disposed flat) only when orientation is correct and a watertight connection can be made between the treatment assembly 130 and the base assembly 110.

An alternative embodiment of the water treatment system is shown in FIGS. 52A-E, FIG. 4, and FIGS. 53A-E and generally designated 100'. The water treatment system 100' is similar to the water treatment system 100 in many respects, including a treatment assembly 130', a base assembly 110', and a removable cover 120'. The treatment assembly 130' may be operable to pivot or tilt relative to a lower portion or the base portion 105' of the base assembly 110' while a lower part of the treatment assembly 130' maintains contact with the base assembly 110'. As discussed herein, a handle assembly 136' may be positioned between an operable position 261' and an engaged position 262' with respect to the base assembly 110' in order to facilitate forming a watertight connection between the base assembly 110' and the treatment assembly 130'.

The treatment assembly 130' in the illustrated embodiment may include a plurality of alignment members 137' extending from a lower part 141' of the treatment assembly 130' and disposed to facilitate alignment between the treatment assembly 130' and the base assembly 110'. The alignment members 137' may be angularly spaced about a longitudinal axis 234' of the treatment assembly 130' in an even manner. As discussed herein, the treatment assembly 130' may include a closure assembly 132' and a vessel 134', with the closure assembly 132' operable to couple to the vessel 134' in multiple angular orientations. Each angular orientation in which the closure assembly 132' is coupled to the vessel 134' may be aligned with the angularly spaced alignment members 137' to align with the base assembly 110' for forming a watertight connection between the base assembly 110' and the treatment assembly 130'. The alignment members 137' may be received respectively by the base assembly receivers 342'. In this way, the alignment members 137' may aid in engaging the handle assembly 136' to the base assembly 110' to form a watertight connection between the treatment assembly 130' and the base assembly 110'.

The alignment members 137' in the illustrated embodiment are configured differently from the alignment members 137 in that the alignment members 137' include a foot extending radially with respect to longitudinal axis 450' of the treatment assembly 130'. However, it is to be understood that the alignment members 137' may be configured more similar to the alignment members 137 without the foot. The water treatment system 100' is described herein with several components that are similar or different from respectively named or positioned components of the water treatment system 100 and additional embodiments of a water treatment system described herein; it is to be understood that any component of the water treatment system 100 may be incorporated into the water treatment system 100' and additional water treatment systems described herein. Likewise, any component of the water treatment system 100' and additional water treatment systems described herein may be incorporated into the water treatment system 100. Additionally, it is to be understood that any one or more components of the water treatment system 100, water treatment system 100', and additional water treatment systems described herein may be absent from such embodiments to form an alternative embodiment.

In the illustrated embodiment, the water treatment system 100' may include an upper portion 102', a rear portion 103', a side portion 104', and a base portion 105', or a combination thereof, similar in many respects to the upper portion 102, the rear portion 103, the side portion 104, and the base portion 105 of the water treatment system 100. The water treatment system 100' may include a UV disinfection assembly that provides UV disinfection capabilities.

The water treatment system 100' includes a water inlet tube 112' and a water outlet tube 114' configured respectively to receive water from a water source and to provide treated water to a point of use.

The treatment assembly 130' of the water treatment system 100' may include a vessel 134' and a closure assembly 132' capable of being removed from the vessel 134' to provide access to an internal space of the vessel 134' and a filter assembly 170' disposed therein.

The water treatment system 100' may include a water inlet coupler 231' that forms part of the treatment assembly inlet 131' of the treatment assembly 130'. The water inlet coupler 231' may form a fluid tight connection to a water supply coupler 332', similar to the connection between the water inlet coupler 231 and the water supply coupler 332 of the water treatment system 100.

II. Treatment Assembly

The treatment assembly 130 in accordance with one embodiment of the present disclosure is shown in further detail in the illustrated embodiment of FIGS. 5-10 and 11A-H. The treatment assembly 130 in the illustrated embodiment includes the closure assembly 132 operable to seal an opening 138 of a vessel 134. The vessel 134 may be a walled structure, sized and shaped to receive a preliminary filter 150 (also described as a pre-stage filter) and a filter assembly 170. The vessel 134, as mentioned previously, may include an opening 138 sufficiently sized to allow replacement of the pre-stage filter (e.g., the preliminary filter 150) or the filter assembly 170, or both. The opening 138 may also be sufficiently sized to enable cleaning of an interior space of the vessel 134 with conventional cleaning methods.

The vessel 134 in the illustrated embodiment may include a lower part 141, which also defines a lower part of the treatment assembly 130. The lower part 141 may include a plurality of alignment members 137, as described herein. The alignment members 137 may be configured to facilitate alignment of the vessel 134 to the base assembly 110. Additionally, or alternatively, the alignment members 137 may facilitate stabilizing the treatment assembly 130 in an upright position on a generally horizontal surface (e.g., a countertop or a sink) for maintenance.

Figure 11A:
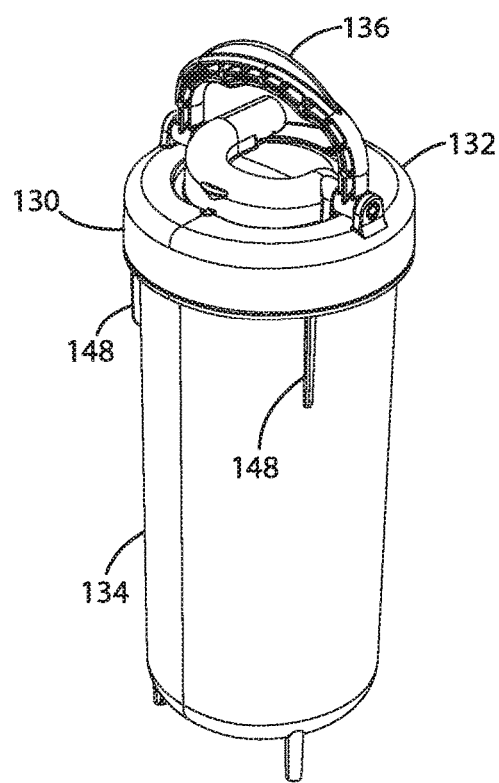
Figure 11B:
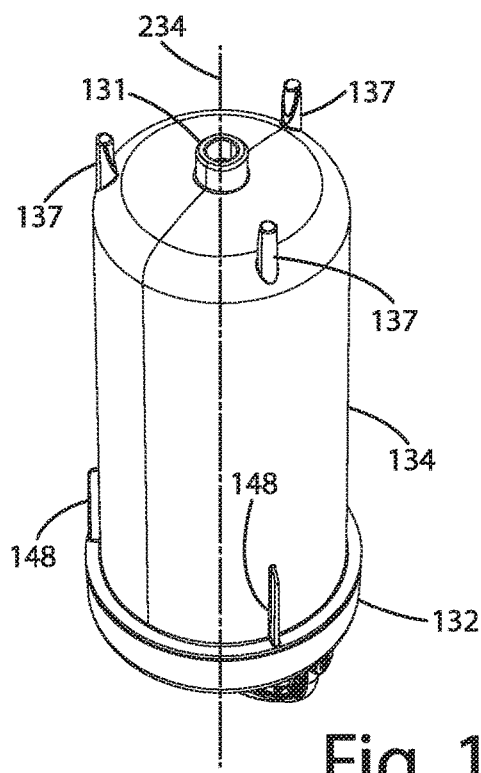
Figure 11C:
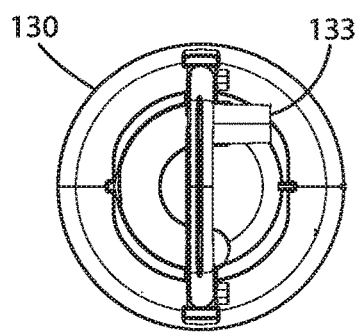
Figure 11D:
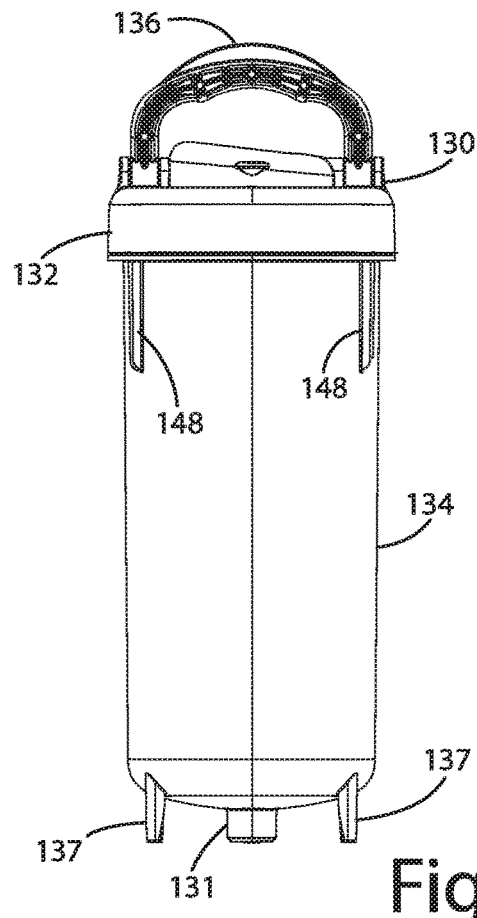

The alignment members 137 can be seen in the illustrated embodiments of FIGS. 11B and 11H and are arranged in an equally spaced angular orientation with respect to a central axis 234' such that each alignment member 137 is disposed at an angle α relative to each adjacent alignment member 137 (with the center being defined by the longitudinal axis 234' and the lower part 141).

Figure 13:
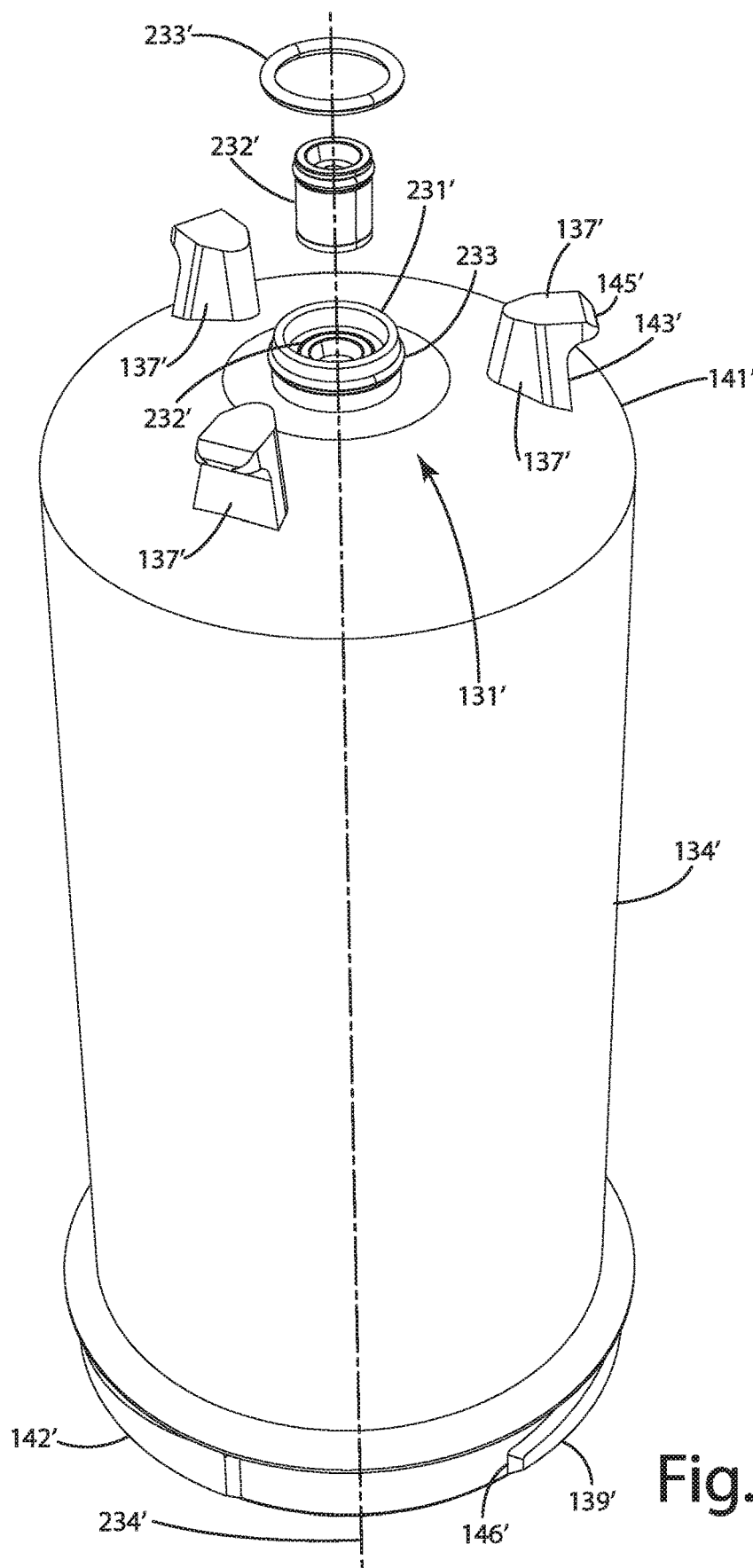
FIG. 13 shows an exploded view of the vessel assembly or treatment assembly in accordance with an alternative embodiment.

In an alternative embodiment including the treatment assembly 130', shown in FIG. 13 without a closure assembly 132' in an exploded view, the treatment assembly 130' may include alignment members 137' having a leg portion 143' extending from the lower part 141' of the vessel 134'. At or near an end of the leg portion 143' that is distal from the lower part 141' of the vessel 134', the alignment member 137' may include a foot 145' that extends horizontally (and optionally radially outward relative to a central axis 234' of the vessel 134') to define a support surface. One or more or all of the feet 145', in one embodiment, may engage the frame assembly or base assembly 110 to facilitate alignment, and to optionally reinforce the bottom seal (e.g., the connection between the water supply coupler 332' and the water inlet coupler 231' of the treatment assembly inlet 131'), potentially reinforcing the bottom seal in the upright installed position of the treatment assembly 130'. The collective feet 145' of the plurality of alignment members 137' may be capable of stabilizing the treatment assembly 130' in an upright position on a generally horizontal surface for maintenance. In one embodiment, the feet 145' on the vessel 134' allow the treatment assembly 130' to stand upright on any horizontal surface during installation or removal procedures.

Figure 10:
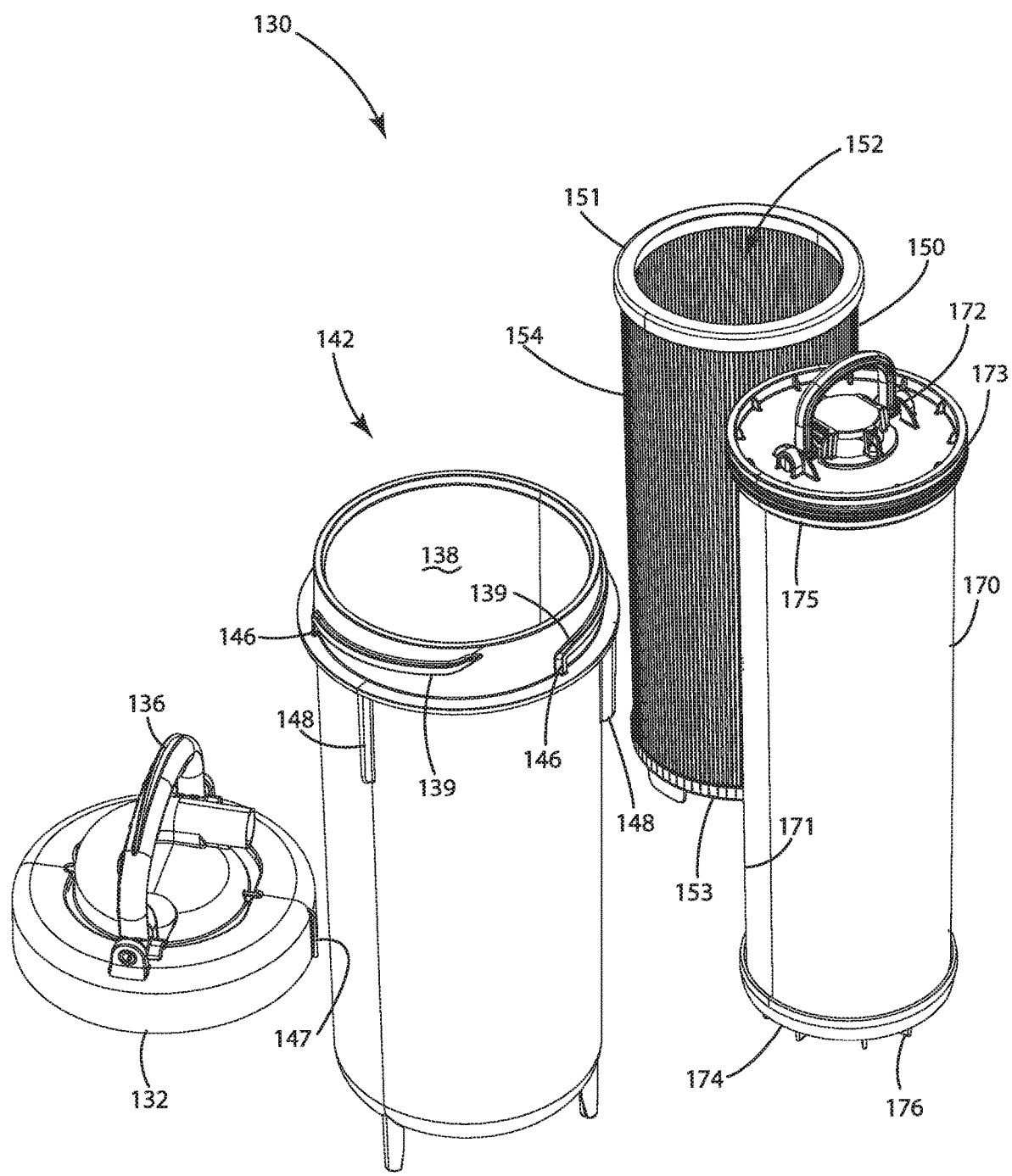
FIG. 10 shows components of FIGS. 5-6 in further detail.

Returning to the description of the treatment assembly 130, as depicted in the illustrated embodiment of FIG. 10, the opening 138 of the vessel 134 may be sealed by the closure assembly 132, which may be configured to engage one or more ramped structures 139 (e.g., a ramp) disposed circumferentially about a perimeter of the opening 138. In the illustrated embodiment, the treatment assembly 130 includes three ramped structures 139; however, the present disclosure is not so limited. As an example, the treatment assembly 130 may include a single ramped structure 139 in the form of a screw thread with a single start to facilitate engagement of the closure assembly 132 over the opening 138 of the vessel 134. The plurality of ramped structures 139 may facilitate translating rotational movement of the closure assembly 132 relative to the vessel 134 into linear motion to close and form a watertight seal about the opening 138 of the vessel 134. The three ramped structures 139 in the illustrated embodiment may operate as individual screw threads defining three starts for the closure assembly 132 to engage the vessel 134 and close the opening 138 of the vessel 134.

In the illustrated embodiment, the ramped structures 139 correspond in number to the alignment members 137 extending from the lower part 141 of the vessel 134. One or more of the ramped structures 139 may include a stop 146 operable to engage a corresponding component of the closure assembly 132 (e.g., a closure assembly stop 241). In the illustrated embodiment, the stop 146 is provided at or near a closure end of the ramped structure 139 that, when engaged by the closure assembly 132, the stop 146 prevents further rotation of the closure assembly 132 about the vessel 134, thereby defining a closure position for the closure assembly 132 relative to the vessel 134. For instance, the ramped structures 139 in the illustrated embodiment correspond to three helical ramps at 120° on the collar 242 (e.g., the closure ring) to engage three ramped structures of the vessel 134.

Figure 15:
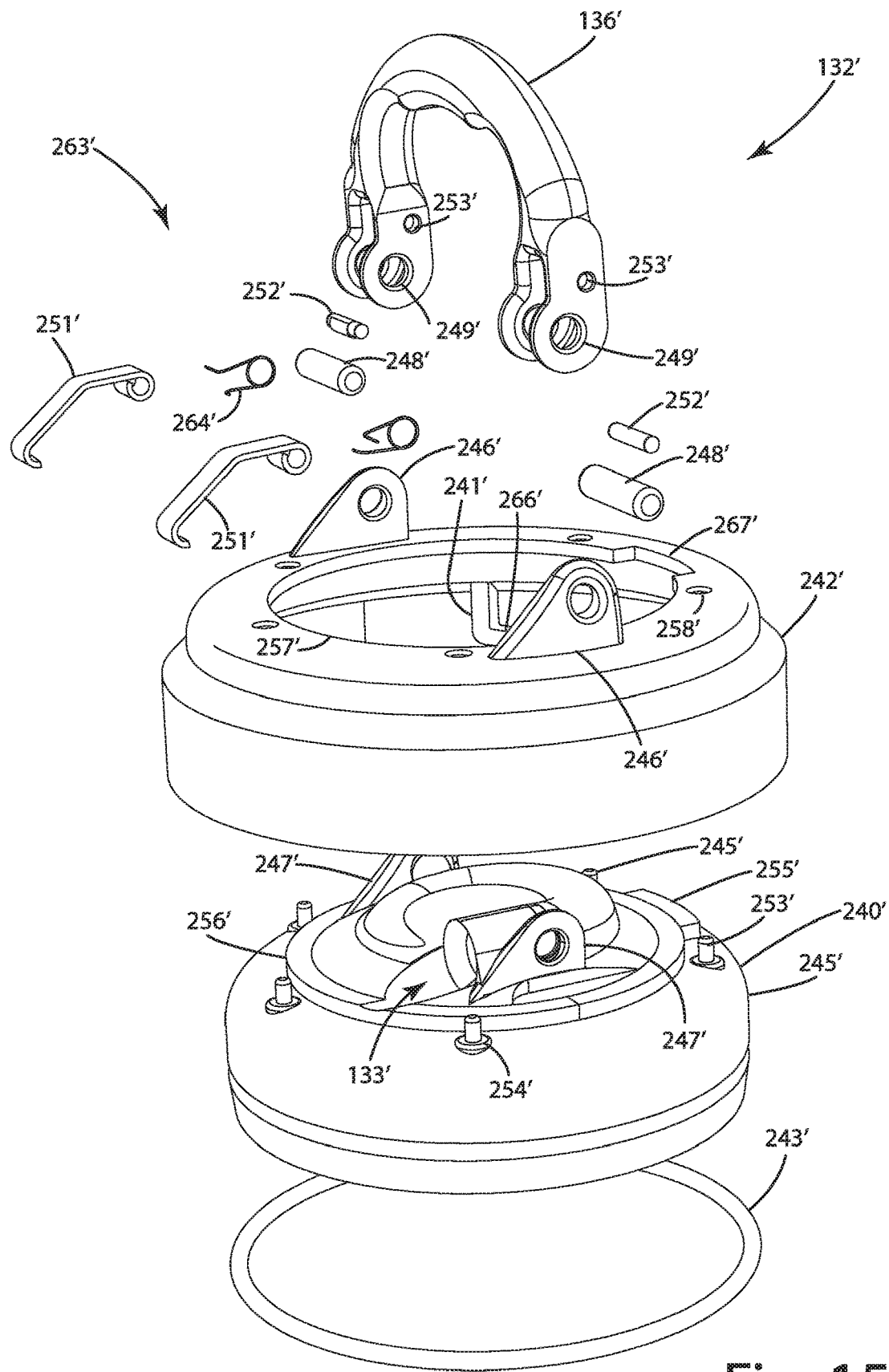
FIG. 15 shows an exploded view of a closure assembly in accordance with an alternative embodiment.

In an alternative embodiment, shown in FIGS. 13 and 15, a closure assembly 132' and a vessel 134' are shown with a stop 146' provided at or near a start end of each ramped structure 139' that, when engaged by the closure assembly 132', the stop 146' prevents further rotation of the closure assembly 132' about the vessel 134' thereby defining a closure position for the closure assembly 132' relative to the vessel 134'.

It is to be understood that the stop 146, 146' may be configured differently from the illustrated embodiments of FIGS. 10, 13, and 15. As an example, the stop 146 may be provided in the form of a divot or notch along a ramped surface of the ramped structure 139 that engages a corresponding protrusion defined by the closure assembly 132 in a closed position.

In the illustrated embodiment of FIGS. 5-10 and 11A-H, the closure assembly 132 and/or the vessel 134 are provided with registration elements to indicate that the closure assembly 132 and the vessel 134 are fully engaged with each other. The vessel 134 in the illustrated embodiment includes a plurality of registration elements 148 equal in number to the number of available engagement positions of the closure assembly 132 with respect to the vessel 134. For instance, the number of registration elements 148 may equal the number of ramped structures 139, such that, regardless of a starting orientation of the closure assembly 132 relative to the vessel 134 and which ramped structures 139 engage which closure assembly ramps 266, an engagement position of the closure assembly 132 with respect to the vessel 134 results in registration with one of the plurality of registration elements 148.

In the illustrated embodiment, the closure assembly 132 includes a closure assembly registration element 147 that aligns with one of the plurality of registration elements 148 at a position corresponding to complete engagement of the closure assembly 132 with respect to the vessel 134. This alignment may serve as a visual indication to a user that couples the closure assembly 132 to the vessel 134 that complete engagement has or has not been achieved. Optionally, the closure assembly registration element 147 may correspond to an angular orientation of the receiving element 267 of the closure assembly 132.

It is noted that, in one embodiment, the closure assembly 132 is operable to engage with the vessel 134 such that in the engaged position the closure assembly 132 is aligned with the alignment members 137. This alignment in conjunction with the receipt of the alignment members 137 by the base assembly receivers 342 provides alignment between the closure assembly 132 and the base assembly 110 for engagement of the handle assembly 136 to form a watertight connection. In one embodiment, if the closure assembly 132 is not fully engaged with the vessel 134 (e.g., the closure assembly 132 is partially rotated to engage the vessel 134 but the stop 146 is not engaged), alignment between the closure assembly 132 and the alignment members 137 may not be achieved, and therefore attempts to connect the closure assembly 132 to the base assembly 110 may not be possible or is impractical.

In the illustrated embodiments of FIGS. 10, 13, and 15, the one or more stops 146, 146' of the vessel 134, 134' may be positioned such that the closure position of the closure assembly 132, 132' is aligned with the alignment members 137, 137' extending from the lower part 141, 141' of the vessel 134, 134'. The alignment members 137, 137', as described herein, may facilitate alignment of the treatment assembly 130, 130' relative to the base assembly 110, 110'. Because the closure position of the closure assembly 132, 132' is aligned relative to the alignment members 137, 137', the position of the closure assembly 132, 132' (despite the closure assembly 132, 132' being removed from the vessel 134, 134') may be aligned with the base assembly 110, 110' such that an engagement mechanism of the closure assembly 132, 132' is operable to engage the base assembly 110, 110'.

In one embodiment, the one or more ramped structures 139 of the vessel 134, in conjunction with the one or more stops 146, may provide a plurality of closure positions for the closure assembly 132, where each closure position aligns with the alignment features 137 in an engagement position for the closure assembly 132 relative to the base assembly 110. For instance, in the illustrated embodiment, the three ramped structures 139 provide three start positions for the closure assembly 132 to thread onto the vessel 134. Regardless of which start position the closure assembly 132 engages, the closure position of the closure assembly 132 relative to the vessel 134 is ultimately aligned with the alignment members 137 such that a) at least one position for the alignment members 137 cooperates with the base assembly 110 to position the treatment assembly 130 for engagement with the base assembly 110, and b) the closure assembly 132 is also positioned for engagement with the base assembly 110 at this position. The ramped structures 139' of the treatment assembly 130' may be configured in a similar manner.

In the illustrated embodiment, the stops 146 provided by the vessel 134 may be equally spaced relative to each other to substantially match the angular spacing a of the alignment members 137. As a result, there are a plurality of closure positions for the closure assembly 132 to engage the vessel 134. Regardless of there being more than one start for the closure assembly 132 to thread onto the vessel 134, and therefore more than one closure position for the closure assembly 132, the spacing of the stops 146 being in correlation with the alignment members 137 substantially ensures that each of the closure positions align the closure assembly 132 relative to the alignment members 137 for engagement with the base assembly 110. In one embodiment, with the closure assembly 132 in a closure position, not all of the alignment positions facilitated by the alignment members 137 correspond to the closure position to enable the closure assembly 132 to engage the base assembly 110; however, at least one of the alignment positions provided by the alignment members 137 relative to the base assembly 110 correspond to the closure position. In one embodiment, each closure position available to the closure assembly 132 is associated with an alignment position provided by the alignment members 137 to ensure that the closure assembly 132 can be mated to the vessel 134 in a variety of ways, each of which provides for alignment to engage the treatment assembly 130 to the base assembly 110.

The vessel 134 of the treatment assembly 130 in the illustrated embodiment includes a treatment assembly inlet 131 operable to receive the untreated water from a water source. The treatment assembly inlet 131 may be operably coupled to the water inlet tube 112 via the base assembly 110. The treatment assembly inlet 131 may be centered about a central axis 234 of the treatment assembly 130. In this way, the position of the treatment assembly inlet 131 may remain substantially the same regardless of rotation of the treatment assembly 130 relative to the base assembly 110. The treatment assembly inlet 131 may be operably coupled to a check valve 232 that prevents back flow of water through the treatment assembly inlet 131, such as in the case of water held within the vessel 134 when the treatment assembly 130 is removed from the base assembly 110 for maintenance. In one embodiment, the treatment assembly inlet 131 may be operatively coupled to a flow regulator to limit the flow rate, potentially to a maximum test value. The flow regulator may be integral to the check valve 232. The vessel 134' in the illustrated embodiment of FIGS. 13 and 15 may be configured similarly with a central axis 234', a treatment assembly inlet 131', and a check valve 232' arranged in a similar manner.

In the illustrated embodiment of FIGS. 5-10 and 11A-H, a preliminary filter 150 of the treatment assembly 130, also described as a pre-stage filter, may provide filtration for particulates disposed in the untreated water received via the treatment assembly inlet 131. Water flowing through the preliminary filter 150 may be communicated to a downstream filter, such as the filter assembly 170, which may operate to further treat water that has passed through the preliminary filter 150. In one embodiment, the preliminary filter 150 may be configured to provide filtration for particulates that, if not removed upstream of the filter assembly 170, might significantly reduce the usable life of the filter assembly 170. For instance, the filter assembly 170 may be constructed for filtration of particulates considered to be fine or small for a target flow rate, and the preliminary filter 150 may be constructed for filtration of particulates considered larger (e.g., 30-500 microns) at the target flow rate. Without the preliminary filter 150, such larger particles might clog or reduce the effective filtration of the filter assembly 170 and its effective life. The preliminary filter 150 in one embodiment may be configured to provide enhanced filtration aspects. For instance, the preliminary filter 150 may include a cleaning performance enhancement or configured to filter select contaminants (e.g., by the physical construction of the preliminary filter 150 or the type of filtration media used in the preliminary filter 150). In one embodiment, the preliminary filter 150 may be absent from the filter set 156, such as in the case where incoming water quality is not considered to require the use of the preliminary filter 150.

Figure 8:
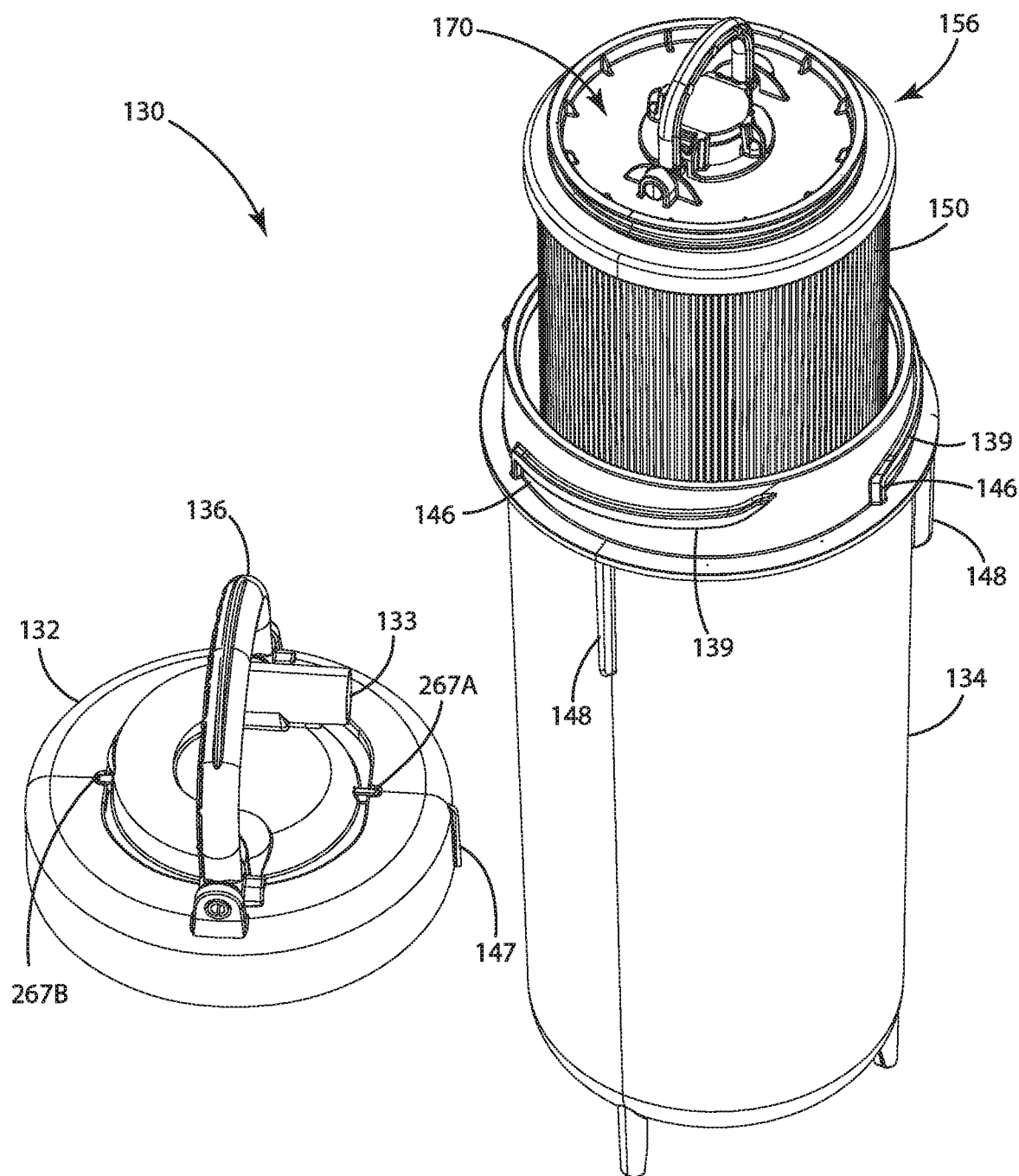
FIG. 8 shows the treatment assembly of FIG. 7 with a master filter assembly or filter set partially removed from the vessel.
Figure 9:
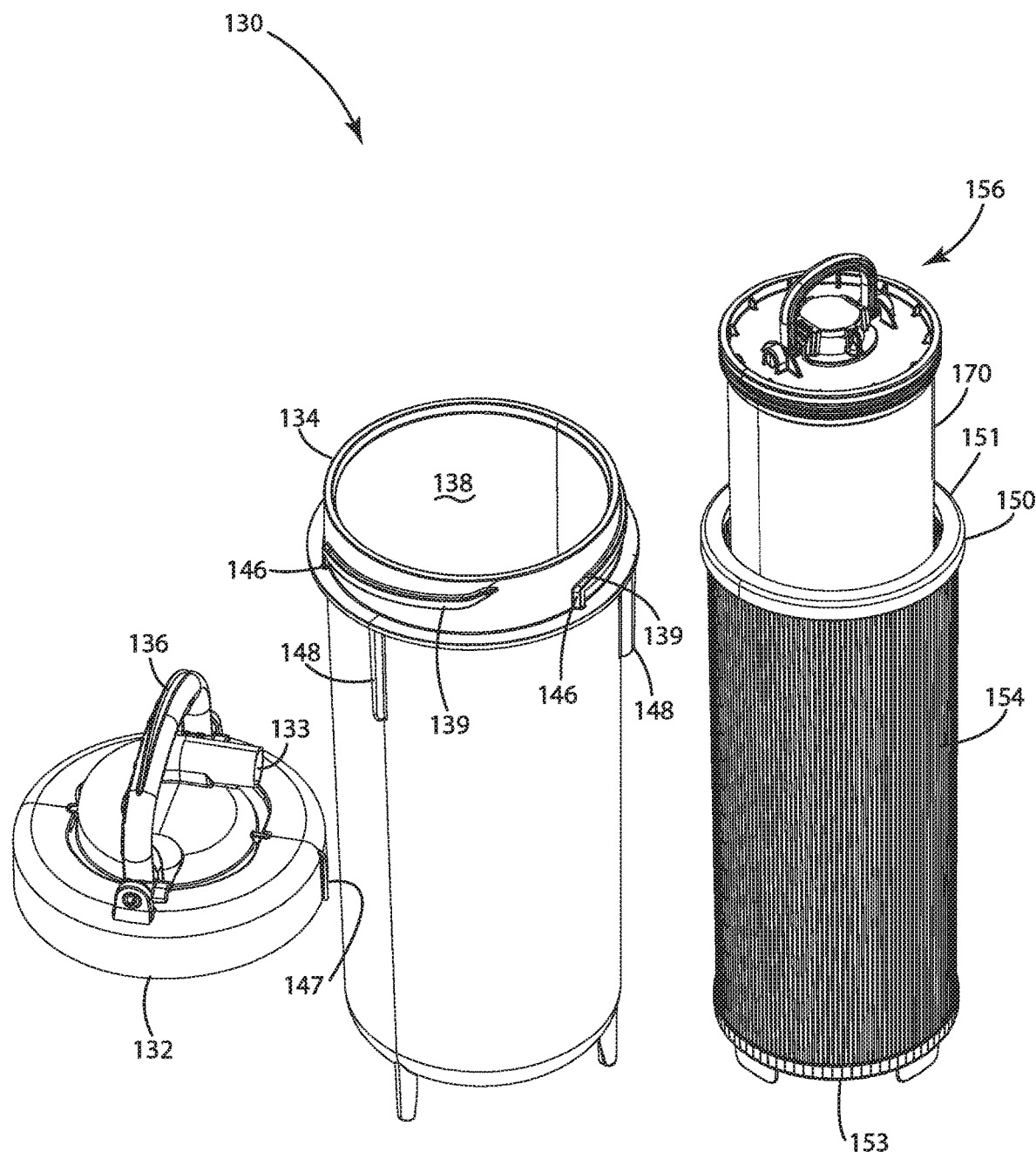
FIG. 9 shows the treatment assembly of FIG. 8 with the preliminary filter removed from the vessel and a filter assembly partially removed from the master filter assembly or filter set.

The preliminary filter 150 in the illustrated embodiment of FIGS. 8-10 includes an upper retainer 151 and a lower retainer 153 configured to support a preliminary filtration media 154 and define a preliminary filter opening 152. Optionally, one or both of the upper and lower retainers 151, 153 may form seals against outer surfaces of the filter assembly 170, with the filter assembly 170 disposed within the preliminary filter opening 152, to substantially prevent the untreated water entering the treatment assembly 130 from bypassing the preliminary filter 150 and passing directly to the filter assembly 170.

The filter assembly 170 is depicted in further detail in the illustrated embodiment of FIGS. 8-10, and can be seen being disposed within and removed from the opening 138 of the vessel 134, as well as being disposed within and removed from opening 152 of the preliminary filter 150. The filter assembly 170 and the preliminary filter 150 may enable filtration of untreated water received via the treatment assembly inlet 131 into the vessel 134 and discharge of the treated water via filter assembly outlet 172. The untreated water or water that has traversed the preliminary filter 150 may enter the filtration media 171 of the filter assembly 170.

The filtration media 171 of the filter assembly 170 may include a carbon block filter operable to adsorb or filter (or both) particulates and contaminants included in the water so that water discharged from the filtration media 171 is considered filtered and ready for downstream disinfection by the UV reactor 380. In one embodiment, the filtration media 171 may include a carbon block filter with an outer wrap that provides support for the carbon block.

The filter assembly 170 may include an upper end cap 175 and a lower end cap 174 with the filtration media 171 disposed therebetween. The filter assembly 170 in the illustrated embodiment may form a cylindrical filter with an internal void 270 (shown as a cylindrical void in the illustrated embodiments of FIGS. 18 and 21) defined internally and in fluid communication with the filter assembly outlet 172. The internal void 270 may not be cylindrical, and may be configured differently. Water treated by the filter assembly 170 may be discharged through the internal void 270 to the filter assembly outlet 172.

In the illustrated embodiment, the lower end cap 174 is adhered or affixed to a lower surface of the filtration media 171 to seal the internal void 270 relative to an exterior of the filter assembly 170 such that untreated water passes through the filtration media 171 of the filter assembly 170 prior to being discharged to the filter assembly outlet 172 via the internal void 270. The lower end cap 174 may include a plurality of spacer elements 176 extending radially from a central axis of the filter assembly 170, as described herein.

In one embodiment, described in conjunction with FIG. 27, a filter assembly 170' may include spacer elements 176' that may facilitate centering or alignment of the filter assembly 170' within the opening 138' or void of the vessel 134'. The spacer elements 176' may substantially align the central axis of the filter assembly 170' with the central axis of the vessel 134', thereby maintaining a space between the outer wall of a preliminary filter 150' (or outer wall of the filter assembly 170') and the inner wall of the vessel 134' in which untreated water may flow and enter filtration media 171'.

In the illustrated embodiment of FIGS. 8-10, the spacer elements 176 (e.g., spacers) may be configured to contact a bottom interior surface of the vessel 134 and to define a gap between the lower end cap 174 and the bottom interior surface in order to enable flow of water from the treatment assembly inlet 131 through the space provided between the outer wall of the filter assembly 170 and the inner wall of the vessel 134. This way, water may enter the vessel 134 via the treatment assembly inlet 131 and flow through the space, the preliminary filter 150, and then the filtration media 171 to the internal void 270 of the filter assembly 170 for discharge through the filter assembly outlet 172. The lower end cap 174, in one embodiment, may be formed of a rigid material to resist compression in response to engagement with an interior of the closure assembly 132 as the closure assembly 132 is rotated to fully engage the vessel 134. Resistance to such compression may facilitate maintenance of one or more compression seals of the treatment assembly 130 as described herein.

In an alternative embodiment, the lower end cap 174 may be formed of an elastomer that provides spring pressure upward to facilitate a seal with respect to the upper end cap 175 and the closure assembly 132. The elastomeric structure may optionally provide shock absorption to assist with handling and shipping hazards.

The upper end cap 175 may be adhered or affixed to an upper surface of the filtration media 171, similar to the lower end cap 174 and the lower surface of the filtration media 171, to substantially prevent untreated water from entering the internal void between the lower and upper end caps 174, 175, with the understanding that the upper end cap 175 forms a watertight interface with another component (e.g., the closure assembly 132) to prevent flow of untreated water via the filter assembly outlet 172 into the internal void.

In the illustrated embodiment, the upper end cap 175 includes a seal interface 173 or watertight interface configured to engage a seal interface of the closure assembly 132. The seal interface 173, as discussed herein, may substantially prevent untreated water from bypassing the filter assembly 170 and being discharged via the closure assembly 132 without passing through the filtration media 171.

The filter assembly 170' may be similar to the filter assembly 170 in several respects including an upper end cap 175', a lower end cap 174', a filter assembly outlet 172', filtration media 171', and an internal void 270', similar in many ways to the upper end cap 175, the lower end cap 174, the filter assembly outlet 172, the filtration media 171 and the internal void 270 of the filter assembly 170. For instance, the upper end cap 175' and the lower end cap 174' may be affixed respectively to upper and lower portions of the filtration media 171', which defines an internal void 270 through which water treated by the filtration media 171' may be discharged to a filter assembly outlet 172'. This configuration of the filter assembly 170' may be seen in the illustrated embodiment of FIGS. 27-28, with the filter assembly 170' including spacer elements 176' extending radially relative to a central axis of the filter assembly 170' and configured to define a space between the lower end cap 174' and a lower surface of the vessel 134' to allow water to flow between the lower surface of the vessel 134' toward the peripheral surface of the filtration media 171'.

The seal interface 173 of the filter assembly 170 is shown in further detail in the illustrated embodiment of FIG. 18, as described in further detail herein, and is a radial seal. The radial seal may be provided in the form of an O-ring in the illustrated embodiment, although the present disclosure is not so limited. The O-ring (e.g., a Buna N O-ring or Nitrile O-ring, EPDM rubber O-ring, Silicone O-Ring, or other type of O-ring material) may be configured to provide a watertight seal in conjunction with the vessel interface 240 of the closure assembly 132, defining a seal between a) water flowing into the treatment assembly 130 via the treatment assembly inlet 131 toward the preliminary filtration media 154 and b) water being discharged from the filter assembly outlet 172 into a fluid receiving space 268 of the treatment assembly 130.

Figure 22:
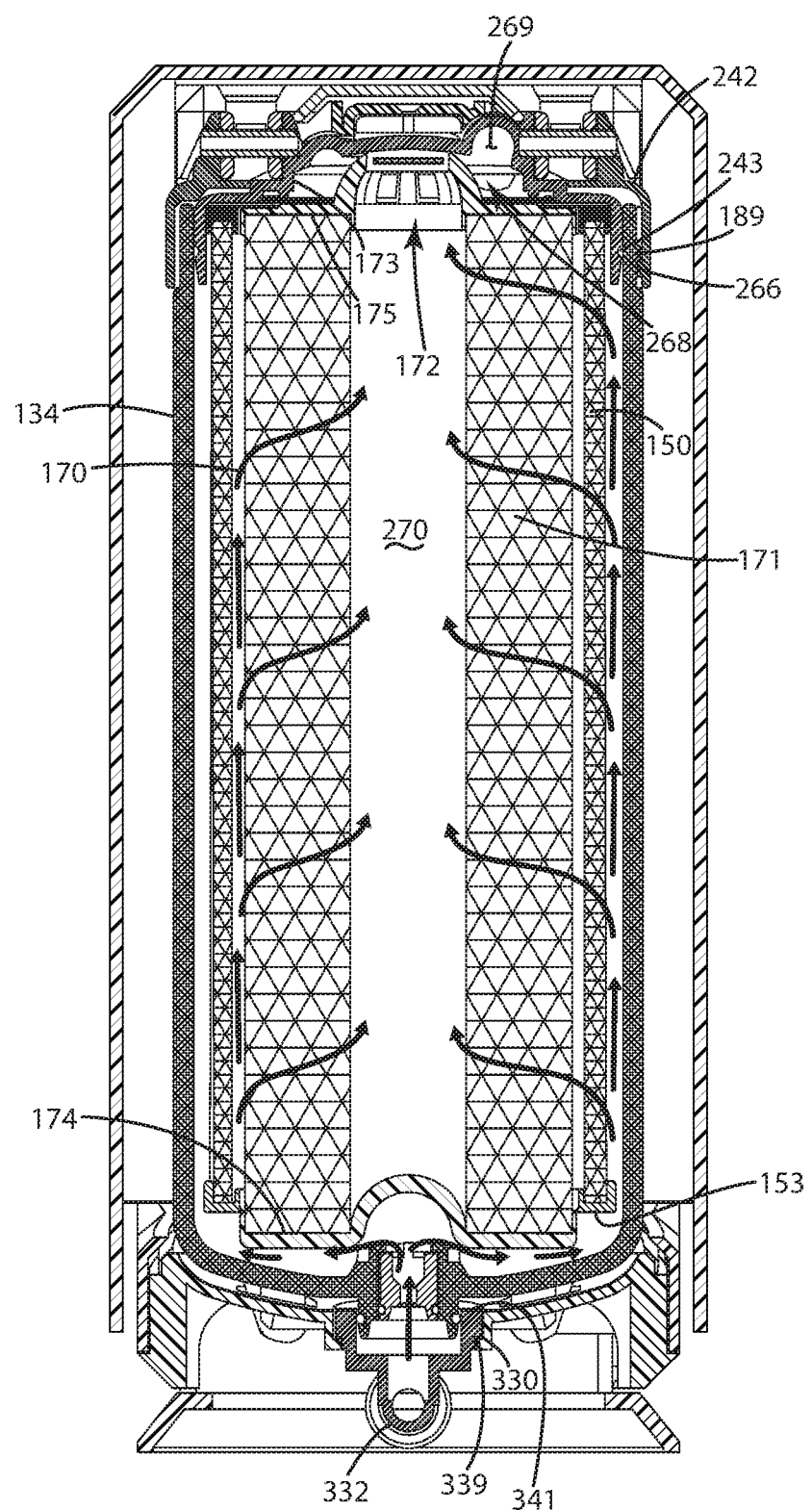
FIG. 22 shows a sectional view of the treatment assembly in accordance with an alternative embodiment.
Figure 23:
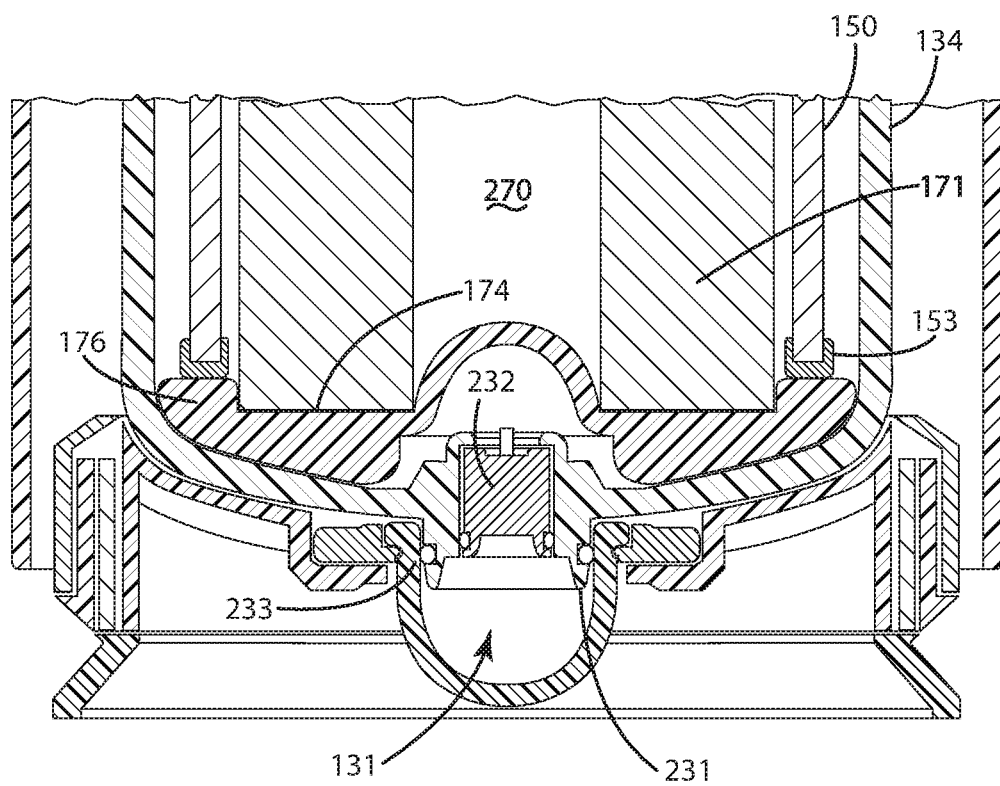
FIG. 23 shows a partial sectional view of the treatment assembly in accordance with an alternative embodiment.
Figure 24:
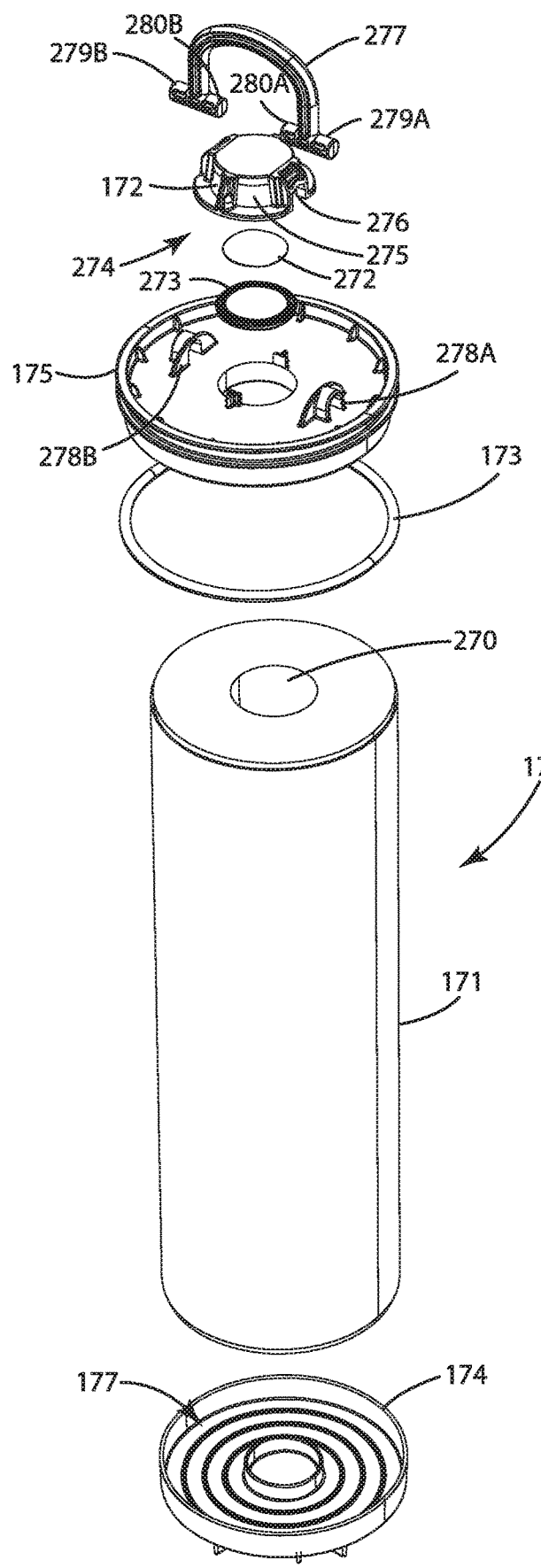
FIG. 24 depicts an exploded view of a filter assembly in accordance with one embodiment.
Figure 25A:
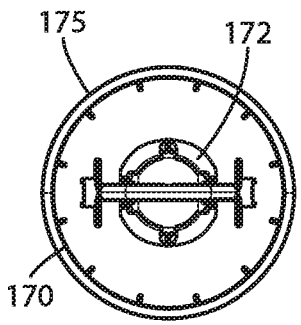
FIGS. 25A-B show the filter assembly of FIG. 24 respectively in a top view and a top perspective view.
Figure 25B:
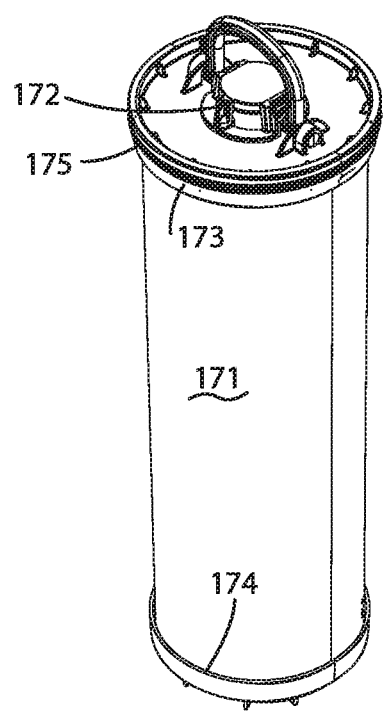
Figure 26A:
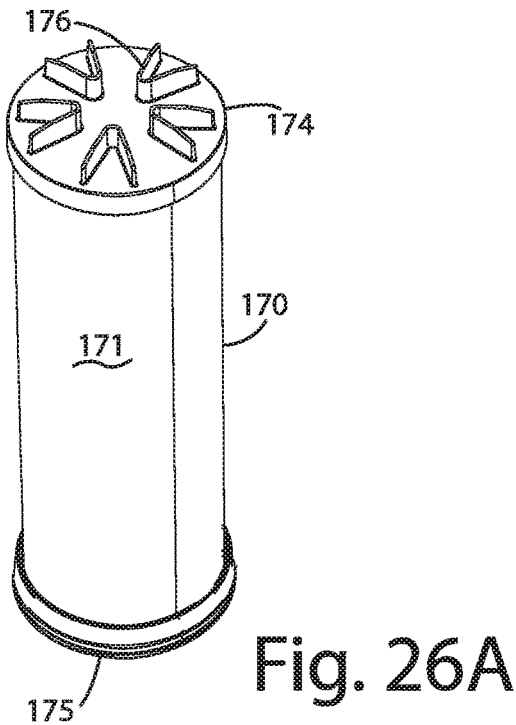
FIGS. 26A-D show the filter assembly of FIG. 24 respectively in a front view, a bottom, rear perspective view, a right side view, and a bottom view.
Figure 26B:
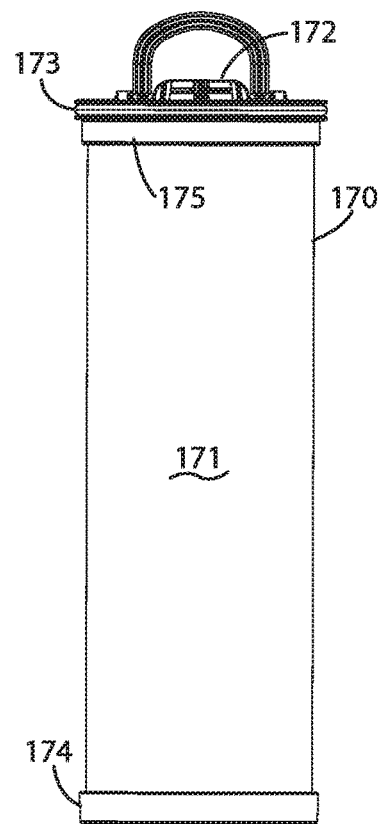
Figure 26C:
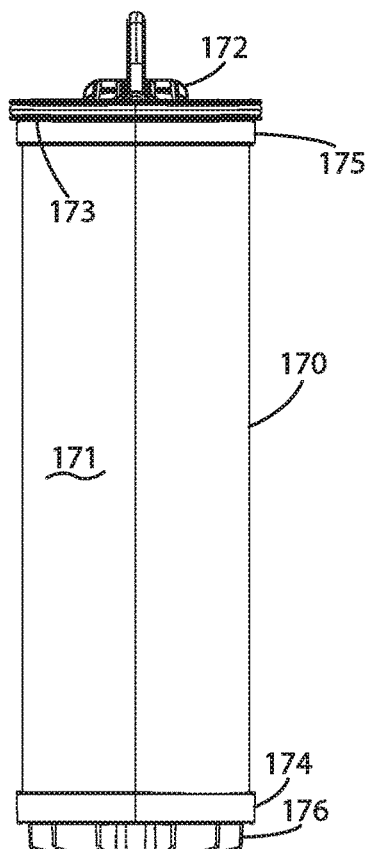
Figure 26D:
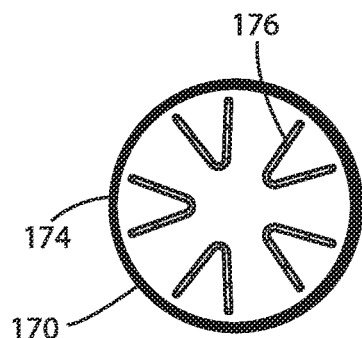
Figure 29:
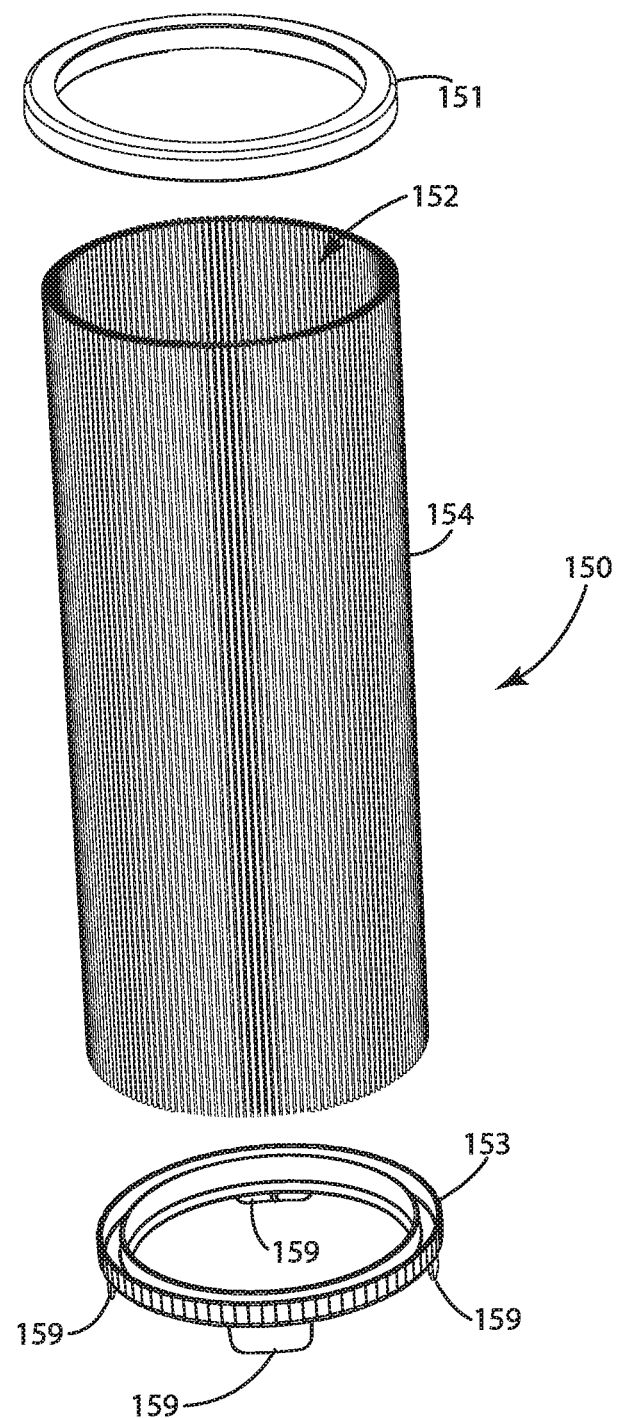
FIG. 29 shows an exploded view of a preliminary filter in accordance with one embodiment.
Figure 30A:
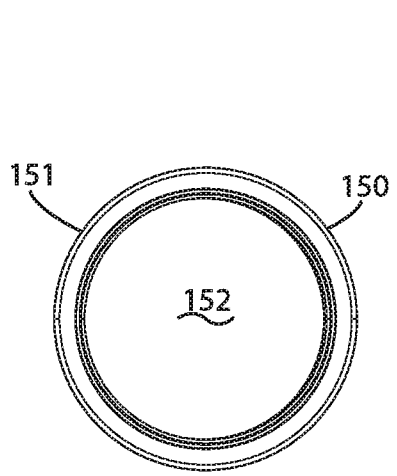
FIGS. 30A-D show the preliminary filter of FIG. 29 respectively in a top view, a front perspective view, a front view, and a bottom view.
Figure 30B:
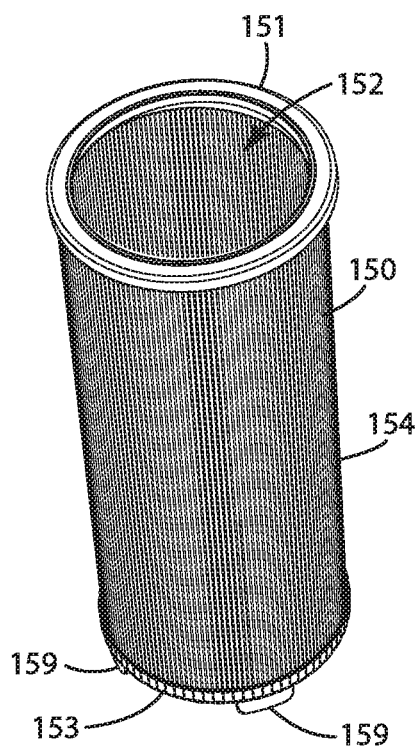
Figure 30C:
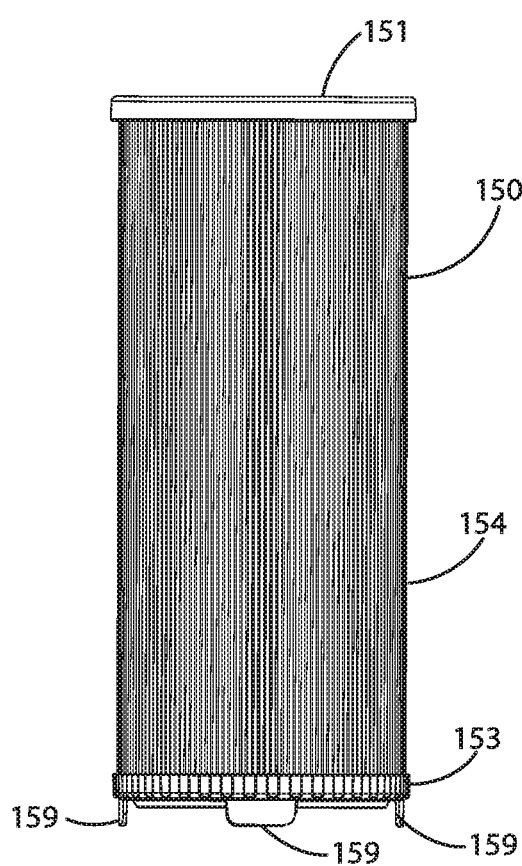
Figure 30D:
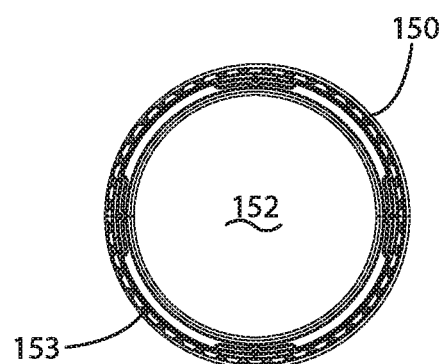
Figure 31:
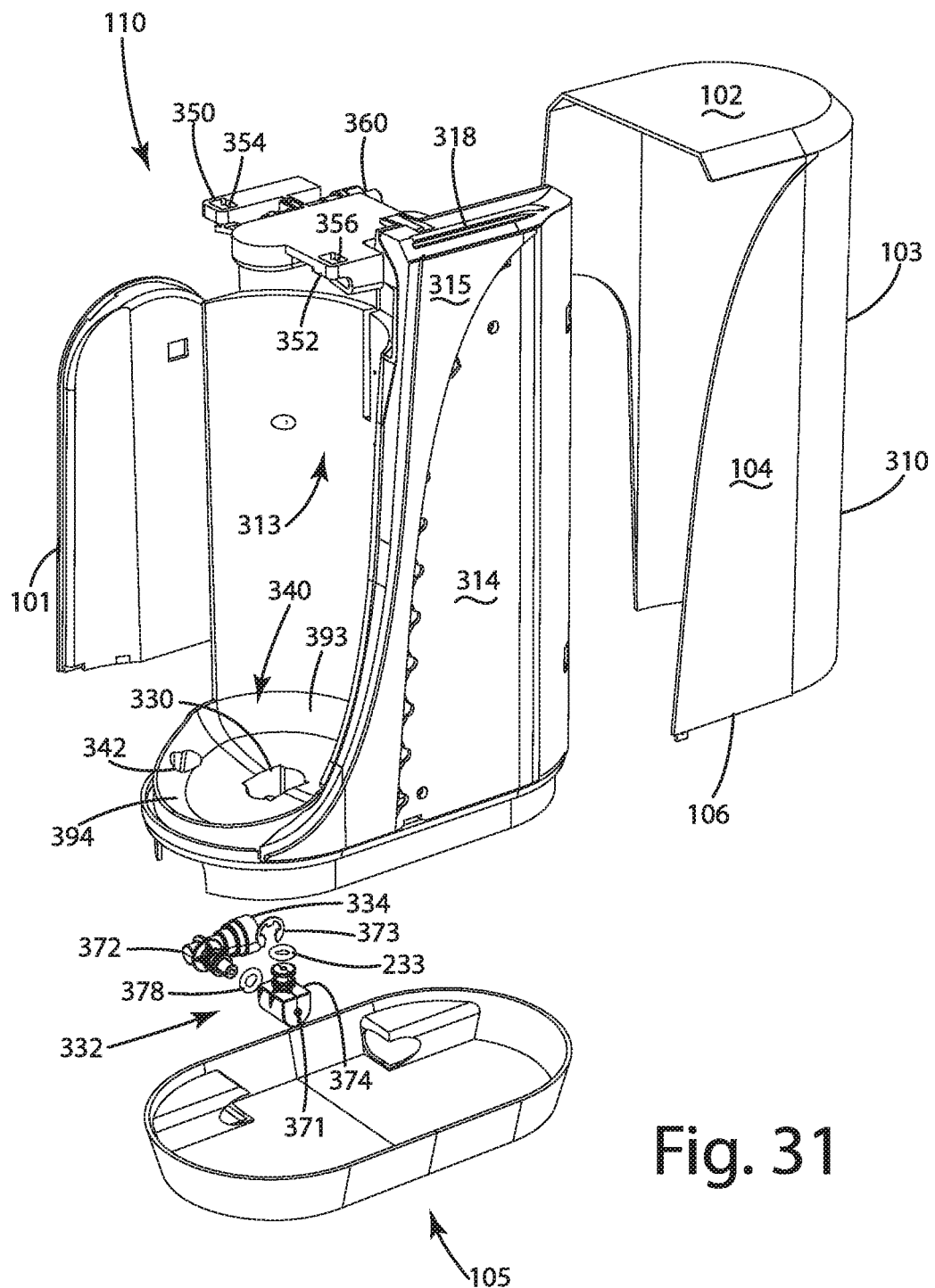
FIG. 31 shows an exploded view of a base assembly in accordance with one embodiment.

In an alternative embodiment, shown for instance in the illustrated embodiment of FIGS. 22-23, the filter assembly 170' may include a seal interface 173' having an annular ridge extending from the upper surface of the upper end cap 175' that interfaces with a seal interface of the closure assembly 132' to form a watertight seal. In one embodiment, sealing between the closure assembly 132' and the vessel 134' is provided by an interface between a seal disposed on a male detail of a tank interface part of the closure assembly 132' that engages an interior of the vessel 134'. The annular ridge or annular seal, or both, may be provided via a separate component operable to engage the upper surface of the upper end cap 175' and the closure assembly 132' to form a watertight seal.

In the illustrated embodiment of FIGS. 5-10 and 11A-H, the preliminary filter 150 and the filter assembly 170 may form a filter set 156 with the filter assembly 170 being disposed within the preliminary filter opening 152 of the preliminary filter 150, which may define a void that extends within the preliminary filtration media 154 and between upper and lower retainers 151, 153. The filter set 156 in the illustrated embodiment has no orientation requirement (e.g., it can be rotated at any degree) with respect to being disposed within the opening 138 of the vessel 134. The filter set 156 and vessel 134 may facilitate drop-in installation of the filter set 156 within the vessel 134. The filter assembly 170' may be configured similarly in conjunction with the preliminary filter 150' to allow for installation within the vessel 134' with no orientation requirement.

It is to be understood that, in one embodiment, there is no requirement to replace the filter set 156 as a single entity during maintenance operations. Portions of the filter set 156 may be removed separately from the vessel 134 for maintenance. For example, the preliminary filter 150 can be removed independently or as an assembly with the filter assembly 170. The independent removal capability with respect to the preliminary filter 150 may accommodate the typically shorter replacement cycle of the preliminary filter 150 relative to the replacement cycle of the filter assembly 170.

Figure 5:
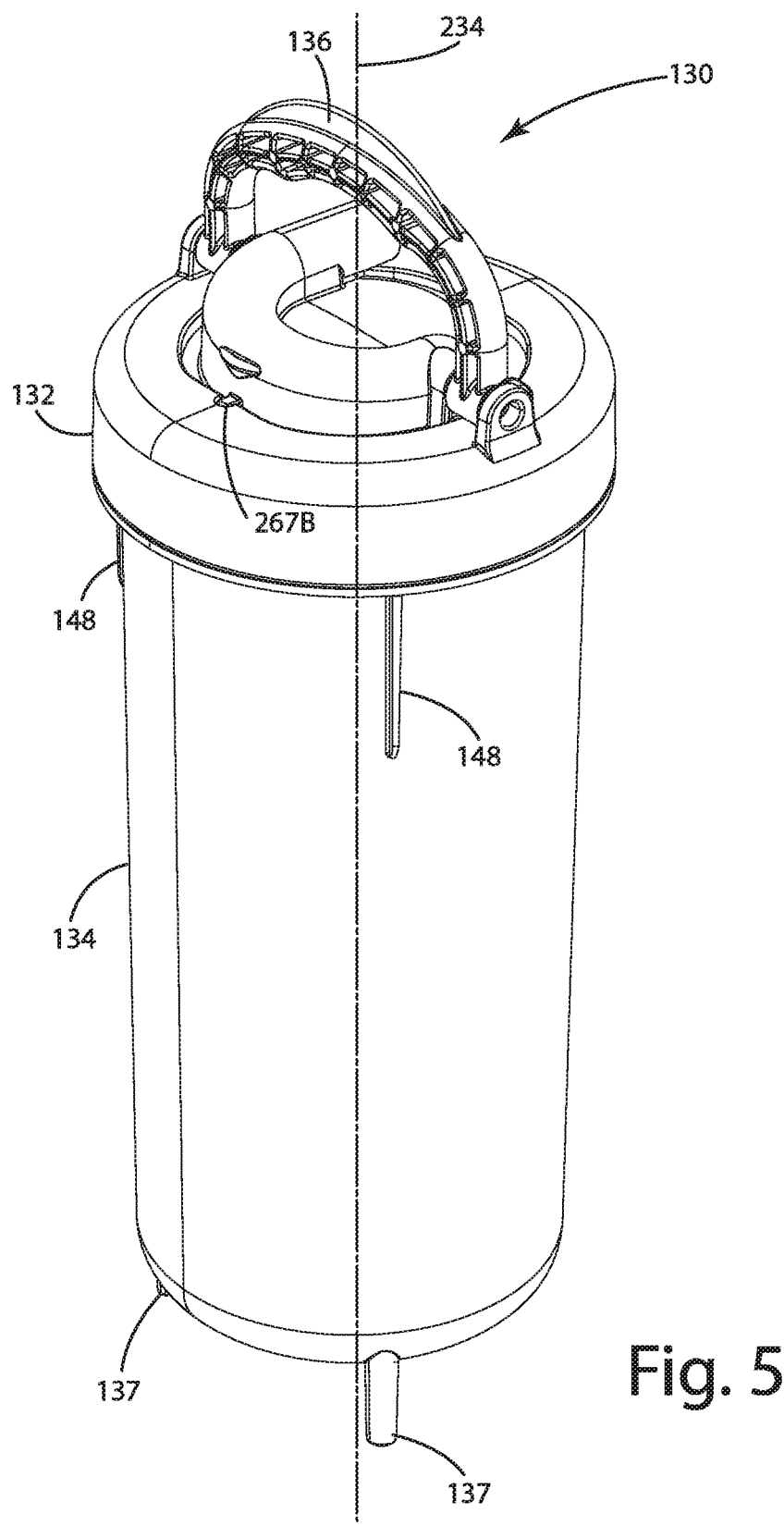
FIG. 5 depicts a perspective view of a treatment assembly in accordance with one embodiment.
Figures 6, 7:
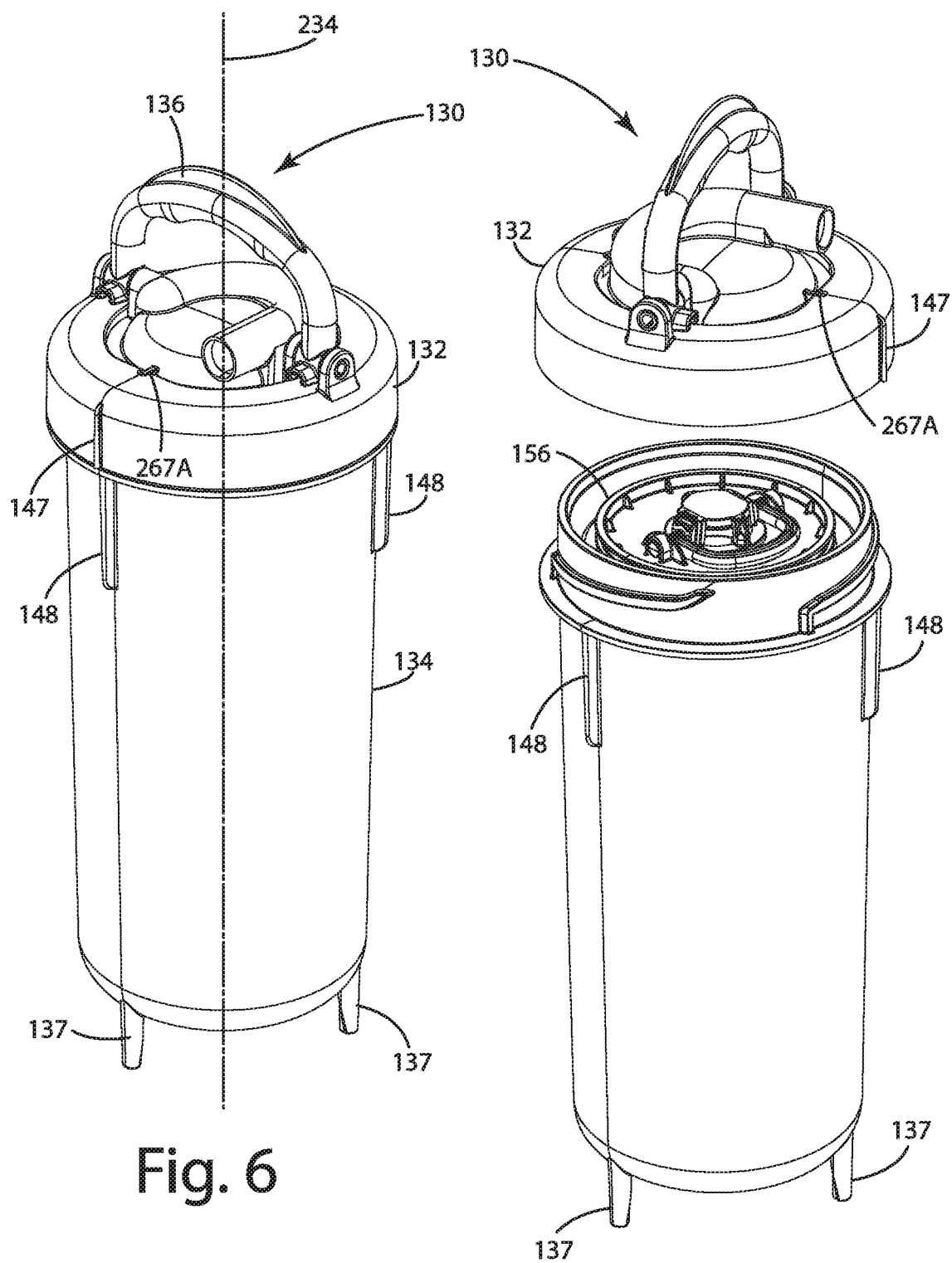
FIG. 6 depicts a perspective view of a treatment assembly in accordance with one embodiment.
FIG. 7 shows the treatment assembly of FIGS. 5-6 with a closure assembly removed from a vessel.

The treatment assembly 130 in the illustrated embodiment includes the closure assembly 132 shown in various modes of use relative to the vessel 134, including a closed position in FIGS. 5-6 and a removed position in FIG. 7 for access to the filter assembly 170 and the preliminary filter 150 disposed within the vessel 134. As described herein, the closure assembly 132 may close the opening 138 of the vessel 134, forming a watertight seal about the opening 138 of the vessel 134 and a watertight seal with the filter assembly 170 to enable treatment of water received via the treatment assembly inlet 131 without leakage of untreated water to the filter assembly outlet 172 past the seal formed between the closure assembly 132 and the seal interface 173 of the filter assembly 170.

In the illustrated embodiments of FIGS. 5-10 and 11A-H, the treatment assembly 130 is removable from the base assembly 110 for maintenance. The treatment assembly 130 may form a pressure vessel operable to treat water received under pressure via the treatment assembly inlet 131 and to discharge the treated water via a treatment assembly outlet 133 formed in the closure assembly 132. The closure assembly 132 in one embodiment may engage a plurality of ramped structures 139 (e.g., three elements) disposed about a perimeter of the vessel 134, such that the treatment assembly 130 (or removable pressure vessel) can be closed or rotated to the closed position by a one-third turn. The plurality of ramped structures 139 provide a plurality of start positions (e.g., three start positions) for closing the vessel 134 with the closure assembly 132 to rotate the closure assembly 132 to the closure position.

In the illustrated embodiment, the handle assembly 136 of the closure assembly 132 is constructed to provide a hand hold to twist the closure assembly 132 relative to the vessel 134 to disengage or reengage the plurality of ramped structures 139 of the vessel 134. In other words, the handle assembly 136 may facilitate rotation of the closure assembly 132 from the closure position to a removal position relative to the vessel 134 and enable access to the opening 138 of the vessel 134. The handle assembly 136 may also operate as a lift point to carry a closed form of the treatment assembly 130 as desired.

As discussed herein, removal of the closure assembly 132 from the vessel 134 may expose the filter set 156, including the preliminary filter 150 and the filter assembly 170, that is nested in the opening 138 of the vessel 134, standing on the bottom surface of the vessel 134. Optionally, the filter set 156 may be accessible above an upper edge of the vessel 134. In one embodiment, the upper part of the filter set 156 may be at least even with the upper edge of the vessel 134 so that when the closure assembly 132 is removed, a substantial amount of water does not spill from the vessel 134.

A. Vessel Assembly

Figure 12:
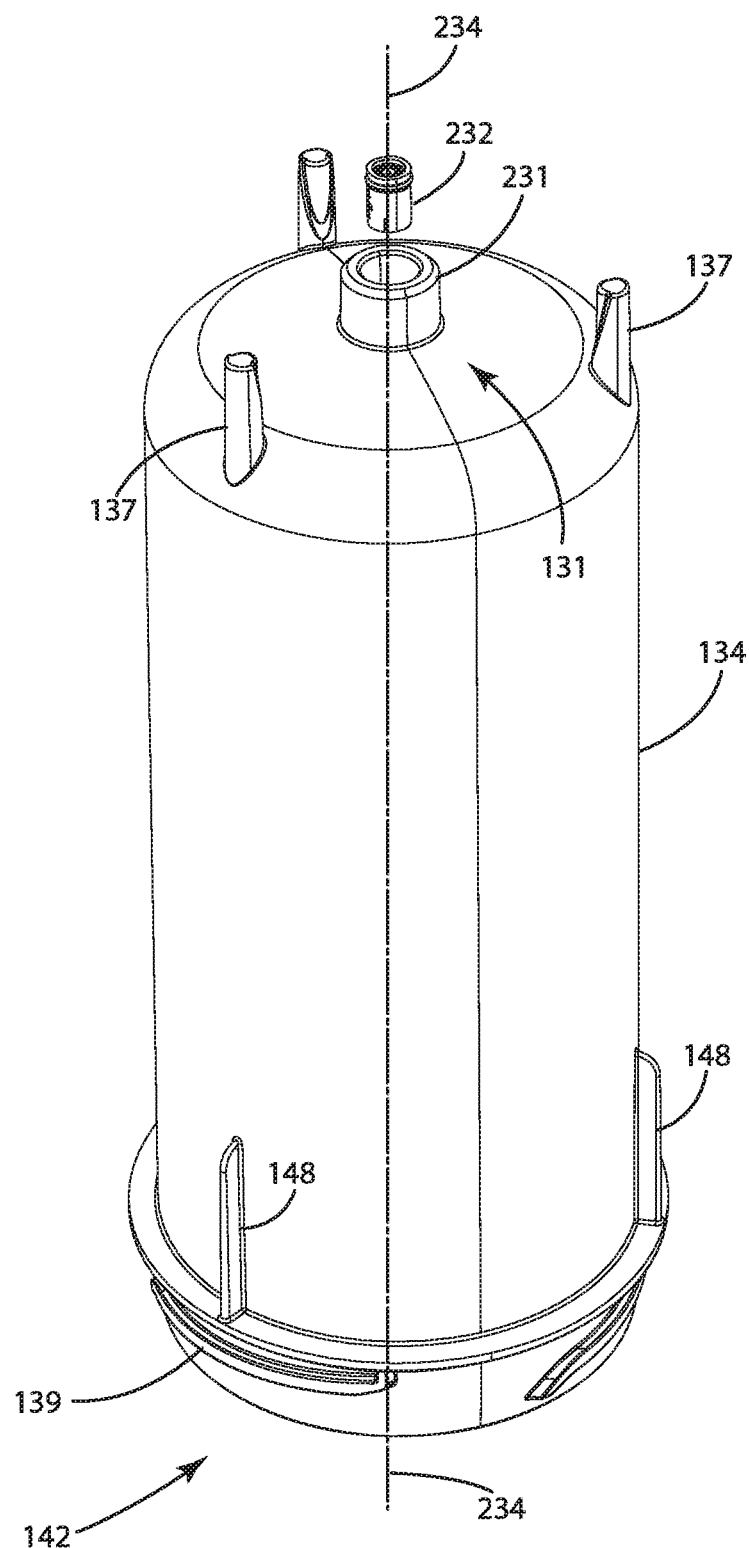
FIG. 12 shows an exploded view of the vessel assembly or treatment assembly in accordance with one embodiment.

The vessel 134 in accordance with one embodiment of the treatment assembly 130 is shown in further detail in the illustrated embodiment of FIG. 12. The vessel 134 includes the upper part 142, the lower part 141, and the plurality of alignment members 137 extending from the lower part 141. The vessel 134, as described herein, includes the treatment assembly inlet 131 operable to form a watertight seal in conjunction with the base assembly 110 to facilitate receipt of untreated water in the treatment assembly 130. The treatment assembly inlet 131 includes a water inlet coupler 231 configured to engage a water supply coupler 332 of the base assembly 110.

An alternative embodiment of a vessel is shown in FIG. 13, and generally designated 134'. The vessel 134' includes an upper part 142', a lower part 141', and a plurality of alignment members 137' extending from the lower part 141', similar respectively to the upper part 142, the lower part 141, and the alignment members 137 of the vessel 134. The vessel 134' also includes a treatment assembly inlet 131' similar in some respects to the treatment assembly inlet 131. The treatment assembly inlet 131' includes a water inlet coupler 231' configured to engage a water supply coupler 332' of the base assembly 110'. The vessel 134' may include a vessel seal 233' provided to cooperate with the water inlet coupler 231' to form a watertight seal with the water supply coupler 332' of the base assembly 110'. The vessel seal 233' is shown both separate from and in place relative to the water inlet coupler 231' for purposes of discussion.

In the illustrated embodiment of FIG. 13, the vessel 134' includes a check valve 232', or check regulator, disposed in the flow path of the treatment assembly inlet 131'. For purposes of discussion, the check valve 232' in the illustrated embodiment is shown separate from the treatment assembly inlet 131' and positioned within the flow paths of the treatment assembly inlet 131'.

As discussed herein, the alignment members 137' of the vessel 134' may include a leg portion 143' and a foot portion 145' operable to enhance alignment and stability with respect to the base assembly 110'.

The vessel 134, 134' in the illustrated embodiments of FIGS. 12-13 are shown with the ramped structures 139, 139' and stops 146, 146' as described herein and disposed proximal to the lower part 142, 142'.

In the illustrated embodiment of FIG. 12, the vessel 134 includes a check valve 232, or check regulator, disposed in the flow path of the treatment assembly inlet 131.

The vessel 134 in accordance with one embodiment provides a modular configuration with respect to its central axis 234. For instance, in the illustrated embodiment, the vessel 134 includes three identical or substantially similar alignment members 137 that provide a keyed aspect for locating the treatment assembly 130 relative to the base assembly 110. This way, a user that removes the treatment assembly 130 from the base assembly 110 for maintenance can easily find the correct location for alignment between the treatment assembly 130 and the base assembly 110, thereby reducing the learning curve for maintenance, particularly if maintenance is conducted periodically over a span of months. The alignment members 137' of the vessel 134' may be arranged in a similar manner with respect to a central axis 234' of the vessel 134' and the lower part 141' thereof.

In one embodiment, the treatment assembly inlet 131 may be configured to limit or regulate flow of water from the base assembly 110. Such regulation may substantially protect the filtration and disinfection components of the water treatment system 100. A flow regulator for the treatment assembly inlet 131 may be embedded in the water inlet coupler 231 (also described herein as an inlet connector). In one embodiment, the check valve 232, 232' may operate as a flow regulator as well as a backflow preventer for the treatment assembly 130, 130'.

B. Closure Assembly

The closure assembly 132 is shown in further detail in the illustrated embodiment of FIGS. 14 and 17A-H. The closure assembly 132 includes a handle assembly 136 that can be rotated between an operable position 261 and a engaged position 262 (also described herein as a stowed position), shown in FIGS. 1E and 17G. The handle assembly 136 may facilitate engaging the treatment assembly 130 to the base assembly 110 as well as removal of the closure assembly 132 from the vessel 134.

The closure assembly 132 in the illustrated embodiment includes a collar 242 (also described as a tank collar) and a vessel interface 240 (also described as a tank interface). The collar 242 and the vessel interface 240 may include corresponding supports 246, 247 (e.g., a tab or integral support) having apertures operable to accept a handle pin 248. The handle assembly 136 may include a closure aperture 249 operable to rotatably couple to the supports 246, 247 in conjunction with the handle pin 248. In the illustrated embodiment, the handle pin 248 may slide through the aperture or opening of the support 246 of the collar 242, through the aperture 249 of the handle assembly 136 and through the aperture of the support 247 of the vessel interface 240. The handle pin 248 may be sized to provide an interference fit with respect to the apertures of the supports 246, 247, while allowing free rotation about the handle pin 248 with respect to surfaces of the aperture 249 of the handle assembly 136. This way, the handle pin 248 and the handle assembly 136 can be secured to the collar 242 and the vessel interface 240.

In the illustrated embodiment, as described herein, the handle assembly 136 may include a releasable coupling 263 operable to latch or engage one or more components of the base assembly 110 to hold or maintain the treatment assembly 130 in place for use in conjunction with the base assembly 110. The releasable coupling 263 may facilitate formation of watertight connections between the treatment assembly 130 and the base assembly 110, including a watertight coupling between the treatment assembly inlet 131 and a water supply coupler 332 of the base assembly 110 and a watertight coupling between the treatment assembly outlet 133 and a treated water inlet 362 of the base assembly 110.

The releasable coupling 263 in the illustrated embodiment is integral to the handle assembly 136; it is to be understood, however, that the releasable coupling 263 may be separate from the handle assembly 136 (e.g., incorporated into one or more aspects of the treatment assembly 130 other than the handle assembly 136), or aspects or components of the releasable coupling 263 may be incorporated into the handle assembly 136 and other aspects or components of the releasable coupling 263 may form part of the treatment assembly 130 other than the handle assembly 136.

The releasable coupling 263 in the illustrated embodiment of FIGS. 14 and 17A-H includes engagement members 271 that, in conjunction with the handle assembly 136, are operable to interface respectively with first and second catches 354, 356 of the first and second base receivers 350, 352 of the base assembly 110. The first and second catches 354, 356, as described herein, may respectively provide a) an opening which may receive an engagement member 271 and b) a retainer member that interfaces with the engagement member 271 to facilitate connection of the base assembly 110 to the treatment assembly 130.

The closure assembly 132 in the illustrated embodiment shows the engagement member 271 in further detail and operable to pivot upward about the handle pin 248 in response to rotation of the handle assembly 136 from the operable position 261 toward the engaged position 262. Each engagement member 271 may interface with a catch 354, 356 as the engagement rotates upward about the handle pin 248 and pulls the catch 354, 356 toward the handle assembly 136 in response to further rotation of the engagement member 271. With the handle assembly 136 in the engaged position 262, shown in FIG. 1E, the engagement member 271 is positioned substantially vertical (or optionally rotating past vertical to form an acute angle relative to a top surface of the closure assembly 132) to substantially prevent lateral movement of the closure assembly 132 relative to the base assembly 110, thereby maintaining substantial alignment between the central axis 234 of the closure assembly 132 and a longitudinal axis of the base assembly 110.

The closure assembly 132 in the illustrated embodiment includes first and second key elements 255A-B operable to interface respectively with first and second receiving elements 267A-B. The first and second key elements 255A-B in conjunction with the first and second receiving elements 267A-B provide for alignment of the vessel interface 240 with respect to the aperture 257 of the collar 242. In the illustrated embodiment, the first key element 255A and the first receiving element 267A are different sizes than the second key element 255B and the second receiving element 267B, such that the collar 242 does not mate with the vessel interface 240. In other words, the first receiving element 267A may not accept the second key element 255B and/or the second receiving element 267B may not accept the first key element 255A.

In the illustrated embodiment, the closure assembly 132 includes a closure assembly registration element 147 that is aligned with the first and second receiving elements 267A-B. The closure assembly registration element 147 may align with one or more registration elements 148 of the vessel 134 in order to provide a visual indication to the user that the closure assembly 132 and the vessel 134 are engaged.

In an alternative embodiment depicted in FIGS. 15-16, a closure assembly 132' is shown in further detail. The closure assembly 132' may be similar to the closure assembly 132 but with several exceptions, including a different construction for a releasable coupling 263' for engagement and disengagement of a different coupling type to the base assembly 110'. The closure assembly 132' may include a handle assembly 136' that may facilitate engaging the treatment assembly 130' to the base assembly 110' and removing the closure assembly 132' from the vessel 134'. The closure assembly 132' in the illustrated embodiment includes a collar 242' and a vessel interface 240' having corresponding supports 246', 247', which may include apertures operable to accept a handle pin 248'. The handle assembly 136', similar to the handle assembly 136, may include an aperture 249' operable to rotatably couple to the supports 246', 247' in conjunction with the handle pin 248'.

The handle assembly 136' of the closure assembly 132' may include a releasable coupling 263', which in the illustrated embodiment includes, for each end of the handle assembly 136', a cinch clip 251', a cinch pin 252', and a cinch spring 264'. An end of the cinch clip 251' distal from the handle assembly 136' may be operable to capture a base pin (not shown in FIGS. 15-16) as the handle assembly 136' is rotated from the operable position 261' to an engaged position 262' (also described as the stowed position). The cinch clip 251' may be rotatably coupled to the handle assembly 136' via the cinch pin 252' and the cinch pin aperture 253' of the handle assembly 136'. As the handle assembly 136' is rotated from the operable position 261' to the engaged position 262', the cinch clip 251' may contact the handle pin 248' over center, urge the handle assembly 136' into the engaged position 262', and provide tension on the distal end of the cinch clip 251' to substantially maintain and engage a base pin of the base assembly 110', thereby holding the base assembly 110' and the treatment assembly 130' in an engaged position.

To disengage the treatment assembly 130' from the base assembly 110', an operator may rotate the handle assembly 136' from the engaged position 262' toward the operable position 261'. As the cinch pin 252' moves with the handle assembly 136' and relieves the tension on the cinch clip 251', the cinch clip 251' moves laterally toward the base assembly 110' in order to facilitate disengagement of the base pin. Further, cinch springs 264' are provided to urge the cinch clip 251' to displace upwardly relative to the collar 242', further enabling the cinch clip 251' to clear the base pins of the base assembly 110' as the handle assembly 136' is further rotated toward the operable position. In the operable position, the handle assembly 136' is positioned such that the cinch clips 251' are clear of the base pin of the base assembly 110' and such that the closure assembly 132' may be moved laterally away from the base assembly 110'. With the cinch clip 251' clear of the base pins and the handle assembly 136' positioned in the operable position, the entire treatment assembly 130' can be tilted relative to the base assembly 110' for maintenance or removal from the base assembly 110'.

The handle assembly 136' (also described as a tank closure handle) may be positioned in the engaged position 262' (also described as a stowed position or a stored position) when the treatment assembly 130' is secured and properly engaged to the base assembly 110'. The construction of the handle assembly 136' and the releasable coupling 263', in one embodiment, may only allow installation of the treatment assembly 130' with the base assembly 110' to complete when the treatment assembly 130' is sealed and considered substantially safe. If the closure assembly 132' is not in the closed position, for instance, alignment between the alignment members 137' and the base assembly 110' may not yield an alignment position for the releasable coupling 263' to couple with the base assembly 110'.

The releasable coupling 263' in the illustrated embodiment includes a cinch clip system, as described herein. The over center action of the cinch clips 251' may latch and secure the treatment assembly 130' to the base assembly 110' or a frame assembly 313' (which is described herein as a part of the base assembly 110'). The cinch spring 264' in one embodiment may be operable to raise the cinch clips 251' to a disengaged position in response to the handle assembly 136' being raised to release the releasable coupling 263' (also described as an engagement mechanism). The handle assembly 136' may travel forward or to the engaged position 262' in order to lower the cinch clips 251' (also described as spring clips) to reengage the releasable coupling 263' to secure the treatment assembly 130' to the base assembly 110'. The cinch clips 251' may include distal ends relative to the handle assembly 136' with a hook that grasps or maintains a coupling to a base component (e.g., a base pin 351', 353' of the base assembly 110') under tension. Without tension and with the hook disengaged from the base component, the cinch clips 251' may enable the treatment assembly 130' to move freely relative to the base component.

Figure 55:
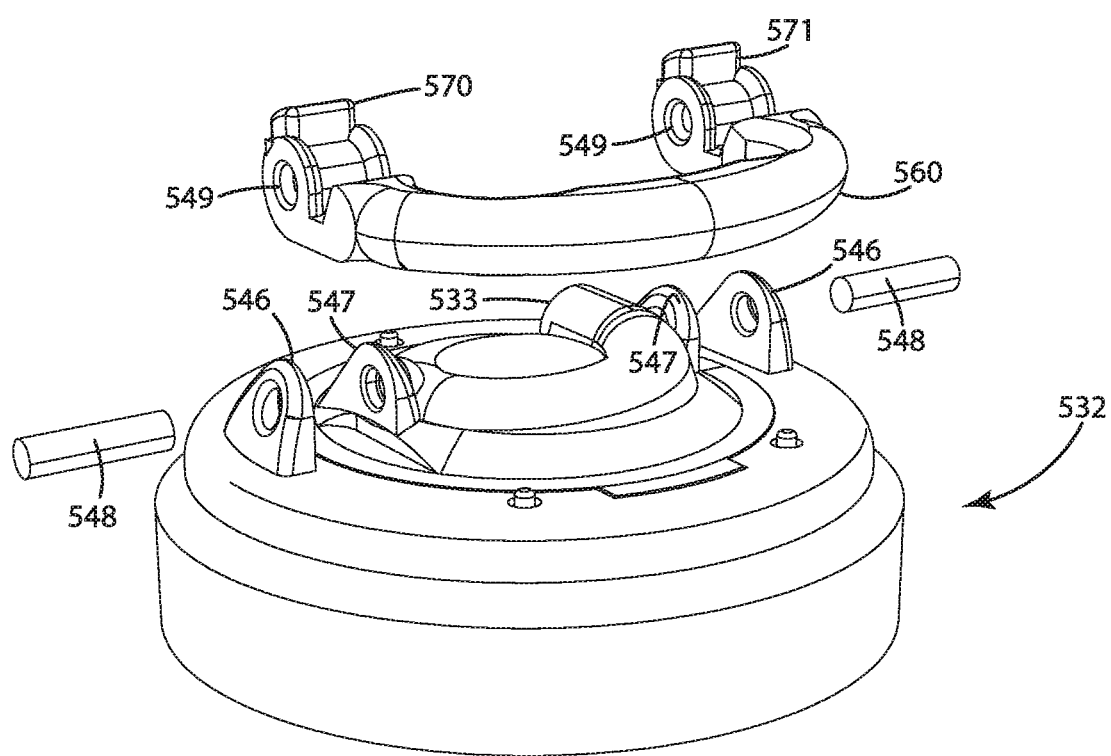
FIG. 55 depicts an exploded view of a closure assembly in accordance with one embodiment.
Figure 58:
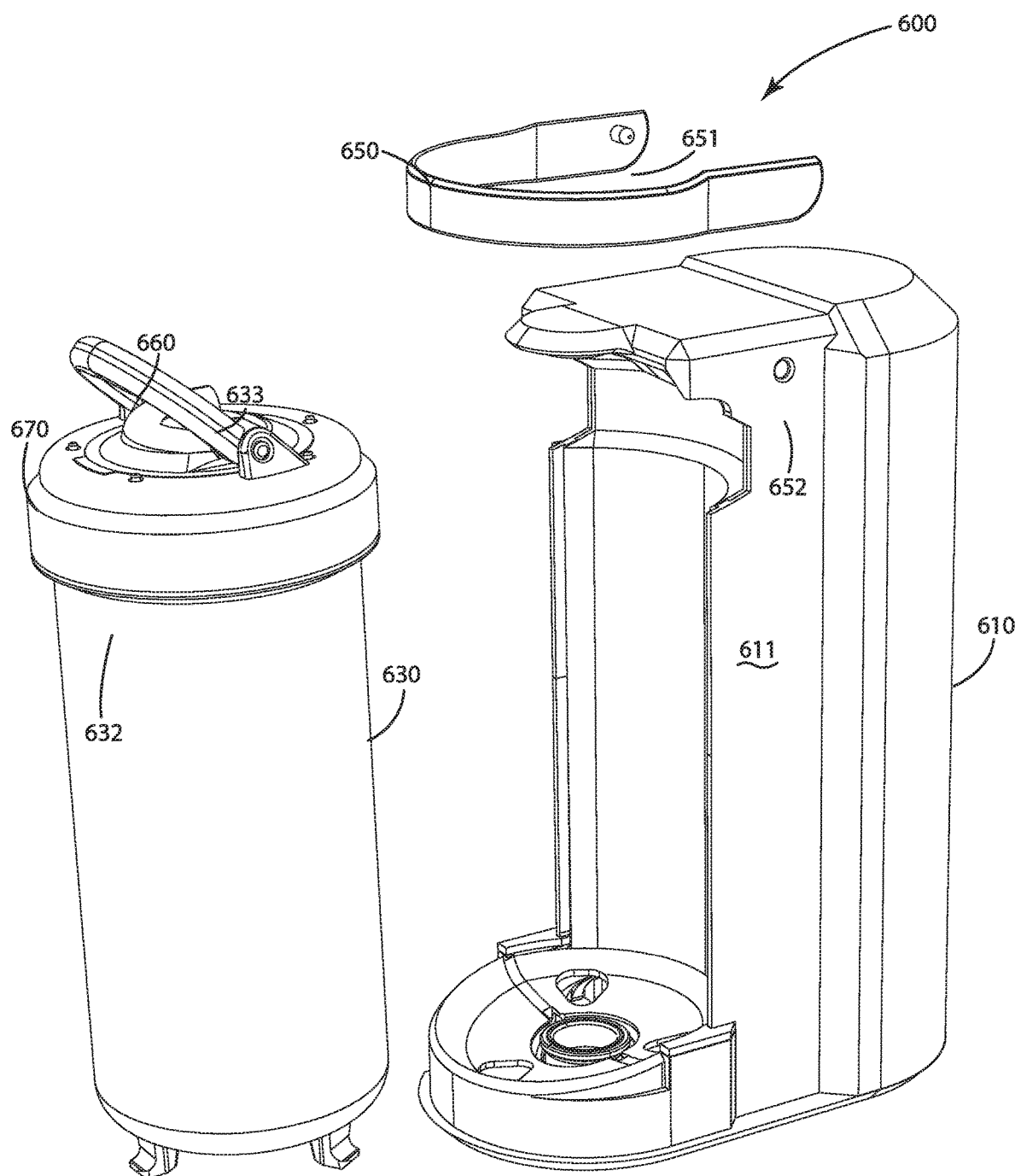
FIG. 58 shows a perspective view of a base assembly and a treatment assembly in accordance with one embodiment.

In an alternative embodiment depicted in FIG. 55, the releasable coupling 263 may be constructed with a lever bolt system. For instance, the handle assembly 136 may include an engagement element that rotates into a receiving feature on the frame assembly of the base assembly 110 that locks the assemblies securely together. Rotation of the handle up from its stored and secure position may disengage the lock feature. In a more specific version of this example, the engagement element may include a hook that rotates to capture the receiving feature and translates rotation of the handle assembly 136 into linear movement to securely hold together the treatment assembly 130 and the base assembly 110. One or more elements of the closure assembly 132, such as a latch, may substantially block or prevent release of the hook after the hook has engaged the receiving feature. These one or more elements may enable release of the hook in response to force applied by the end user to disengage the hook.

In another alternative embodiment depicted in FIGS. 56A-E, 57 and 58, the releasable coupling 263 may be constructed with a lock top system. In this embodiment, the water treatment system 100 may include an enclosing cap mounted to the frame assembly and operable to hinge down to engage a tank ring of the treatment assembly 130, capturing the treatment assembly 130 and locking it in place securely to its seat of the frame assembly. The handle assembly 136 of the closure assembly 132 may be constructed to pivot or fold, and may be located to enable the enclosing cap to seat properly, which may substantially ensure the proper engagement of the water passages of the assemblies. In one embodiment, the treatment assembly, as described herein in conjunction with the illustrated embodiments of FIGS. 56A-E, 57 and 58, may be constructed to substantially ensure correct positioning of the treatment assembly relative to the base assembly for engagement, and to facilitate engagement of the enclosing cap with the tank ring to substantially prevent unlocking rotation without effort from the end user (e.g., a friction fit may prevent unlocking without application of force from an end user).

It is noted that the loop feature or pivotable engagement structure 650 in conjunction with the lock top system may enable securement of the treatment assembly 130 in a manner resistant to pressure with the system trying to disengage the watertight seals.

In the illustrated embodiment of FIGS. 14 and 17A-H, the collar 242 includes a closure assembly stop 241 operable to engage the stop 146 of the vessel 134. The collar 242 may include one or more closure assembly ramps 266 corresponding in number to one or more of the ramped structures 139 of the vessel 134. As an example, the closure assembly ramps 266 and the ramped structures 139 of the vessel 134 may operate as a threaded coupling having one or more starts that facilitate translating rotational motion of the collar 242 into linear motion and engagement of the closure assembly 132 to the vessel 134. An alternative embodiment including the closure assembly 132', shown in FIGS. 15-16, also includes a collar 242' having a closure assembly stop 241' operable to engage the stop 146' of the vessel 134'. The closure assembly 132' may also include one or more ramps 266' corresponding in number to one or more of the ramped structures 139' of the vessel 134'.

Figure 14:
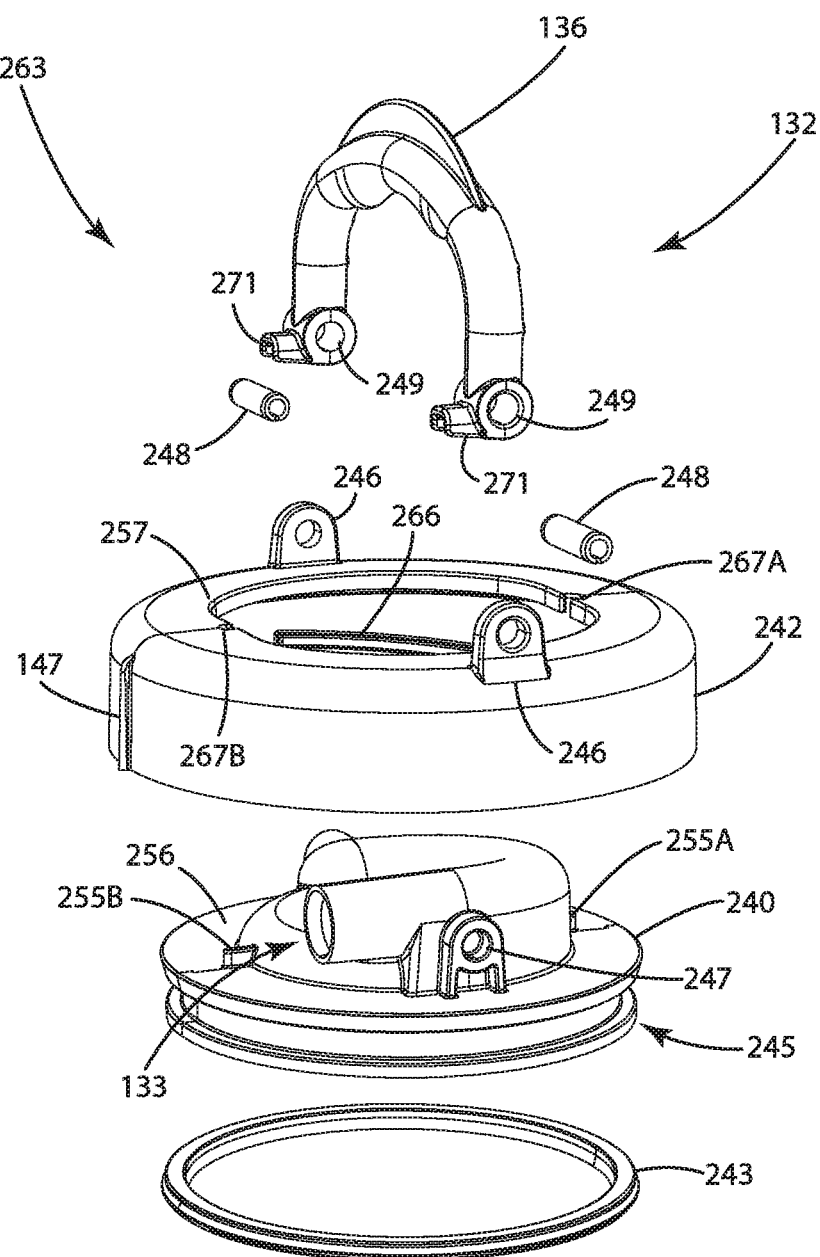
FIG. 14 shows an exploded view of a closure assembly in accordance with one embodiment.
Figure 32A:
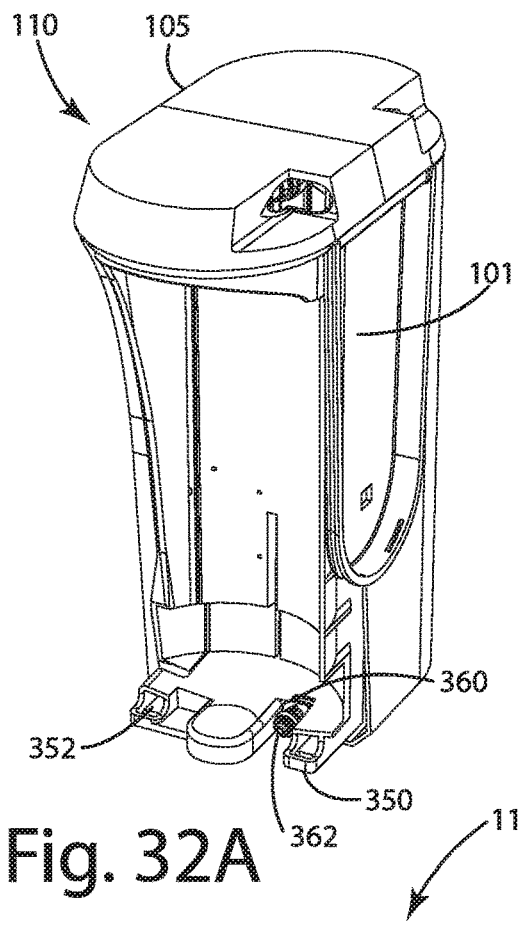
Figure 32B:
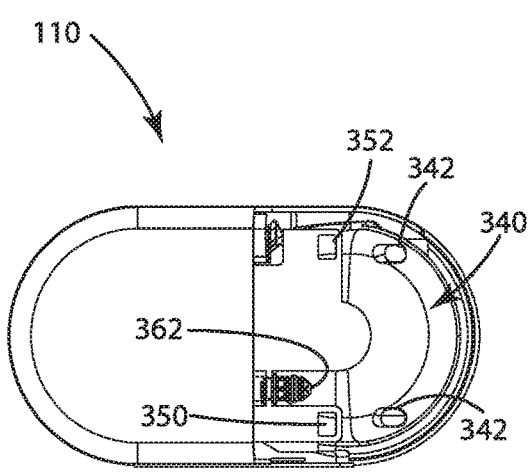
Figure 32C:
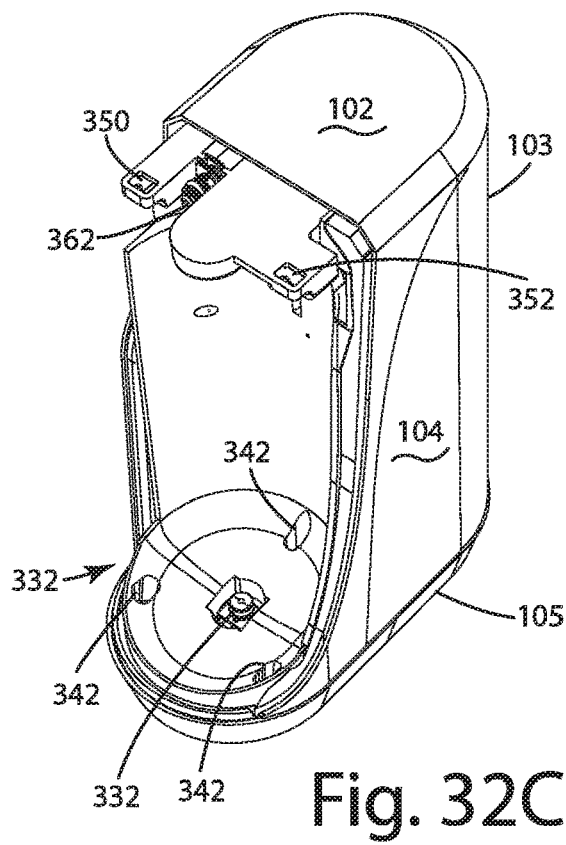
Figure 32D:
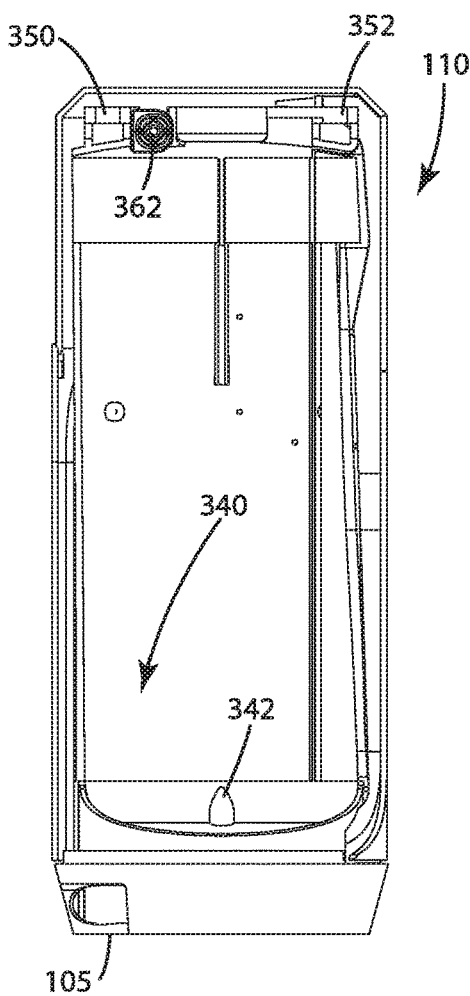
Figure 33:
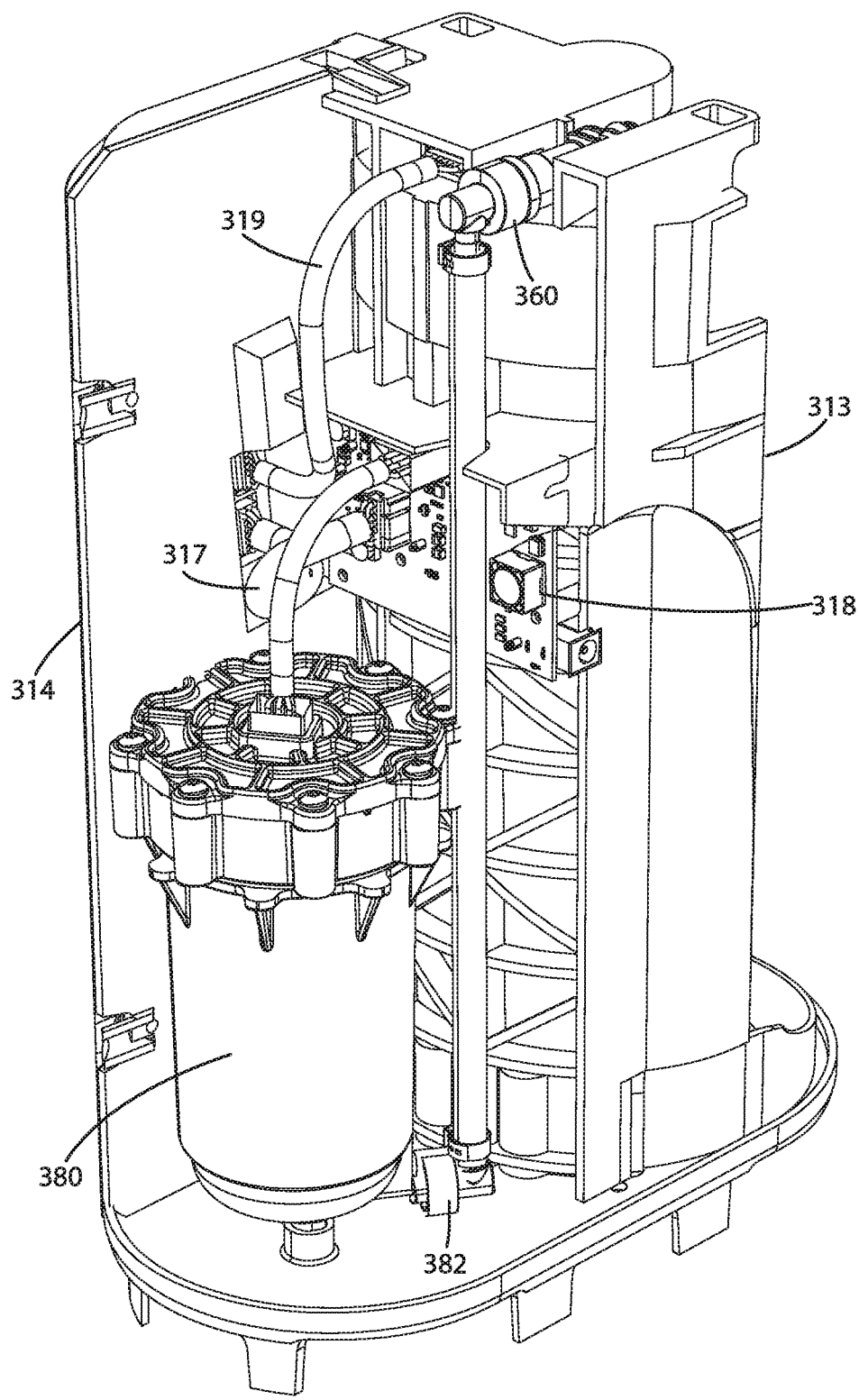
FIG. 33 depicts an exploded view of the base assembly in accordance with one embodiment.
Figure 34:
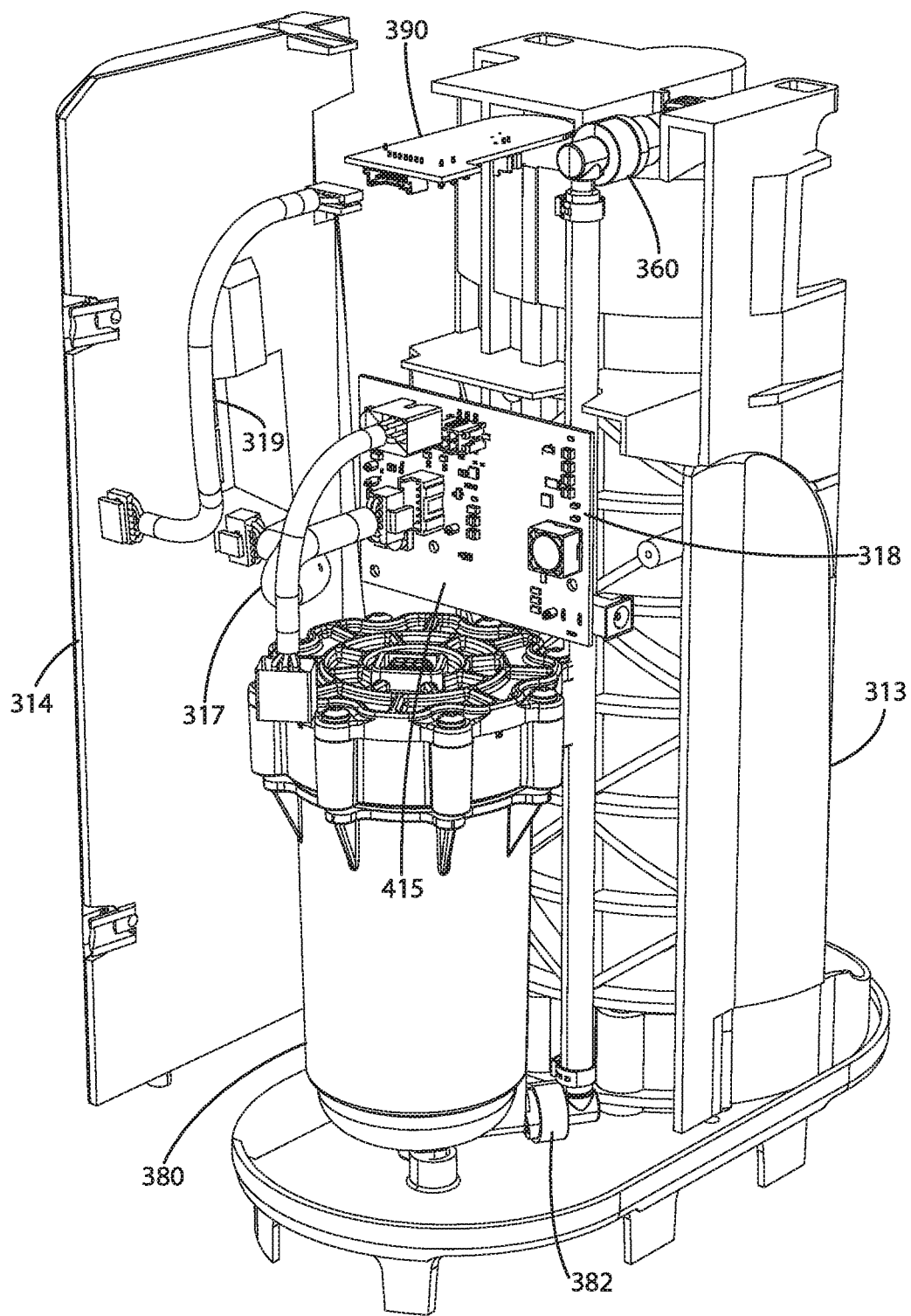
FIG. 34 depicts an exploded view of the base assembly in accordance with one embodiment.
Figure 35:
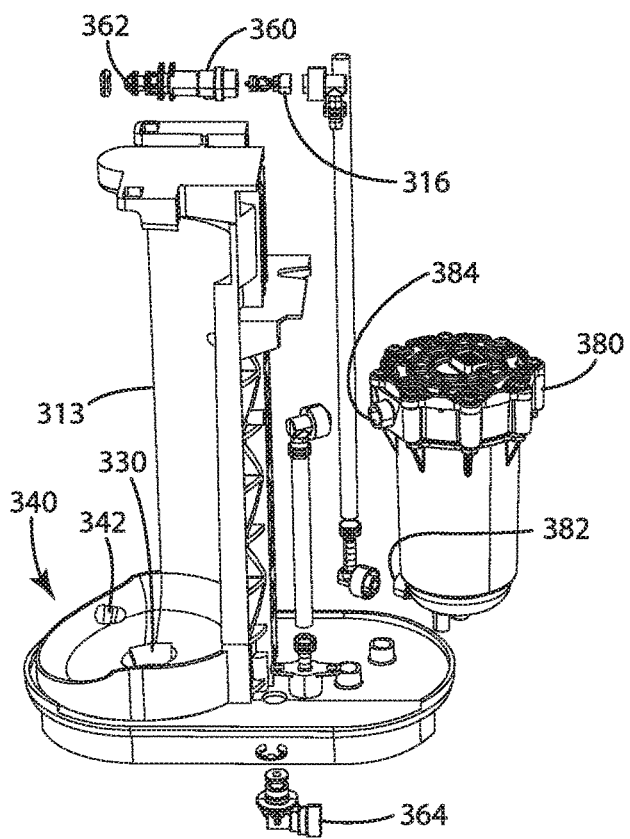
FIG. 35 shows another exploded view of the base assembly in accordance with one embodiment.
Figure 36:
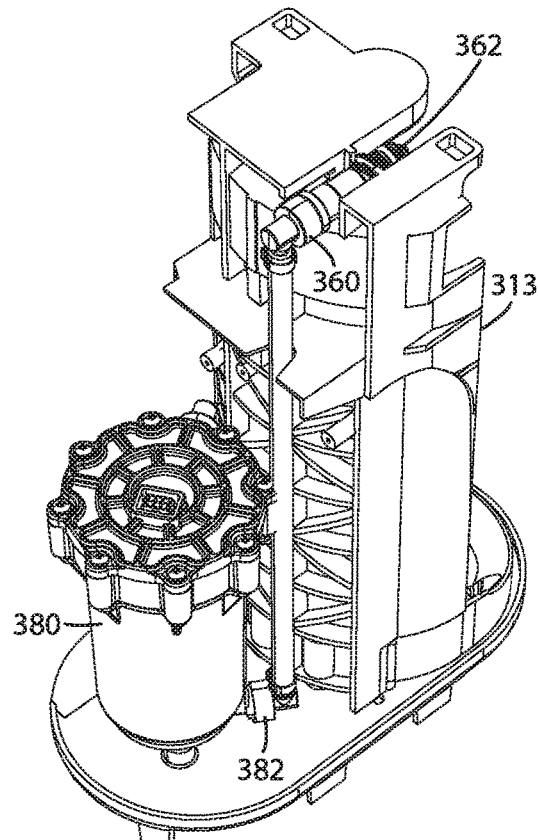
FIG. 36 shows a perspective view of part of the base assembly in accordance with one embodiment.
Figure 37:
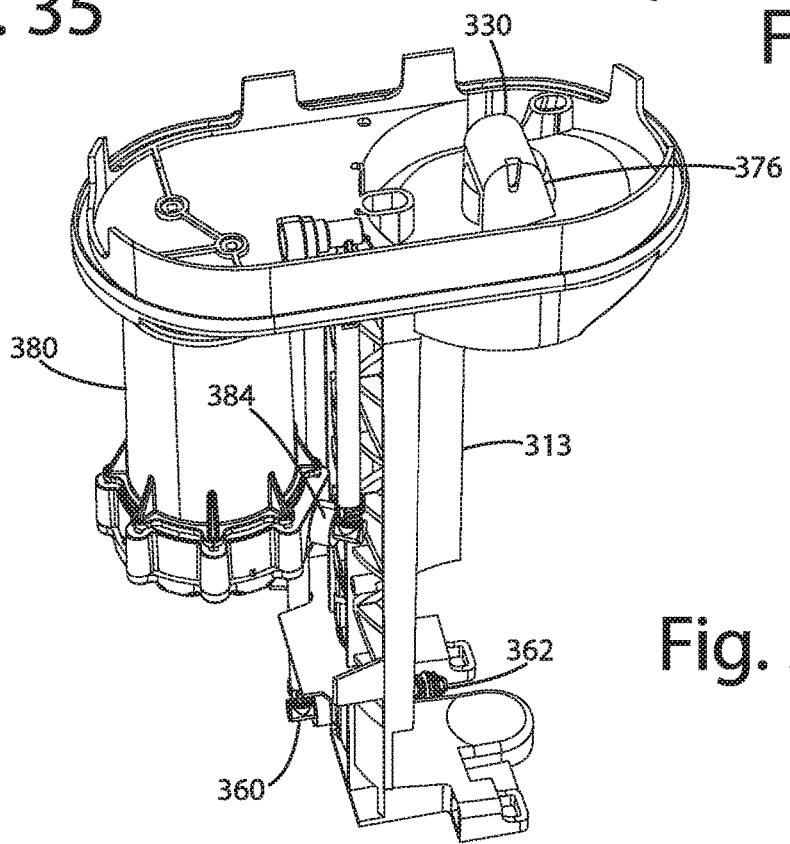
FIG. 37 shows a bottom perspective view of part of the base assembly in accordance with one embodiment.

The collar 242 in the illustrated embodiment of FIGS. 14 and 17A-H includes an aperture 257 operable to receive an upper portion of the vessel interface 240, which is shown in the illustrated embodiment of FIG. 14 and generally designated upper portion 256. As discussed herein, the upper portion 256 may include at least one key element 255A-B configured to interface with at least one receiving element 267A-B of the aperture 257 in order to align the vessel interface 240 to the collar 242. Alignment made between the at least one key element 255A-B and the at least one receiving element 267A-B may position the treatment assembly outlet 133 relative to the closure assembly stops 241 and the releasable coupling 263 such that engagement of the releasable coupling 263 urges the treatment assembly outlet 133 to connect to a base assembly inlet or treated water inlet 362 (shown in the illustrated embodiment of FIG. 32D). As described herein, the closure assembly stops 241 of the treatment assembly 130 may correspond to alignment members 137 of the treatment assembly 130. At least one of the closure assembly stops 241 and the alignment members 137 may correspond to a position of the releasable coupling 263 that is operable to engage the base assembly 110 to connect the treatment assembly outlet 133 to the base assembly 110.

In an alternative embodiment, shown in FIGS. 15-16, the closure assembly 132' may be configured in a similar manner to the closure assembly 132 with an aperture 257' provided by the collar 242' as well as an upper portion 256' of the vessel interface 240' including a key element 255' and the collar 242' including a receiving element 267'. In the illustrated embodiment, the vessel interface 240' includes a plurality of alignment pins 254' configured to register with alignment apertures 258' provided in the collar 242'. The alignment pins 254' may provide further stability with respect to positioning of the collar 242' relative to the vessel interface 240', potentially relieving some of the rotational stress on the key element 255' and receiver in response to rotation of the closure assembly 132' relative to the vessel 134'.

In the illustrated embodiment of FIGS. 14 and 17A-H, the closure assembly 132 includes an interface seal 243, such as a C-shaped seal (e.g., a C-seal or C-ring seal) or an O-ring. The interface seal 243 may be constructed of a variety of materials depending on the application, including, for instance, a Buna N or Nitrile, EPDM rubber, Silicone, or other type of seal material. The interface seal 243 may be operable to facilitate providing a watertight seal between the closure assembly 132 and the vessel 134 in response to rotation of the closure assembly 132 into the closed position relative to the vessel 134. The interface seal 243 may be seated within a groove 245 of the vessel interface 240. The interface seal 243 (e.g., a closure seal) may form a seal between the vessel interface 240 and the inside of the vessel 134.

In the illustrated embodiment of FIGS. 15 and 16, the closure assembly 132' may include an interface seal 243' operable to provide a similar seal between the closure assembly 132' and the vessel 134' and may be formed of a material similar to those described in conjunction with the interface seal 243. The interface seal 243' may be disposed at least partially within a groove 245' of the vessel interface 240'.

The vessel interface 240, 240' in the illustrated embodiments of FIGS. 14, 17A-H, and 15-16 includes a spiral or helical-like flow path 269, 269' within a fluid receiving space 268, 268' of the vessel interface 240, 240', which is positionable in fluid communication with the filter assembly outlet 172, 172'. The flow path 269, 269' may facilitate directing water received by the fluid receiving space 268, 268' toward an interior water receiver 260, 260' in fluid communication with the treatment assembly outlet 133, 133'. The spiral or helical configuration may facilitate collection of and discharge of air within the fluid receiving space 268, 268' to the base assembly 110. It is to be understood that the flow path 269, 269' may be absent or configured differently from the spiral or helical-like flow configuration depicted in the illustrated embodiment. For instance, the flow path 269, 269' may be truncated relative to its construction in the illustrated embodiments with the spiral or helical-like flow configuration absent.

The treatment assembly outlet 133, 133' (also described as a water outlet detail) provided by the closure assembly 132, 132', in one embodiment, is at the highest point of the treatment assembly 130, 130' to substantially minimize or reduce water spillage when the treatment assembly 130, 130' is disengaged from the base assembly 110, 110' in preparation for removal or during and after removal of the treatment assembly 130, 130' from the base assembly 110, 110'. The treatment assembly 130, 130' may define the end of an ascending spiral flow passage 269, 269' (the ascending spiral portion of which may be considered optional) that is configured to facilitate collection and purging of air accumulated in the treatment assembly 130, 130', substantially assuring a full evacuation of the treatment assembly 130, 130' in an effort to prevent undesirable pressurization. It is noted that pressurization of the treatment assembly 130, 130' due to the presence of air may cause the water treatment system 100, 100' to continue to allow the flow of water even after the supply water is stopped.

One or more compression seals mounted on a male detail of the treated water inlet 362 of the frame assembly 313 may be conic to assure engagement and proper concentric location mating with the a receiving detail of the treatment assembly outlet 133, 133' of the closure assembly 132, 132'.

C. Filter Assembly

The filter assembly 170 in one embodiment of the present disclosure is shown in further detail in the illustrated embodiments of FIGS. 12, 21, 24, 25A-B and 26A-D. The filter assembly 170 includes the upper end cap 175 and the lower end cap 174 with the filtration media 171 as described in conjunction with the illustrated embodiment of FIG. 10. The filter assembly 170 in the illustrated embodiments also includes the internal void 270, a filter assembly outlet 172, and spacer elements 176. The seal interface 173 can be seen engaging the closure assembly 132 in the illustrated embodiment of FIG. 18 to form a watertight seal between the filter assembly outlet 172 and the untreated water traversing through the filter assembly 170 to the internal void 270 and through the filter assembly outlet 172 to the treatment assembly outlet 133.

The filtration media 171 in one embodiment may include activated carbon. The filtration media 171 may include performance modifiers and structural elements to achieve a target mechanical shape and strength.

The filter assembly 170 in the illustrated embodiment may be operable to provide filtration by affecting a water path that is introduced through the exterior surface of the formed media (e.g., the filtration media 171), passing through to an open inner chamber (e.g., the internal void 270) that is ported to an outlet path or the filter assembly outlet 172, leaving contaminants in or on the expendable and replaceable filtration media 171.

In one embodiment, the cap structure on the 'blind' bottom end is provided as the lower end cap 174 substantially closes and seals the inner chamber (e.g., the internal void 270). The spacer elements 176 extending from the lower end cap 174 may be constructed to space the filter assembly 170 away from the vessel wall of the vessel 134 to provide a substantially consistent and managed water path to the exterior surface of the filtration media 171.

In an alternative embodiment of FIGS. 27-28, a filter assembly similar to the filter assembly 170 is shown and generally designated 170'. The filter assembly 170' may include filter media 171', a lower end cap 174', and an upper end cap 175' having a filter assembly outlet 172'. The upper end cap 175' may include a seal interface 173' similar to the seal interface 173 described herein in conjunction with the filter assembly 170 with the exception that the seal interface 173' is disposed on an upper surface of the upper end cap 175' and operable as an annular compression seal.

The lower end cap 174' in the illustrated embodiment of FIGS. 27-28 may be partially or completely formed of elastomeric material capable of deflecting to some extent under pressure but resisting such deflection. The elastomeric features or aspects of the lower end cap 174' in one embodiment may provide mechanical pressure (e.g., under compression) to engage a watertight seal between the opposite, discharge end cap or upper end cap 175' and the closure assembly 132'. Additionally, or alternatively, the elastomeric material may enable the filter assembly to respond to shock, substantially protecting the filtration media 171' from damage in transit or in the case of product abuse.

In the illustrated embodiment of FIGS. 18, 21, 24, 25A-B, and 26A-D, the lower end cap 174 includes a plurality of spacer elements 176, which along with the remaining portion of the lower end cap 174 may be substantially rigid to resist deflection under pressure. The spacer elements 176 may maintain space between a lower surface of the vessel 134 and the lower end cap 174 as well as a position of the upper end cap 175 relative to the vessel 134. The lower end cap 174 in the illustrated embodiment includes a plurality of concentric annular rings 177 that project from a surface of the lower end cap 174 and interface with the filtration media 171. The concentric annular rings 177 may increase the available surface area for bonding to the filtration media 171 relative to an alternative configuration in which the concentric annular rings 177 are absent from the surface of the lower end cap 174 and the filtration media 171 is bonded to such surface.

The discharge end of the filter assembly 170 (or upper end cap 175 with the filter assembly outlet 172) may be operable to separate the inflow water stream directed to the exterior media surface of the filtration media 171 from the discharge flow exiting the inner chamber (interior void or internal void 270) and being discharged from the filter assembly outlet 172.

In the illustrated embodiment, the central discharge opening of the upper end cap 175 may include a nonreplicable identifier, and in one embodiment may be provided by a programmable radio frequency identification (RFID) electronic component or RFID component 272. The RFID component 272 may be disposed on the filter assembly 170 in a variety of positions and is not limited to being included on the central discharge opening. The RFID component 272 may facilitate identification of the filter assembly 170 by the water treatment system 100. In one embodiment, the water treatment system 100 may track usage of the filter assembly 170 and confirm the filter assembly 170 is the appropriate type of filtration assembly for the water treatment system 100. The water treatment system 100 may be operable to communicate information to the RFID component 272 of the filter assembly 170, including for example to store usage information. This way, attempts to reuse the filter assembly 170 can be identified despite removal and replacement of the filter assembly 170 into the treatment assembly 130.

The upper end cap 175 in the illustrated embodiment may include an endcap RFID cover 273 operable to hold the RFID component 272 in place with respect to the filter assembly outlet 172, which may include an internal cavity 274 within which the RFID component 272 may be disposed. The upper end cap 175 in the illustrated embodiment may also include a plurality of fluid paths 275 through which water may flow from the internal void 270 to an area external to the filter assembly 170. In one embodiment, an ultrasonic weld may be provided between the filter assembly outlet 172 (e.g., an endcap RFID Base) and endcap RFID cover 273 to form a watertight cavity encapsulating the RFID component 272 (e.g., an RFID Tag).

In the illustrated embodiment, the RFID component 272 may be positioned with respect to the upper end cap 175 and a longitudinal axis of the filter assembly 170 such that the RFID component 272 remains proximal to the longitudinal axis despite rotation of the filter assembly 170 about the longitudinal axis. In one embodiment, the filter assembly 170 may be installed or disposed within the treatment assembly 130 without regard for orientation of the filter assembly 170. Regardless of the orientation of the filter assembly 170 within the treatment assembly 130, with the treatment assembly 130 connected to the base assembly 110, the RFID component 272 may be aligned for communication with wireless communication circuitry 390 of the base assembly 110. This way, wireless communications may be provided without requiring the user to consider alignment and/or orientation of the filter assembly 170 within the treatment assembly 130. Additionally, registration marks, alignment guides, orientation guides, or a combination thereof, may be absent from the treatment assembly 130 and filter assembly 170, potentially saving cost and reducing manufacturing complexity.

In the illustrated embodiment, the filter assembly 170 includes a filter handle 277 that can be stowed to a flat position and rotated to a generally upright operable position to enable a user to pull on the filter handle 277 to remove the filter assembly 170 from the vessel 134. The filter handle 277 may be coupled to the upper end cap 175 in a variety of ways, depending on the application.

In the illustrated embodiment, the filter handle 277 may be coupled to the upper end cap 175 in accordance with one or more of the following steps. The filter handle 277 may include first and second outer supports 279A-B capable of being inserted within first and second end cap apertures 278A-B, which may be formed by openings in tabs that extend from an exterior surface of the upper end cap 175. The filter handle 277 may be sufficiently flexible to allow the first and second outer supports 279A-B to be pinched toward each other and then released for outward insertion into the first and second end cap apertures 278A-B. The filter assembly outlet 172 may include first and second keepers 276 operable to capture first and second inner supports 280A-B of the filter handle 277. After the first and second outer supports 279A-B are inserted into the first and second end cap apertures 278A-B, the filter assembly outlet 172 may be disposed such that it contacts an exterior surface of the upper end cap 175 and the first and second keepers 276 capture first and second inner supports 280A-B. The filter assembly outlet 172 may be affixed to the upper end cap 175 in this position, for example by ultrasonic welding. After the filter assembly outlet 172 is affixed to the upper end cap 175 in this embodiment, the filter handle 277 may be trapped while still being rotatable between the stowed and operable positions. More specifically, the first and second outer supports 279A-B and the first and second inner supports 280A-B may be trapped respectively by the first and second end cap apertures 278A-B and the first and second keepers 276 of the filter assembly outlet 172.

The upper end cap 175 in the illustrated embodiment may include a seal interface 173, as described herein. The seal interface 173 may be a peripheral O-ring type seal, the material type of which may be one or more of the types described in conjunction with the interface seal 243. The upper end cap 175 in the illustrated embodiment includes an upper end cap groove 281 operable to accept the seal interface 173, which as described herein may form a fluid tight seal in conjunction with an interior surface of the vessel interface 240, as depicted in the illustrated embodiment of FIGS. 18 and 21.

In an alternative embodiment, shown in FIGS. 22-23, and 27, the upper end cap 175' may be partially or completely formed of elastomeric material capable of forming a watertight seal with the closure assembly 132'. For instance, the seal interface 173' may be formed of elastomeric material or material capable of forming a watertight seal under load in conjunction with the closure assembly 132'. The seal interface 173' may engage the interior surface of the closure assembly 132' (which defines an interior receiving space of the closure assembly 132') in response to the closure assembly 132' being positioned in the closure position. In one embodiment, the elastomeric properties of the lower end cap 174' in conjunction with the elastomeric properties of the upper end cap 175' may deform at the interface with vessel 134' and the closure assembly 132' but facilitate formation of the watertight seal between untreated water entering the treatment assembly 130' and being discharged from the filter assembly outlet 172'.

D. Preliminary Filter

The preliminary filter 150 is shown in further detail in the illustrated embodiments of FIGS. 18-20, 29, and 30A-D. The preliminary filter 150 in the illustrated embodiment includes an upper retainer 151 and a lower retainer 153 configured to support the preliminary filtration media 154 and define the preliminary filter opening 152.

The preliminary filter 150 in one embodiment is constructed to provide a cylinder of active media capped by forms (e.g., the upper and lower retainers 151, 153) that substantially preserve the shape of the preliminary filter 150 and serve to protect a thin edge of the media material (e.g., the preliminary filtration media 154). The edge of the media material may be considered thin relative to the thickness of the filtration medium 171 of the filter assembly 170.

In the illustrated embodiment, the preliminary filtration media 154 provides an active media that includes fiber filtration to address large particulate exclusion or materials encapsulating active chemistry intended to target particular water content.

The preliminary filter 150 may include an upper wiping seal 157 and a lower wiping seal 158 operable to respectively form a seal against the upper end cap 175 and the lower end cap 174 of the filter assembly 170. In the illustrated embodiment of FIG. 19, the upper wiping seal 157 is shown forming a seal against the upper end cap 175 of the filter assembly 170, and in the illustrated embodiment of FIG. 20, the lower wiping seal 158 is shown forming a seal against the lower end cap 174 of the filter assembly 170. The upper and lower wiping seals 157, 158 may be configured such that the upper and lower wiping seals 157, 158 form respective seals as the filter assembly 170 is pushed through the preliminary filter opening 152 of the preliminary filter 150 from the upper retainer 151 and disposed in a seated position with respect to the lower retainer 153. The upper and lower wiping seals 157, 158 may be integral to the upper and lower retainers 151, 153.

The preliminary filter 150 in the illustrated embodiment includes a plurality of preliminary filter spacers 159 extending from the lower retainer 153. The preliminary filter spacers 159 may facilitate alignment of the filter set 156 within the internal space of the vessel 134, including, for instance, to generally maintain a fluid path between the filter set 156 and the internal surface of the vessel 134 for water to flow from the treatment assembly inlet 131 to the internal void 270 of the filter assembly 170.

III. Base Assembly

The base assembly 110 in accordance with one embodiment is shown in further detail in FIGS. 18-21, 31, 32A-H, and 33-37. The base assembly 110 in the illustrated embodiment includes the upper portion 102, the rear portion 103, the side portion 104, and the base portion 105, as described herein. The base assembly 110 is operable to removably couple to the treatment assembly 130, such as by facilitating formation of a watertight seal between a water supply coupler 332 of the base assembly 110 and the water inlet coupler 231 of the treatment assembly 130, and between the treatment assembly outlet 133 and a treated water inlet 362 of the base assembly 110. In one embodiment, the base assembly 110 may include a main body that provides a demountable structure to hold and connect the treatment assembly 130.

The base assembly 110 may be operable to accept or receive a plurality of alignment members 137 respectively within a plurality of base assembly receivers 342, which are incorporated into a treatment assembly receiver 340 of the base assembly 110. The treatment assembly receiver 340 may be constructed to accept the lower part 141 of the treatment assembly 130 and to facilitate enabling the treatment assembly 130 to pivot relative to the treatment assembly receiver 340. As a result, the closure assembly 132 of the treatment assembly 130 may be tilted into and out of engagement near the upper portion 102 of the base assembly 110, as described herein.

The base assembly 110 in the illustrated embodiment includes a cover 310 that can be removed from a frame assembly 313 of the base assembly 110 to expose internal components 312 of the base assembly 110, including, for example a sensor unit 316 (e.g., a flow sensor) and a control system 318. Although the sensor unit 316 is described primarily as a flow sensor herein, it is to be understood that the present disclosure is not so limited. The sensor unit 316 may be any type of sensor with respect to one more characteristics of water.

In the illustrated embodiment, the sensor unit 316 is formed of separate components, an inner bearing, a spinning turbine, and an outer bearing, that install into the UV reactor fluid passageway 360. The UV reactor fluid passageway 360 may be considered a flow sensor housing, containing the sensor unit parts. The sensor unit 316, or any component thereof, may be replaceable. Additionally, or alternatively, the sensor unit 316, or any component thereof, may be assembled either before or after the UV reactor.

The frame assembly 313 may provide the structural core of the water treatment system 100, providing a platform for positioning a set of assemblies, which may be modularized, and which may facilitate one or more aspects of treating water for consumption. This configuration may enable continued evolution of the water treatment system 100 (e.g., changes to components of the water treatment system such as the display or control unit) while keeping substantially the same form factor. Accordingly, the water treatment system 100 can be updated to remain current into the future.

The base assembly 110 may include a display unit 314 having a display 315, which can provide visual feedback to a user regarding operation of the water treatment system 100. In the illustrated embodiment, the cover 310 is constructed such that a portion of the display unit 314 is concealed by the cover 310 with a display 315 being visible.

Figure 38:
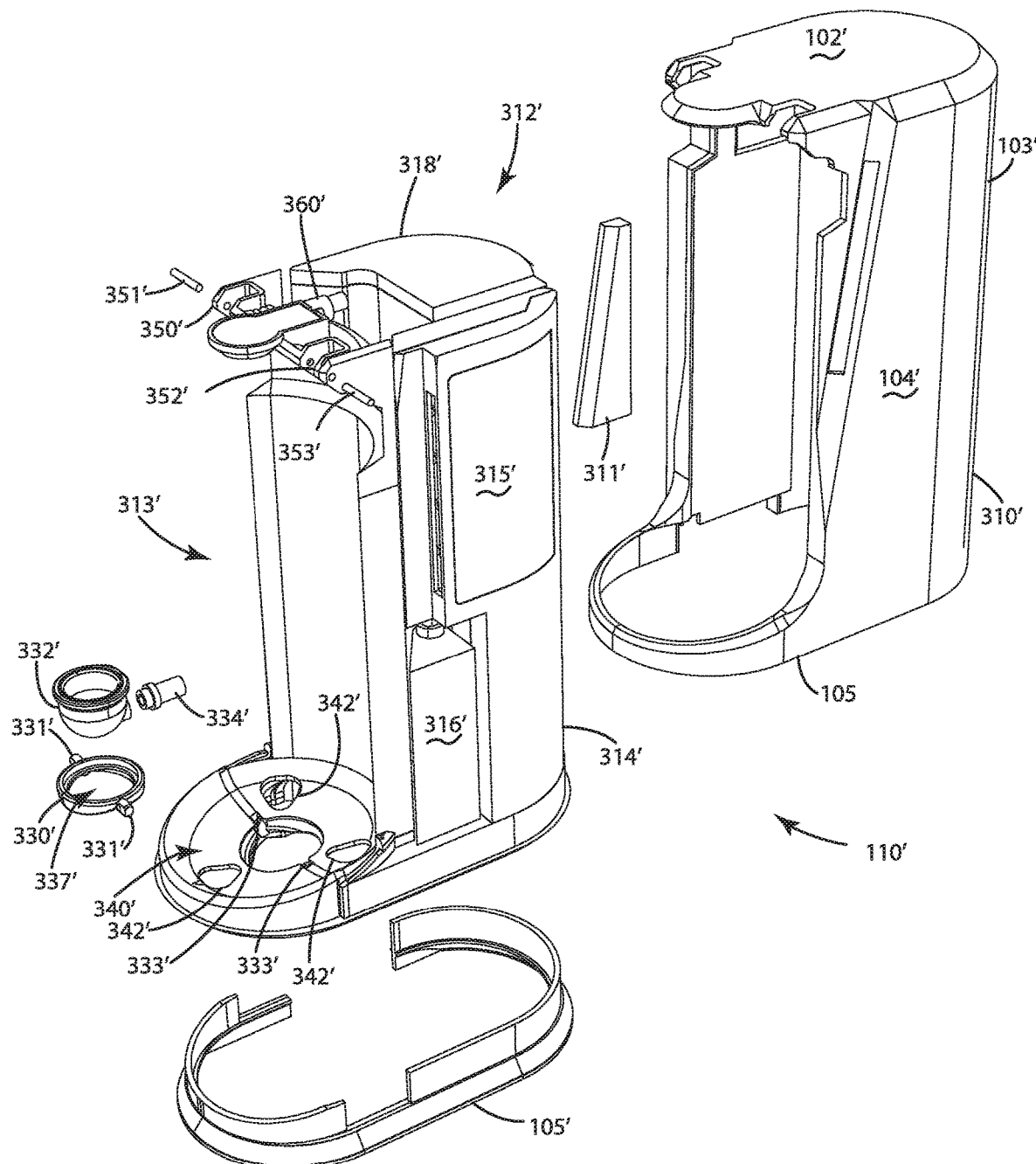
FIG. 38 shows an exploded view of a base assembly in accordance with an alternative embodiment.
Figure 40:
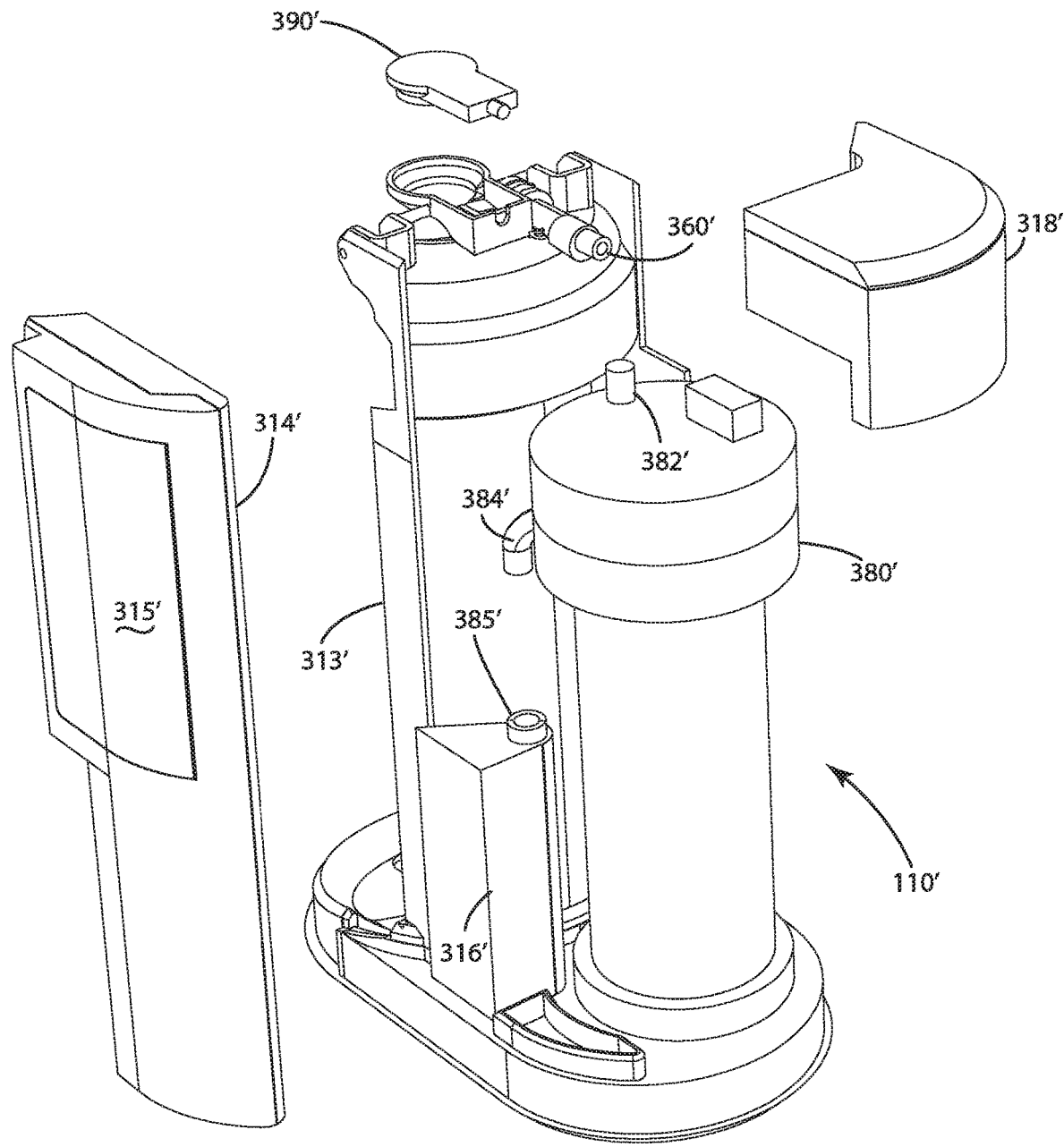
FIG. 40 shows an exploded view of the base assembly of FIG. 38.
Figures 41, 42:
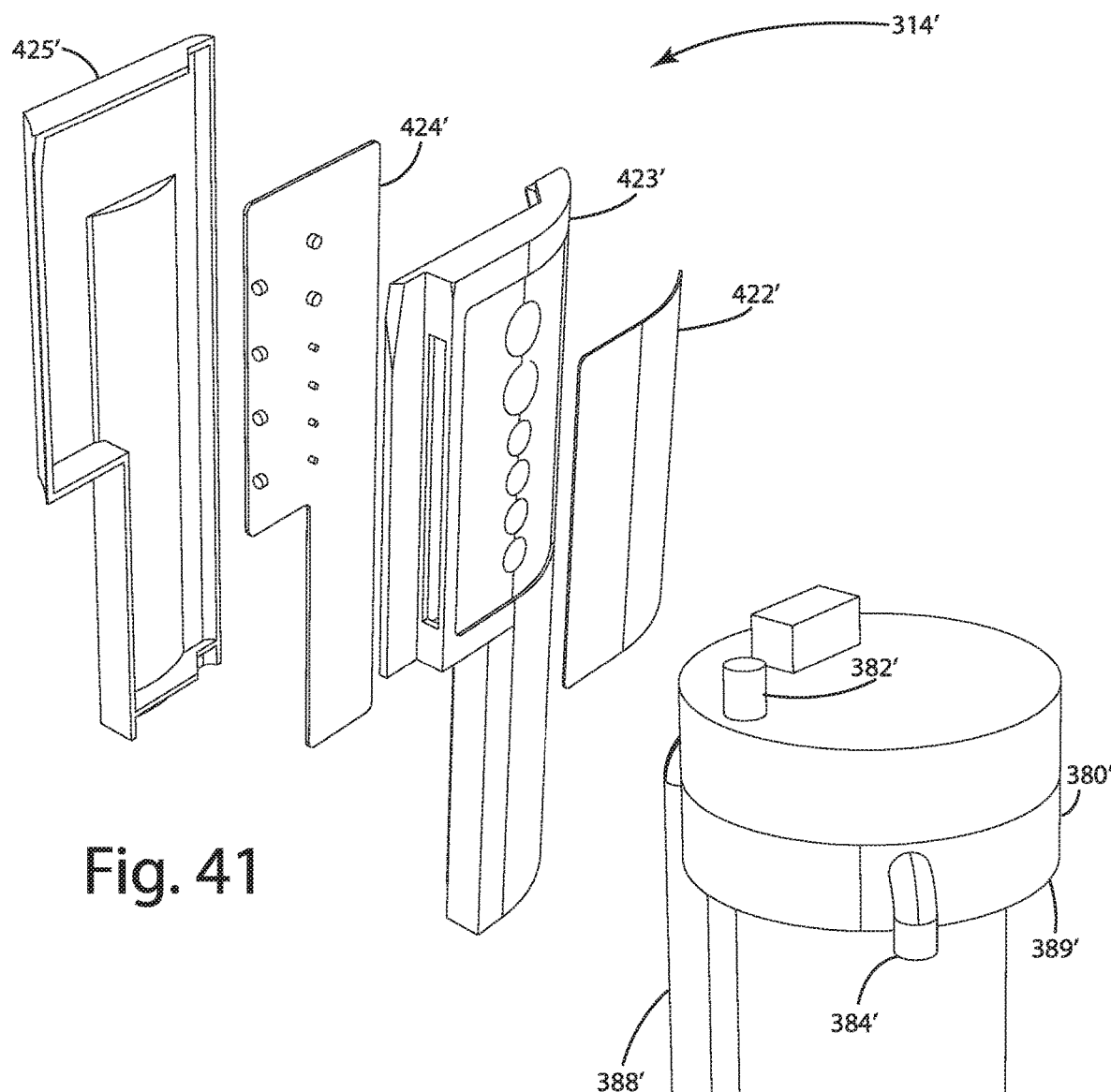
FIG. 41 depicts an exploded view of a display unit in accordance with an alternative embodiment.
FIG. 42 shows a UV reactor in accordance with an alternative embodiment.

In an alternative embodiment, depicted in FIGS. 38 and 40-41, a base assembly 110' is provided and includes an upper portion 102', the rear portion 103', the side portion 104', and the base portion 105'. The base assembly 110' may be configured to removably connect to the treatment assembly 130', similar to the base assembly 110. The treatment assembly 130' may tip-in and tip-out relative to the base assembly 110' to facilitate a removable connection therebetween.

The base assembly 110' in the illustrated embodiment is operable to receive a plurality of alignment members 137' respectively within a plurality of base assembly receivers 342', which, similar to the base assembly 110, are incorporated into a treatment assembly receiver 340' of the base assembly 110'. The treatment assembly receiver 340' may also be constructed to accept the lower part 141' of the treatment assembly 130' and to facilitate enabling the treatment assembly 130' to pivot.

The base assembly 110' may include a sensor unit 316' similar to the sensor unit 316—although the sensor unit 316' is disposed downstream of the UV reactor 380' in the base assembly 110' where the sensor unit 316 is disposed upstream of the UV reactor 380 in the base assembly 110. Additional sensors may be provided in conjunction with the base assembly 110, 110', disposed anywhere upstream or downstream of the UV reactor 380, 380'.

The base assembly 110' may include a frame assembly 313', which forms a structural core of the water treatment system 100' similar to the frame assembly 313. The base assembly 110' may include a display unit 314' having a display 315'. In the illustrated embodiment, the cover 310' conceals the display 315' as well as the display unit 314'. In an alternative embodiment, the display 315, 315' and the cover 310, 310' may be constructed such that the display 315, 315' is partially or completely concealed by the cover 310, 310'.

The base assembly 110' in the illustrated embodiment includes a lens 311' optically coupled between the display 315' and an external area of the water treatment system 100' to enable optical communication with respect to the display 315' and the external area. For instance, the lens 311', which may be an optical component, may be optically translucent or transparent to facilitate providing visual cues or information to the user from the display 315'. The cover 310' in the illustrated embodiment may provide an aesthetic appearance to the water treatment system 100', which may vary from application to application. The location and shape of the lens 311' may be varied depending on the application.

In the illustrated embodiments, the base assembly 110, 110' may include a pedestal or base portion 105, 105' operable to stabilize the base assembly 110, 110' on a horizontal surface, such as a countertop or within a cabinet. In an alternative embodiment, the base portion 105, 105' may be constructed with a perimeter edge that contacts the horizontal surface while supporting the frame assembly 313, 313' in a spaced relationship relative to the horizontal surface, such that, to the extent water or other elements become present on the horizontal surface, the frame assembly 313, 313' may remain spaced above such water or other elements.

In one embodiment, the base portion 105 may be a decorative trim cover. The base portion 105 may assemble to a base of the frame assembly 313 and covers up the structural portion of the frame assembly 313. The base portion 105 may be a separate piece to be able to decorate differently than the covers, e.g., different color or different material or different finish (like chrome plated) to provide an aesthetic element to the water treatment system 100.

Returning to the illustrated embodiment of FIGS. 18-21, 31, 32A-H, and 33-37, the base portion 105 may include one or more access points operable to receive the water inlet tube 112 and water outlet tube 114 for connection respectively to the water supply inlet 334 and the treated water outlet 364. The alternative embodiment of the base assembly 110', depicted in FIGS. 38 and 40-41, includes a water supply inlet 334' and a treated water outlet 364' capable of respective connection to the water inlet tube 112' and the water outlet tube 114'.

The control system 318 in the illustrated embodiments of FIGS. 18-21, 31, 32A-H, and 33-37 may include circuitry configured to direct operation of the water treatment system 100, including directing the display unit 314 to provide visual feedback to a user, and including receiving sensor information obtained from the sensor unit 316. In the illustrated embodiment, the wireless communication circuitry 390 may include sensor circuitry and/or communication circuitry operable to obtain information from the sensor unit 316.

As described herein, the control system 318 may also be operable to direct operation of the UV reactor 380 to disinfect the water discharged from the treatment assembly 130 and to discharge the treated water to the treated water outlet 364.

In the illustrated embodiment of FIGS. 38 and 40-41, water discharged from the UV reactor 380' may flow through the sensor unit 316' to the treated water outlet 364', which is in fluid communication with the water outlet tube 114'. As discussed herein, it is to be understood that the present disclosure is not limited to the sensor unit 316' being disposed to receive water from the UV reactor 380'; the sensor unit 316' may be disposed at any location in the water path, including between the filter assembly stage and the inlet to the UV reactor 380'.

In the illustrated embodiment of FIGS. 18-21, 31, 32A-H, and 33-37, the base assembly 110 includes a treated water inlet 362 operable to interface or connect to the treatment assembly outlet 133. The treated water inlet 362 may include a treatment assembly connector that is conically shaped to engage a corresponding conical surface of the treatment assembly outlet 133. This construction may facilitate alignment of the treated water inlet 362 with the treatment assembly outlet 133 and formation of a watertight connection in response to engagement of the releasable coupling 263 to the base assembly 110. The treated water inlet 362 of the base assembly 110 may be in fluid communication with a UV reactor fluid passageway 360 that provides the UV reactor 380 with water that is discharged from the treatment assembly 130 to the treated water inlet 362. The base assembly 110' in the illustrated embodiment of FIGS. 38 and 40-41 may include a treated water inlet 362' configured in a similar manner to interface or connect to a treatment assembly outlet 133' and to direct water through a UV reactor fluid passageway 360'.

The base assembly 110' in the illustrated embodiment of FIGS. 38 and 40-41 includes first and second base receivers 350', 352' operable to interface with the releasable coupling 263' of the treatment assembly 130'. The first and second base receivers 350', 352' may include respectively first and second base pins 351', 353'. As described herein, the distal ends of cinch clips 251' provided by the closure assembly 132' and operable by the handle assembly 136' may capture respectively the first and second base pins 351', 353'. As the handle assembly 136' is rotated from an operable position 261' to an engaged position 262', the cinch clips 251' may pull the treatment assembly 130' toward the first and second base pins 351', 353', ultimately engaging the base assembly 110' under tension between the cinch clips 251' and the base pins 351', 353'.

The base assembly 110 in the illustrated embodiment of FIGS. 18-21, 31, 32A-H, and 33-37 may include first and second base receivers 350, 352 operable to interface with the releasable coupling 263 of the treatment assembly 130. The first and second base receivers 350, 352 may include first and second catches 354, 356 that respectively retain first and second engagement members 271 of the closure assembly 132. The first and second catches 354, 356 may respectively provide a) an opening which may receive an engagement member 271 and b) a retainer member that interfaces with the engagement members 271 to facilitate connection of the base assembly 110 and the treatment assembly 130.

The treatment assembly receiver 340 in the illustrated embodiment may include a plurality of base assembly receivers 342 each respectively constructed to accept or receive an alignment member 137 of the treatment assembly 130. In the illustrated embodiment, the number of base assembly receivers 342 may correspond in number to the alignment members 137 extending from the treatment assembly 130. Accordingly, the base assembly receivers 342 may be spaced equally relative to each other about a central axis according to the angle α described in connection with the illustrated embodiment of FIG. 11H. This way, the alignment members 137 of the treatment assembly 130 may be accepted by the treatment assembly receiver 340 in a plurality of positions, which may correspond to the number of alignment members 137. The base assembly receivers 342, by accepting the plurality of alignment members 137, may facilitate alignment of the closure assembly 132 relative to the first and second base receivers 350, 352. As an example, in the illustrated embodiment, at least one position of the plurality of positions available for alignment between the base assembly receivers 342 and the alignment members 137 may correspond to an engagement position that facilitates engagement between the releasable coupling 263 of the closure assembly 132 and at the first and second base receivers 350, 352. The base assembly 110' may be configured in a similar manner with the treatment assembly receiver 340' including a plurality of base assembly receivers 342' each respectively constructed to accept or receive an alignment member 137' of the treatment assembly 130'

As described herein, the treatment assembly 130 may effectively disengage from the first and second base receivers 350, 352 and pivot to a tilted position relative to the frame assembly 313. This tilted position may facilitate maintenance of the treatment assembly 130 without the need to substantially move the treatment assembly 130 vertically relative to the horizontal surface on which the water treatment system 100 is positioned for use. Substantial use of head space above the upper portion 102 may be avoided during maintenance operations of the treatment assembly 130, so that the water treatment system 100 may be positioned for use with little such head space. In the tilted position, in an alternative embodiment, the treatment assembly 130' may be supported by the treatment assembly receiver 340' and/or the first and second base pins 351', 353' in conjunction with the distal ends of the cinch clips 251'.

Figure 21:
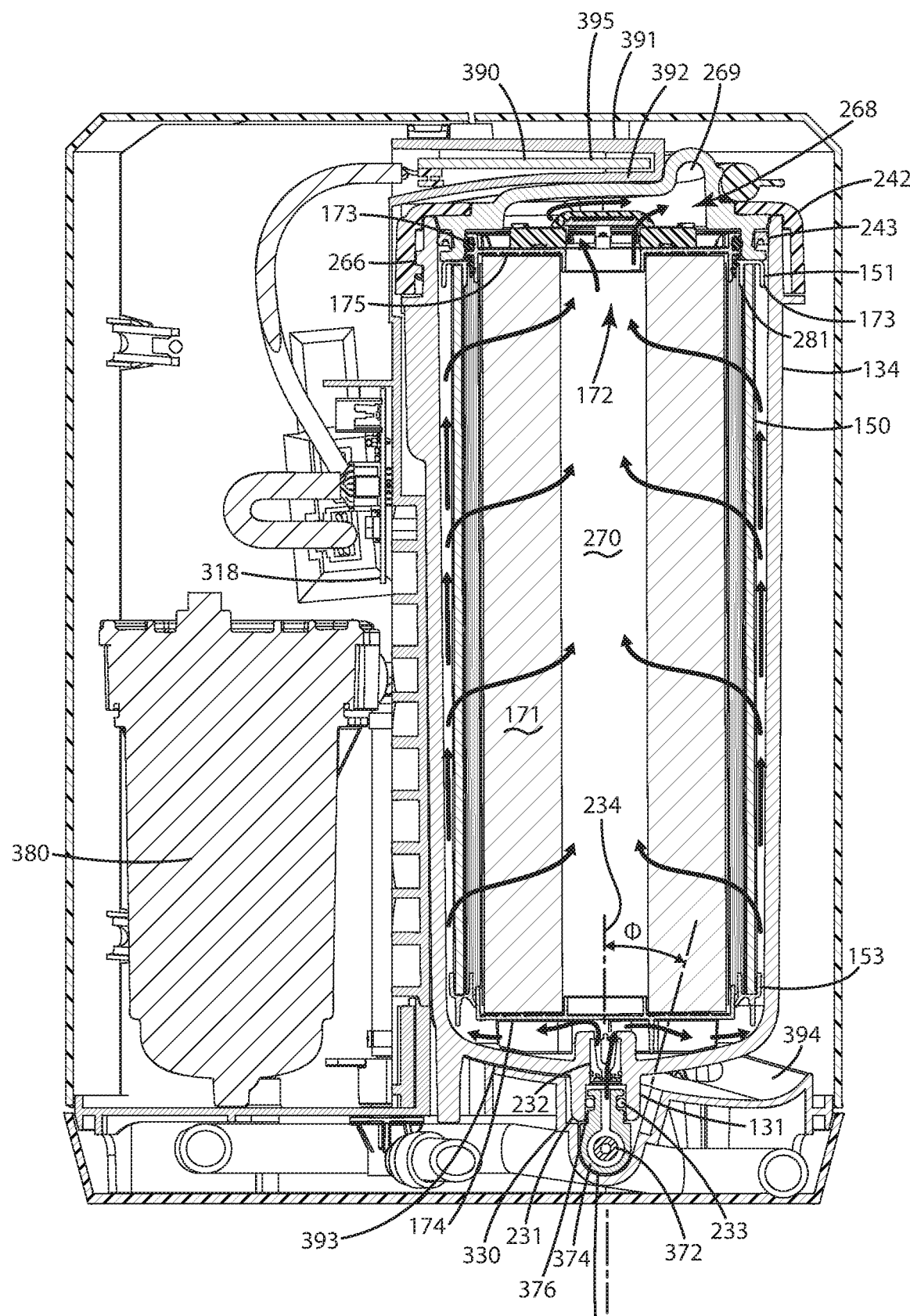
FIG. 21 shows a sectional view of the treatment assembly and base assembly in accordance with one embodiment.

In the illustrated embodiment of FIGS. 18-21, 31, 32A-H, and 33-37, the water supply coupler 332 may be supported by a connector support 330 of the base assembly 110. The connector support 330 is shown in further detail at least in FIGS. 18, 21, 31, 32C, and 37. The connector support 330 is operable to allow the water supply coupler 332 to pivot relative to the treatment assembly receiver 340, enabling the treatment assembly 130 to pivot outward relative to the frame assembly 313 or tip out while remaining supported by the water supply coupler 332. The connector support 330 depicted in FIG. 21 is configured such that the central axis 234 of the treatment assembly 130 may pivot from a generally upright vertical position by an angle 1 to a tip out position.

The treatment assembly receiver 340 may include a rear support surface 393 and a forward support surface 394 adapted to cradle the lower part 141 of the treatment assembly 130 respectively in an engaged position and a tip out position (e.g., a position at which the treatment assembly 130 is pivoted outward with the handle assembly 136 in the operable position 261. The base assembly 110 may include a base member 391 having an engagement surface 392 operable to cooperate with the rear support surface 393 to maintain a position of the treatment assembly 130 along the central axis 234 of the treatment assembly 130. In one embodiment, the engagement surface 392 of the base member 391 and the rear support surface 393 may operate a C-clamp to maintain the longitudinal position of the treatment assembly 130 with respect to the base assembly 110, whereby the first and second base receivers 350, 352, if engaged by the handle assembly 136, maintain the lateral position of the treatment assembly 130 with respect to the base assembly 110. In the illustrated embodiment, the base member 391 includes the first and second base receivers 350, 352 and includes a cavity that receives the wireless communication circuitry 390, which is operable to communicate with the RFID component 272 of the filter assembly 170. The engagement surface 392 of the base member 391 may contact the closure assembly 132 of the treatment assembly 130 to exert downward force on the treatment assembly 130, while the rear support surface 393 may exert an upward force on the lower part 141 of the treatment assembly 130.

In the illustrated embodiment, the rear support surface 393 that contacts the lower part 141 of the treatment assembly 130 while engaged to the base assembly 110 may correspond approximately to the rear half (e.g., 180°) of the treatment assembly receiver 340, and the forward support surface 394 may correspond approximately to the forward half (e.g., 180°) of the treatment assembly receiver 340.

The connector support 330 in the illustrated embodiment includes an inlet elbow 372, which defines the water supply inlet 334 and is configured to insert into a receiving space of the treatment assembly connector 374. The inlet elbow 372 may include a peripheral recess configured to accept a seal 378 for forming a watertight seal with the internal surface of the receiving space of the treatment assembly connector 374. The seal 378 may be configured to allow rotation of the inlet elbow 372 relative to the treatment assembly connector 374 so that the water inlet tube 112 can be positioned depending on the location of a water source. For instance, the inlet elbow 372 can be rotated from the rear facing position shown in FIG. 31 to a forward facing position to accommodate a water inlet tube 112 provided near the front of the water treatment system 100.

The inlet elbow 372 may include a perimeter ridge 375 operable to interface with a retainer 373 with the inlet elbow 372 inserted into the receiving space of the treatment assembly connector 374. The retainer 373, in conjunction with the perimeter ridge 375, may prevent the inlet elbow 372 from being removed from the receiving space of the treatment assembly connector 374. For instance, with the inlet elbow 372 and the treatment assembly connector 374 under pressure, the retainer 373 may prevent the inlet elbow 372 from being ejected from the receiving space.

Installation of the retainer 373 in one embodiment may prevent removal of the treatment assembly connector 374 from the connector support 330, without restricting rotation of the treatment assembly connector 374 within the connector support 330. A method of installation in accordance with one embodiment may include disposing the treatment assembly connector 374 into a receiving space of the connector support 330 with a protrusion 371 (e.g., a nub) of the treatment assembly connector 374 aligned with a depression 376 or an opening in the wall of the receiving space of the connector support 330. The inlet elbow 372 may be inserted into the receiving space of the treatment assembly connector 374, causing the protrusion 371 to slide within the depression 376. The retainer 373 may then be installed onto the inlet elbow 372 via the receiving space of the connector support 330, holding the inlet elbow 372 in place and holding the protrusion 371 in place with respect to the depression 376. The protrusion 371 and the depression 376 may enable the treatment assembly connector 374 to pivot within but not removed from the connector support 330.

In the illustrated embodiment, the treatment assembly connector 374 includes a vessel seal 233 (e.g., an O-ring) operable to form a seal with an interior surface of the treatment assembly inlet 131, thereby preventing water leakage under pressure.

As discussed herein, the treatment assembly connector 374 may pivot within the connector support 330. As an example, the treatment assembly connector 374 may pivot between a generally upright vertical position to a tip out position at an angle 1, and may support the treatment assembly 130 within this angular range. In the vertical position or proximal thereto, the handle assembly 136 of the treatment assembly 130 may be transitioned from the operable position 261 to an engaged position 262 such that the first and second catches 354, 356 are engaged by the first and second engagement members 271, substantially maintaining a lateral position of the treatment assembly 130 relative to the base assembly 110.

In an alternative embodiment, depicted in FIGS. 38 and 40-41, the base assembly 110' may include a water supply coupler 332' that may be supported within an opening 335' of a connector support 330'. The connector support 330' may include a ring defining the opening 335' with a ledge 339' that supports a lip 341' of the water supply coupler 332' such that the water supply coupler 332' is held within the opening 335' of the connector support 330'. This construction can be seen in further detail in the illustrated embodiment of FIG. 22. Returning to the illustrated embodiment of FIGS. 38 and 40-41, the connector support 330' includes first and second projections 331' disposed at opposite sides of the connector support 330'. The first and second projections 331' may seat within first and second bearing depressions 333' of the treatment assembly receiver 340' in conjunction with the connector support 330' within the opening 335' of the treatment assembly receiver 340'. The positioning of the first and second projections 331' and the ring of the connector support 330' within the opening 335' may enable the connector support 330' to pivot about the first and second bearing depressions 333'. In the illustrated embodiment, the water supply coupler 332', as seated on the ledge 339' of the connector support 330', may also pivot in conjunction with the connector support 330'. The pivoting capability of the connector support 330' and the water supply coupler 332' may enable the treatment assembly 130' to pivot as well, even with the water inlet coupler 231' connected to the water supply coupler 332'.

In one embodiment, the diameter of the opening for the water supply coupler 332' to receive the water inlet coupler 231' may be sized effectively to enable a user to push the water inlet coupler 231' into engagement with the water supply coupler 332' at an angle or in the tilted position, and then pivot the entire treatment assembly 130' toward the engagement position. The pivoting action of the treatment assembly 130' may be conducted in part by engaging the cinch clips 251' with the first and second base pins 351', 353' and rotating the handle assembly 136' from the operable position 261' to the engaged position 262'. In one embodiment, the water supply coupler 332' in conjunction with the connector support 330' may be operable as an intercepting feature for the water inlet coupler 231' of the treatment assembly 130' and provide a substantially stable seat to orient and locate the treatment assembly 130' along its installation or engagement path.

One aspect of the water supply coupler 332' is a) a base seat capability that provides a mating seal to the interface feature of the treatment assembly 130' (e.g., to the water inlet coupler 231' of the treatment assembly 130'), and b) a rotating capability to match an incoming angle of the tank to assure alignment of the sealing connection and movement with the tank to maintain that connection.

In one embodiment, the water supply coupler 332' (also described as an interface assembly) can rotate to align with connecting plumbing lines under the water treatment system 100'.

In one embodiment, the water supply coupler 332' may include a depression that engages a lip extending from the ledge 339' of the connector support 330', as shown in the illustrated embodiment of FIG. 22. The depression may facilitate engagement of the water supply coupler 332' and the connector support 330' such that the water supply coupler 332' remains in engagement with the connector support 330' despite axial forces applied on the water supply coupler 332' in response to removal of the water inlet coupler 231' from the water supply coupler 332'. Additionally, or alternatively, the first and second projections 331' of the connector support 330' may be at least partially captured by the first and second bearing depressions 333' of the treatment assembly receiver 340', thereby substantially holding the connector support 330' in place despite forces applied to the water supply coupler 332' in response to removal of the water inlet coupler 231' from the water supply coupler 332'. The first and second projections 331' may be faceted such that rotation of the connector support 330' beyond its normal rotational path for installation and removal of the treatment assembly 130' enables the first and second projections 331' to clear an opening provided by the first and second bearing depressions 333'. This removal aspect for the first and second projections 331' enable removal of the connector support 330' from the base assembly 110'. In one embodiment, the connector support 330' may be mounted in a feature of the frame assembly 313' (e.g., frame base) that locks the connector support 330' to resist extraction when called on to resist the axial force needed to disengage the treatment assembly 130' for removal.

In the illustrated embodiment of FIGS. 18-21, 31, 32A-H, and 33-37, internal components of the base assembly 110, such as water processing and electrical unit assemblies, mounted on the frame assembly 313 may be covered by a rear cover assembly (e.g., the cover 310) that may provide aesthetic look and feel, potentially protect the internal components, and accommodate light conducting structures that provide a system health indication as an extension of the display unit 314.

The base portion 105 (e.g., a base pedestal part) may be secured to the unit body assembly to provide aesthetic, plumbing management, and stabilizing, structural, or protective accommodations to assist the desired positioning means.

Turning to the illustrated embodiment of FIGS. 33-37, the components of the base assembly 110 are shown in further detail. The internal components may include, as discussed herein, a display unit 314, a control system 318, a sensor unit 316, and a UV reactor 380. In the illustrated embodiment, the UV reactor 380 includes a UV reactor inlet 382 that is provided in fluid communication with the UV reactor fluid passageway 360 to receive water discharged from the treatment assembly 130. The UV reactor 380 may be operable to supply UV energy to water received via the UV reactor inlet 382 in order to disinfect the water. Disinfected water may be discharged or output via the UV reactor outlet 384 and directed to the treated water outlet 364. The UV reactor inlet 382, the UV reactor outlet 384, and the UV fluid passageway 360 may include connectors that are spin welded to attach to their respective mating components to form leak tight connections.

An alternative embodiment of the base assembly 110' is shown in FIG. 40, including a display unit 314', a control system 318', a sensor unit 316', and a UV reactor 380', similar in several functional respects to the display unit 314, the control system 318, the sensor unit 316, and the UV reactor 380. Additionally, in the base assembly 110', the UV reactor 380' includes a UV reactor inlet 382' in fluid communication with the UV reactor fluid passageway 360' to receive water discharged from the treatment assembly 130'. Disinfected water may be discharged from the UV reactor 380' via a UV reactor outlet 384', which is in fluid communication with a sensor unit inlet 385 of the sensor unit 316.

Alternatively, as described herein, the sensor unit 316 may be disposed in another part of the fluid flow path of the water. For instance, the sensor unit 316 may be disposed to receive water discharged from the treatment assembly 130 and outputs that water to the UV reactor inlet 382.

In the illustrated embodiment of FIGS. 18-21, 31, 32A-H, and 33-37, the base assembly 110 may include an RFID communicator or wireless communication circuitry 390, which may be capable of communicating wirelessly with one or more components external to the base assembly 110. As an example, the wireless communication circuitry 390 may communicate with the RFID component 272 (e.g., an RFID tag) provided in the filter assembly 170. As mentioned herein, the wireless communication circuitry 390 may be supported by the base member 391, potentially within the base member 391. The RFID component 272 of the filter assembly 170 may be disposed in proximity to the wireless communication circuitry 390

The internal components of the water treatment system 100 in one embodiment may include an electrical and control system that is arranged around the water path systems of the frame assembly 313. The electrical and control system may include the display unit 314 with the unit being secured to a frame assembly 313 proximate to a front side of the water treatment system 100, making information features of the display unit 314 visible to a user in the installed placement of the water treatment system 100. In the illustrated embodiment, the display unit 314 may be connected by a detachable tether 317 to the control system 318.

In one embodiment, the wireless communication circuitry 390 may include an RFID antenna 395 that is attached to the frame assembly 313 and supported by the base member 391. The RFID antenna 395 of the wireless communication circuitry 390 may be disposed proximate to the treatment assembly 130, with the treatment assembly 130 in an installed position, as depicted in the illustrated embodiment of FIG. 21. The wireless communication circuitry 390 may be connected to the display unit 314 by one or more detachable or fixed tethers 319. Additionally, or alternatively, the wireless communication circuitry 390 may be connected directly to the control system 318 or through the tether 319 or another component (e.g., a control board) of the water treatment system 100.

The electrical and control system is not limited to the system described in conjunction with the illustrated embodiment of the water treatment system 100; it is to be understood that the electrical control system may be updated, replaced, or substituted for other technical systems as determined, independent of other system components. For instance, an alternative electrical and control system of a portion of the base assembly 110' is shown in the illustrated embodiment of FIG. 40, with similar components to the base assembly 110 having similar reference numbers with the addition of a "'" (prime) identifier.

The water path components (e.g., the sensor unit 316 and UV reactor 380) of the base assembly 110 may be arranged and secured to the frame assembly 313.

In the illustrated embodiment, the water path is accepted from the treatment assembly 130 by a top component (e.g., the treated water inlet 362) affixed to the frame assembly 313, placed to align and structurally support the mechanical forces to connect and seal the passage under flow and pressure conditions. The treated water inlet 362 may be fluidly coupled to the UV reactor fluid passageway 360 to deliver water to the UV reactor 380 via the UV reactor inlet 382. The UV reactor 380 may be operable to accept power and control from the control system 318 to operate the disinfection process. The sensor unit 316 in the illustrated embodiment is provided within the UV reactor fluid passageway 360; however, the present disclosure is not so limited. The sensor unit 316 may be disposed to obtain sensor information with respect to any fluid path of the water treatment system 100, or to obtain sensor information with respect to any aspect of the water treatment system 100, or a combination thereof.

For instance, in the illustrated embodiment of FIG. 40, the UV reactor 380' and the sensor unit 316 are arranged such that the UV reactor 380' may discharge disinfected water to the sensor unit 316 for delivery to the point-of-use. The sensor unit 316' in the illustrated embodiment of FIG. 40 is operable to receive water discharged from the UV reactor 380' via an sensor unit inlet 385' and to discharge the water to the treated water outlet 364', which serves as the outlet for the water treatment system 100'. In other words, the sensor unit 316' may be integrated with the exit connection of the water treatment system 100' in the illustrated embodiment and forms the end of the water path. Alternatively, the sensor unit 316' may discharge the water to another fluid pathway component so that the water is ultimately discharged from the water treatment system 100' to an outlet in fluid communication with the point-of-use.

In the illustrated embodiment of FIGS. 33-37, the sensor unit 316 may be disposed in the fluid pathway of water being treated and prior to the UV reactor 380. Alternatively, or additionally, a sensor unit 316 may be disposed prior to one or more other components that discharge water upstream of an outlet for point-of-use.

The sensor unit 316 may monitor and measure water flow. Additionally, or alternatively, the sensor unit 316 may measure water temperature, or another characteristic of water.

Figure 39:
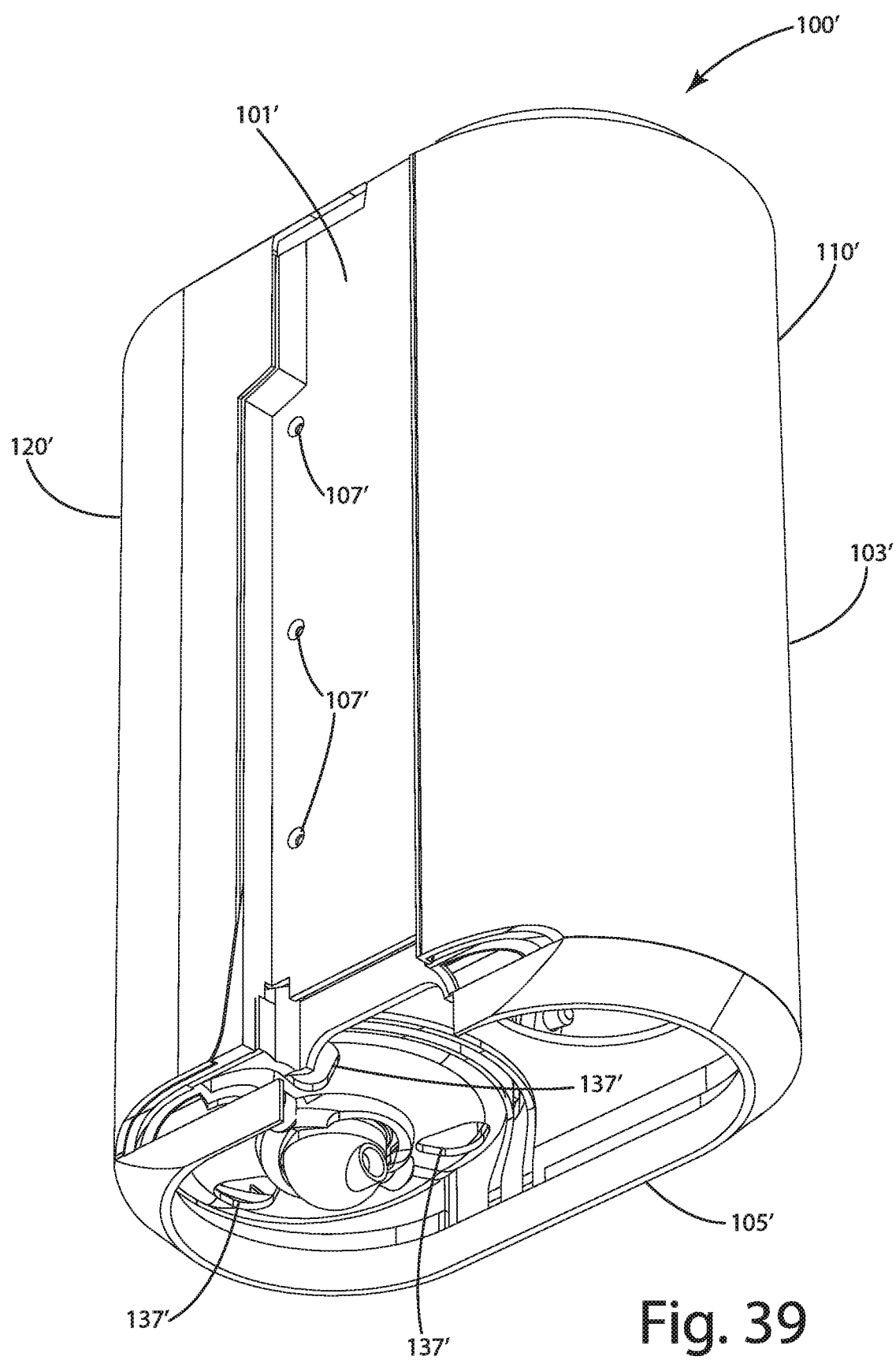
FIG. 39 shows a perspective view of a water treatment system in accordance with an alternative embodiment.

The base assembly 110 in the illustrated embodiments of FIGS. 3C, 3F, 3I, 32A, and 32G includes a cleat receiver 101 operable to accept and attach to an external cleat (not shown). The external cleat may be affixed separately to a wall or other structure, and the cleat receiver 101, along with the water treatment system 100, may be disposed to receive the external cleat. In an alternative embodiment of the base assembly 110' of the water treatment system 100', shown in FIG. 39, the base assembly 110' may include a cleat receiver 101' operable to accept and attach to an external cleat (not shown). The external cleat may be affixed separately to a wall or other structure, and the cleat receiver 101', along with the water treatment system 100', may be disposed to receive the external cleat. An installer may affix the cleat receiver 101' to the external cleat via screw holes 107'.

A. Control System

The control system 318 in the illustrated embodiment of FIGS. 33-37 includes a control board 415 and connectors for detachable tethers 317, 319 (e.g., cables or wires) for providing power and/or communicating with the display unit 314, the wireless communication circuitry 390, and the UV reactor 380. In the illustrated embodiment, the wireless communication circuitry 390 is connected via cable to the display unit 314, through which the control system 318 is operable to communicate with the wireless communication circuitry 390. Alternatively, the wireless communication circuitry 390 may be coupled directly to the control board 415 of the control system 318. The control system 318 may receive user commands from the display unit 314 via the detachable tether 317 (e.g., a cable), and may direct operation of the display unit 314 in accordance with a state of the water treatment system 100. For instance, the control system 318 may direct the display unit to indicate information pertaining to it being time to replace the filter assembly 170 and/or the filter set 156 of the water treatment system 100.

The control system 318 in the illustrated embodiment is operable to obtain sensor output from the sensor unit 316. The control system 318 may vary operation and/or display information via the display unit 314 based on the sensor output obtained from the sensor unit 316.

Figure 43:
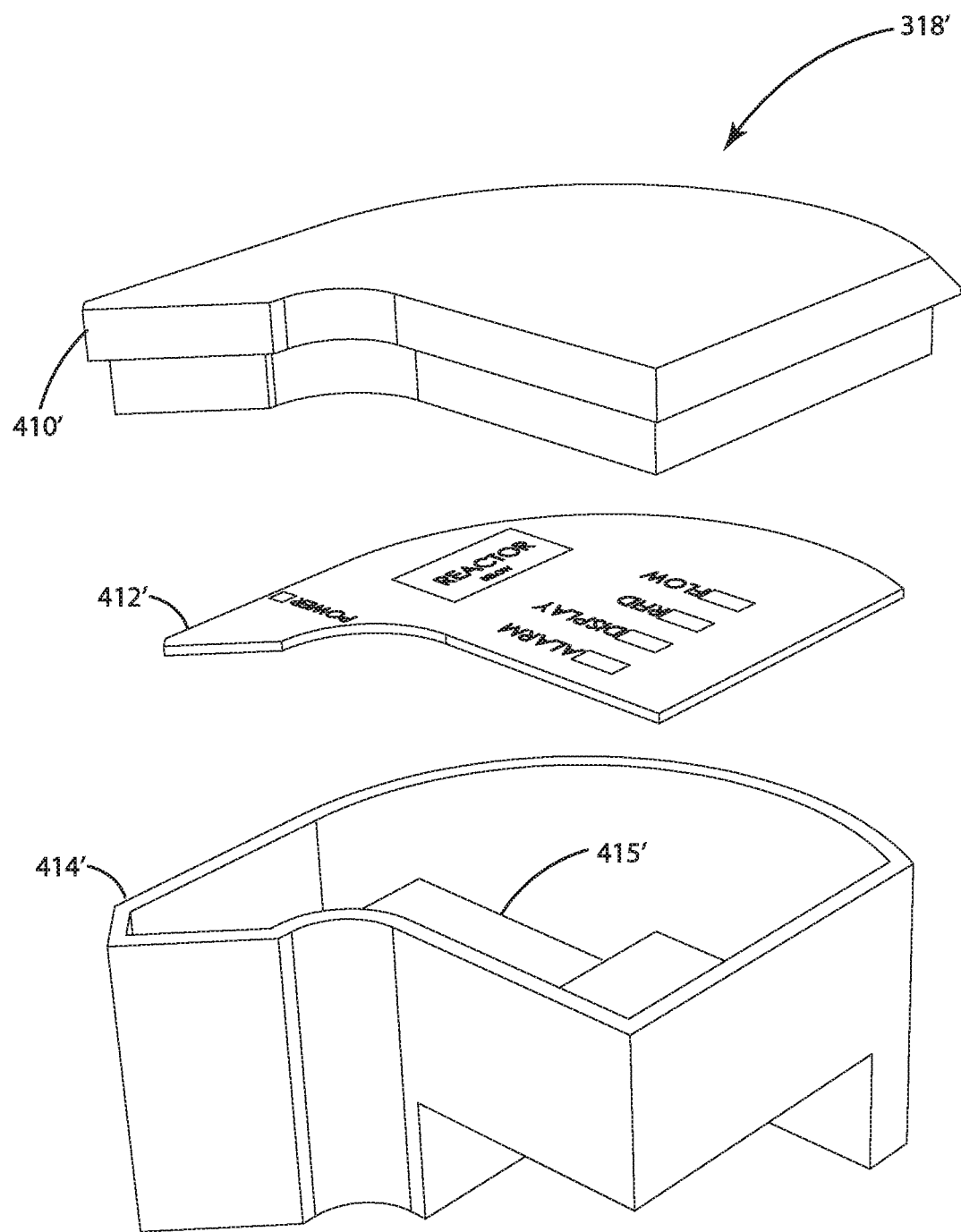
FIG. 43 shows an exploded view of a control unit of a water treatment system in accordance with an alternative embodiment.

A control system 318' in an alternative embodiment is shown in further detail in the illustrated embodiment of FIG. 43, including a control board 415', first and second housing components 410', 414', and an optional control unit display 412'. The control system 318' in the illustrated embodiment of FIG. 43 may be directly plugged into or connected to the UV reactor 380' after connections to the control system 318' have been established between the wireless communication circuitry 390', the display unit 314', and any sensors (e.g., the sensor unit 316'). The connection to the UV reactor 380' may be formed via a connection panel on the underside of the control system 318'. The connection panel may also provide connectors for the wireless communication circuitry 390', the display unit 314', and any sensors. The connection panel being disposed on the underside of the control system 318' may facilitate hiding the connections from casual view to improve the aesthetic of the assembly overall and to substantially shield the electronic connections from any casual water splashing.

The control system 318, 318' may be configured to accept power by connection through the shell or cover 310, 310' from a separate power supply connection, which may also be configured to condition and distribute power to other systems of the water treatment system 100, 100' according to design constraints.

The control system 318, 318' in the illustrated embodiment may be configured to accept sensor and system operation inputs and to generate data (e.g., a data stream) for use by the user and/or other components of the system. The control system 318, 318' may be operable to wirelessly communicate with an external device, such as a smartphone. Data generated by the control system 318, 318' may be made available for user monitoring, service diagnostics, a digital smartphone app, or various programmed responses of system operating components, or any combination thereof.

In one embodiment, wireless communication capabilities to and from remote interests or devices may be provided by the circuitry or the control board 415, 415' of the control system 318, 318'.

B. Display Unit

The display unit 314 in the illustrated embodiment may include one or more presentation features and a data interpretation system for providing water treatment system information and receiving control directives (e.g., from a user or another device). For instance, in one embodiment, the display unit 314 may be operable to receive control feedback from a user. Such feedback may be provided via switch inputs (mechanical and or proximity-based) that a user may operate to control functionality of the water treatment system 100. Although the display unit 314 and the control system 318 are described separately, it is to be understood that these components may be provided by the same system or as a single entity.

In the illustrated embodiment, the display unit 314 may be operable to interpret a subset of data from a data stream provided by the control system 318 to support the system and intention of the current display unit configuration. For instance, the control system 318 may be operable to transmit information according to a determined protocol, which the display unit 314 may be configured to translate into information in accordance with the display configuration of the display unit 314.

Figure 44:
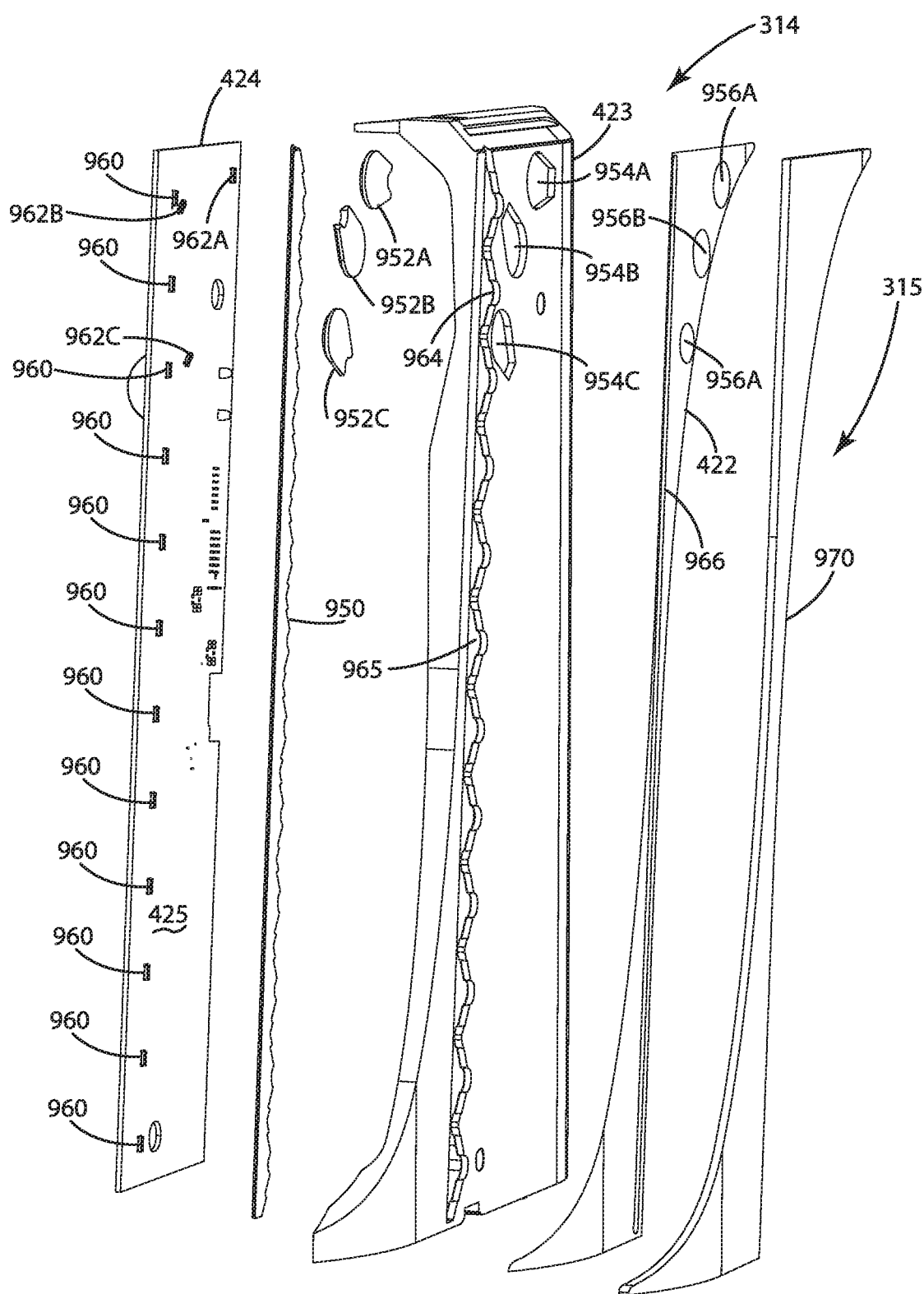
FIG. 44 depicts an exploded view of a display unit in accordance with one embodiment.

In the illustrated embodiment of FIG. 44, the display unit 314 may include an LED array 424 operable to direct light through a graphic mask 422 (e.g., a display mask), with graphics aligned with light generated from the LED array 424. The display graphics may be presented in a 'dead front' panel with relevant touchpoints for obtaining user feedback being visible to the user.

The illustrated embodiment of FIG. 41, a display unit 314' for a base assembly 110' is provided and includes an LED array 424 with parabolic cells and a graphic mask 422, with appropriate graphics aligned with the cells. Similar to the display unit 314, the display graphics of the display unit 314' may be presented in a 'dead front' panel, which, in one embodiment, presents only currently relevant touchpoints to the user. For instance, a graphic element of the graphic mask 422' may remain substantially unmasked or hidden from view unless the display unit 314' activates an LED associated with the graphic element.

Portions of the graphic mask 422, 422' may be associated with user input (e.g., mechanical switches or proximity-based inputs, such as capacitive touch) to facilitate user control of the water treatment system 100, 100'. The display unit 314, 314' may also include a display unit body 423 or a first housing component 423', and optionally a second housing component 425', that can serve to support the LED array 424, 424' of the display unit 314, 314'. The first housing component 423, 423', in one embodiment, may substantially protect the circuitry or control board 415' of the display unit 314, 314' from water, and to modularize the display unit 314, 314' so that it can be replaced with another display unit 314, 314' having similar or a different configuration but with a compliant form factor.

In the illustrated embodiment of FIG. 44, as discussed herein, the display unit body 423 may direct and/or block light to facilitate directing the light toward the graphic mask 422 in accordance with the application or design constraints, or both.

In the shell or cover configuration of the illustrated embodiment of FIGS. 41 and 44, the display 315, 315' (e.g., a display panel) may form a region of the rear shell, which is configured to transmit lighted graphics through the construction material to be viewed by the user on the outside of the product. The display 315, 315' may be separate from the rear shell but visible, partially, completely, or as a dead front display, there through.

C. UV Reactor

The UV reactor 380 in accordance with one embodiment is shown in FIGS. 33-37 The UV reactor 380 as discussed herein includes a UV reactor inlet 382 for receiving water and a UV reactor outlet 384 for discharging disinfected water, which has been subjected to UV energy. The UV reactor 380 may be configured to direct UV energy to water received via the UV reactor inlet 382 in order to disinfect the water. An example of a UV reactor 380 is provided in U.S. Patent Application No. 62/880,688 to Wu et al., entitled WATER TREATMENT SYSTEM, filed Jul. 31, 2019—the disclosure of which is hereby incorporated by reference in its entirety.

In the illustrated embodiment of FIG. 42, a UV reactor 380' is provided similar in some respects to the UV reactor 380, including a UV reactor inlet 382' and a UV reactor outlet 384'. Water is directed from the UV reactor inlet 382' through a transmission fluid pathway 388' to a UV reaction chamber (not shown) internal to the UV reactor 380', thereby disinfecting the water. Disinfected water may be discharged from the UV reactor 380' to the UV reactor outlet 384'.

IV. Method of Installation and Removal of the Treatment Assembly

The water treatment system 100, including the treatment assembly 130 and the base assembly 110, in accordance with one embodiment is shown in FIGS. 1A-E and 2A-E. The water treatment system 100 is depicted in several stages pertaining to installation and removal of the treatment assembly 130 from the base assembly 110. Stages in the illustrated embodiments are designated by letters A-E with different views of the same stage sharing the same letter designation in FIGS. 1A-E and 2A-E. For instance, the perspective view in FIG. 1A depicts the treatment assembly 130 and the base assembly 110 in the same position as shown in the side view in FIG. 2A.

In the illustrated embodiments of FIGS. 1A and 2A, the treatment assembly 130 is shown removed or separate from the base assembly 110. The treatment assembly 130 may be carried via the handle assembly 136 to another location (e.g., a sink) for maintenance. As discussed herein, the closure assembly 132 may be removed from the treatment assembly 130 to expose the filter assembly 170 or filter set 156 carried within the treatment assembly 130. For purposes of discussion, the method is described in conjunction with installing or engaging the treatment assembly 130 with the base assembly 110 starting from the position or stage shown in the illustrated embodiments of FIGS. 1A and 2A. In one embodiment, removal of the treatment assembly 130 from the base assembly 110 may be achieved by reversal of the method steps for installation.

Starting from a stage at which the treatment assembly 130 is separate from the base assembly 110, a user desiring to install the treatment assembly 130 into the base assembly 110 may lift the treatment assembly 130 with the handle assembly 136 and tip the treatment assembly 130 relative to the base assembly 110 at an approximate angle 1 between the central axis 234 and a vertical or a longitudinal axis 460 of the base assembly 110. The user may then connect the water inlet coupler 231 with the water supply coupler 332 in order to form a fluid connection between the base assembly 110 and the treatment assembly 130. The connection may be facilitated by applying axial force along the central axis 234 of the treatment assembly 130. This progression of tipping and insertion of the treatment assembly 130 can be seen in the illustrated embodiments of FIGS. 1B-C and 2B-C.

The angle $\Phi$ in the one embodiment may be defined as a tip out angle at which the treatment assembly 130 is prevented from further pivoting. The connector support 330 may allow the water supply coupler 332 to pivot to the angle $\Phi$ but no farther. The connection between the water supply coupler 332 and the treatment inlet coupling 231 may be sufficient to prevent the treatment assembly 130 from falling out, or loosely disengaging from the base assembly 110. The treatment assembly 130 may be constructed such that its center of mass is not too far relative to the base portion 105 (e.g., a lower part) of the base assembly 110 where the moment of torque on the connection with the water supply coupler 332 causes failure thereof or the treatment assembly 130 to loosely disengage or fall out from the base assembly 110.

Removal of the treatment assembly 130 may be achieved relative to the stage depicted in FIGS. 52C and 53C by applying axial force along the central axis 234 via the handle assembly 136 to pull the treatment assembly 130 from the base assembly 110.

As described herein, the handle assembly 136 and the releasable coupling 263 of the closure assembly 132 may be aligned with the first and second base receivers 350, 352 via receipt of the alignment members 137 within the base assembly receivers 342. If the alignment members 137 are not aligned with the base assembly receivers 342, in one embodiment, the treatment assembly inlet 131 and the releasable coupling 263 may be prevented from engagement with the base assembly 110.

To fully engage the treatment assembly 130 with the base assembly 110, a user may rotate the handle assembly 136 to the engaged position 262 as depicted in the illustrated embodiment of FIGS. 1E and 2E. Rotation of the handle assembly 136 from the operable position 261 with respect to the angle $\theta$ depicted in the illustrated embodiment of FIG. 53E may cause the distal ends of the first and second engagement members 271 to engage the first and second catches 354, 356 of the first and second base receivers 350, 352 with the first and second catches 354, 356 under tension. This way, the first and second engagement members 271 may maintain position with respect to the first and second catches 354, 356 of the first and second base receivers 350, 352 as well as generally maintaining the position of the handle assembly 136 in the engaged position 262.

In the illustrated embodiment of FIGS. 1A-E, 2A-E, 18, and 21, with the treatment assembly 130 engaged to the base assembly 110 for treating water, it is noted that water may enter the water treatment system 100 through the inlet elbow 372, which may rotate (e.g., about 180 degrees) to allow the attached water inlet tube 112 to route to either side of the water treatment system 100. Water may exit the inlet elbow 372 and flow around the treatment assembly connector 374, which can rotate (e.g., about 16 degrees for the angle $\Phi$ identified in FIG. 21) to allow for the treatment assembly 130 to tilt outward, clearing the base member 391 of the base assembly 110 and allowing the treatment assembly 130 to be removed for filter change. Water may then flow through a flow regulating check valve 232, around the bottom of the filter set 156, and then up the sides of the vessel 134. The water then passes through the preliminary filter 150 and filtration media 171 (e.g., carbon block) of the filter assembly 170, then out the openings or fluid paths 275 of the upper end cap 175 (e.g., a top end cap welded assembly). Water flow then exits the filter assembly 170 out the treatment assembly outlet 133 of the vessel interface 240.

As discussed herein, the base member 391 of the base assembly 110 may include an RFID antenna 395 (e.g., a wireless communication antenna) positioned to communicate with the RFID component 272 (e.g., a wireless communication component) of the filter assembly 170. The installation method described herein may be conducted without regard for the orientation of the filter assembly 170 because the positions of the RFID antenna 395 and the RFID component 272, or wireless communication aspects thereof, are proximal to a longitudinal, central axis of the filter assembly 170. Regardless of a rotational orientation of the filter assembly 170 about the central axis 234 of the treatment assembly 130, the RFID component 272, or wireless communication aspects thereof, may be positioned proximal to the RFID antenna 395 with the treatment assembly 130 installed or connected to the base assembly 110 in accordance with one or more embodiments described herein, including the water treatment system 100 and the water treatment system 100'.

The water treatment system 100', including the treatment assembly 130' and the base assembly 110', in accordance with one embodiment is shown in FIGS. 52A-E and 53A-E. The water treatment system 100' is depicted in several stages pertaining to installation and removal of the treatment assembly 130' from the base assembly 110'. Stages in the illustrated embodiments are designated by letters A-E with different views of the same stage sharing the same letter designation in FIGS. 52A-E and 53A-E. For instance, the perspective view in FIG. 52A depicts the treatment assembly 130' and the base assembly 110' in the same position as shown in the side view in FIG. 53A.

In the illustrated embodiments of FIGS. 52A and 53A, the treatment assembly 130' is shown removed or separate from the base assembly 110'. The treatment assembly 130' may be carried via the handle assembly 136' to another location (e.g., a sink) for maintenance. As discussed herein, the closure assembly 132' may be removed from the treatment assembly 130' to expose the filter assembly 170' or filter set 156' carried within the treatment assembly 130'. For purposes of discussion, the method is described in conjunction with installing or engaging the treatment assembly 130' with the base assembly 110' starting from the position or stage shown in the illustrated embodiments of FIGS. 52A and 53A. In one embodiment, removal of the treatment assembly 130' from the base assembly 110' may be achieved by reversal of the method steps for installation.

Starting from a stage at which the treatment assembly 130' is separate from the base assembly 110', a user desiring to install the treatment assembly 130' into the base assembly 110' may lift the treatment assembly 130' with the handle assembly 136' and tip the treatment assembly 130' relative to the base assembly 110' at an approximate angle Φ relative to a vertical or a longitudinal axis 460' of the base assembly 110'. The user may then connect the water inlet coupler 231' with the water supply coupler 332' in order to form a fluid connection between the base assembly 110' and the treatment assembly 130'. The connection may be facilitated by applying axial force along a central axis 234' of the treatment assembly 130'. This progression of tipping and insertion of the treatment assembly 130' can be seen in the illustrated embodiments of FIGS. 52B-C and 53B-C.

The angle Φ in the one embodiment may be defined as a tip out angle at which the treatment assembly 130' is prevented from further pivoting. The connector support 330' may allow the water supply coupler 332' to pivot to the angle Φ but no farther. The connection between the water supply coupler 332' and the treatment inlet coupling 231' may be sufficient to prevent the treatment assembly 130' from falling out, or loosely disengaging from the base assembly 110'. The treatment assembly 130' may be constructed such that its center of mass is not too far relative to the lower part 105' of the base assembly 110' that the moment of torque on the connection with the water supply coupler 332' causes failure or the treatment assembly 130' to loosely disengage or fall out from the base assembly 110'.

Removal of the treatment assembly 130' may be achieved relative to the stage depicted in FIGS. 52C and 53C by applying axial force along the central axis 234' via the handle assembly 136' to pull the treatment assembly 130' from the base assembly 110'.

As described herein, the handle assembly 136' and the releasable coupling 263' of the closure assembly 132' may be aligned with the first and second base coupling 250', 251' via receipt of the alignment members 137' within the base assembly receivers 342'. If the alignment members 137' are not aligned with the base assembly receivers 342', in one embodiment, the treatment assembly inlet 131' and the releasable coupling 263' may be prevented from engagement with the base assembly 110'.

In the illustrated embodiments of FIGS. 52B-D and 53B-D, the handle assembly 136' is depicted in a position between the operable position 261' and the engaged position 262' approximately at an angle θ relative to the central axis 234' of the treatment assembly 130'. In the illustrated embodiment, if the handle assembly 136' is in the operable position 261', the distal end of the first and second cinch clips 251' is positioned to interfere with the first and second base pins 351', 353', substantially preventing further closing of the angle Φ between the treatment assembly 130' and the longitudinal axis 460', and preventing engagement of the first and second cinch clips 251' with the first and second base pins 351', 353'.

In the illustrated embodiment, with the handle assembly 136' being positioned approximately at the angle θ, the distal ends of the first and second cinch clips 251' may clear or traverse over the first and second base pins 351', 353' such that a) the angle Φ can be decreased and b) the central axis 234' and the longitudinal axis 460' can be aligned. As described herein, alignment of the central axis 234' with the longitudinal axis 460' may enable a connection between the treatment assembly outlet 133' and the treated water inlet 362' of the base assembly 110'.

To fully engage the treatment assembly 130' with the base assembly 110', a user may rotate the handle assembly 136' to the engaged position 262' as depicted in the illustrated embodiment of FIGS. 52E and 53E. Further rotation of the handle assembly 136' relative to the angle θ depicted in the illustrated embodiment of FIG. 53D may cause the distal ends of the first and second cinch clips 251' to capture the first and second base pins 351', 353' and hold the first and second base pins 351', 353' under tension in conjunction with an over center arrangement of the first and second cinch pins 252' relative to the first and second handle pins 248'. This way, the first and second cinch clips 251' and the first and second base pins 351', 353' may remain engaged as well as generally maintaining the position of the handle assembly 136' in the engaged position 262'.

It is to be noted that in the illustrated embodiment of FIGS. 52A-E and 53A-E, for purposes of disclosure, the first and second base pins 351', 353' are shown separate from the base assembly 110' and the first and second base receivers 350', 352'. Instead, the position of the first and second base pins 351', 353' are shown relative to the distal end of the first and second cinch clips 251' to indicate the positions of these components for the various angles θ and Φ, including between the operable position 261' and the engaged position 262'. In practice, the first and second base pins 351', 353' are disposed within the first and second base receivers 350', 352' so that tension on the first and second cinch clips 251' with respect to the cinch pins 252', handle pins 248', and the first and second base pins 351', 353' substantially maintain the treatment assembly 130' in engagement with the base assembly 110' and facilitates providing a watertight connection between inlets and outlets between the treatment assembly and the base assembly 110'.

V. First Alternative Engagement Construction

A water treatment system in accordance with one embodiment of the present disclosure is shown in FIGS. 53A-D and 54A-D and generally designated 500. The water treatment system 500 in the illustrated embodiment includes a treatment assembly 530 and a base assembly 510, similar to the water treatment system 100, including the treatment assembly 130 and the base assembly 110, with several exceptions. For instance, the base assembly 510 in the illustrated embodiments is operable to removably couple to the treatment assembly 530, such that a water treatment assembly outlet 533 of the treatment assembly 530 may a) connect with the base assembly 510 to form a watertight connection and b) disconnect from the base assembly 510. The treatment assembly 530 may include a treatment assembly inlet (not shown), similar to the treatment assembly inlet 131, that is operable to connect to a water supply connector 580 of the base assembly 510. Likewise, the base assembly 510 includes a filter assembly similar to the filter assembly 170 of the water treatment system 100.

The base assembly 510 of the water treatment system 500, similar to the base assembly 110, includes a plurality of base assembly receivers 581, which are incorporated into a treatment assembly receiver 582 of the base assembly 510. The treatment assembly receiver 582 may be configured to accept a lower part of the treatment assembly 530 and to facilitate pivoting of the treatment assembly 530 relative to the base assembly 510. The plurality of base assembly receivers 581 in the illustrated embodiment may align with at least one position of the treatment assembly 530 that facilitates coupling of the treatment assembly 530 with the base assembly 510 such that a watertight connection is formed therebetween.

Figures 54A, 54B, 54C, 54D, 54E:
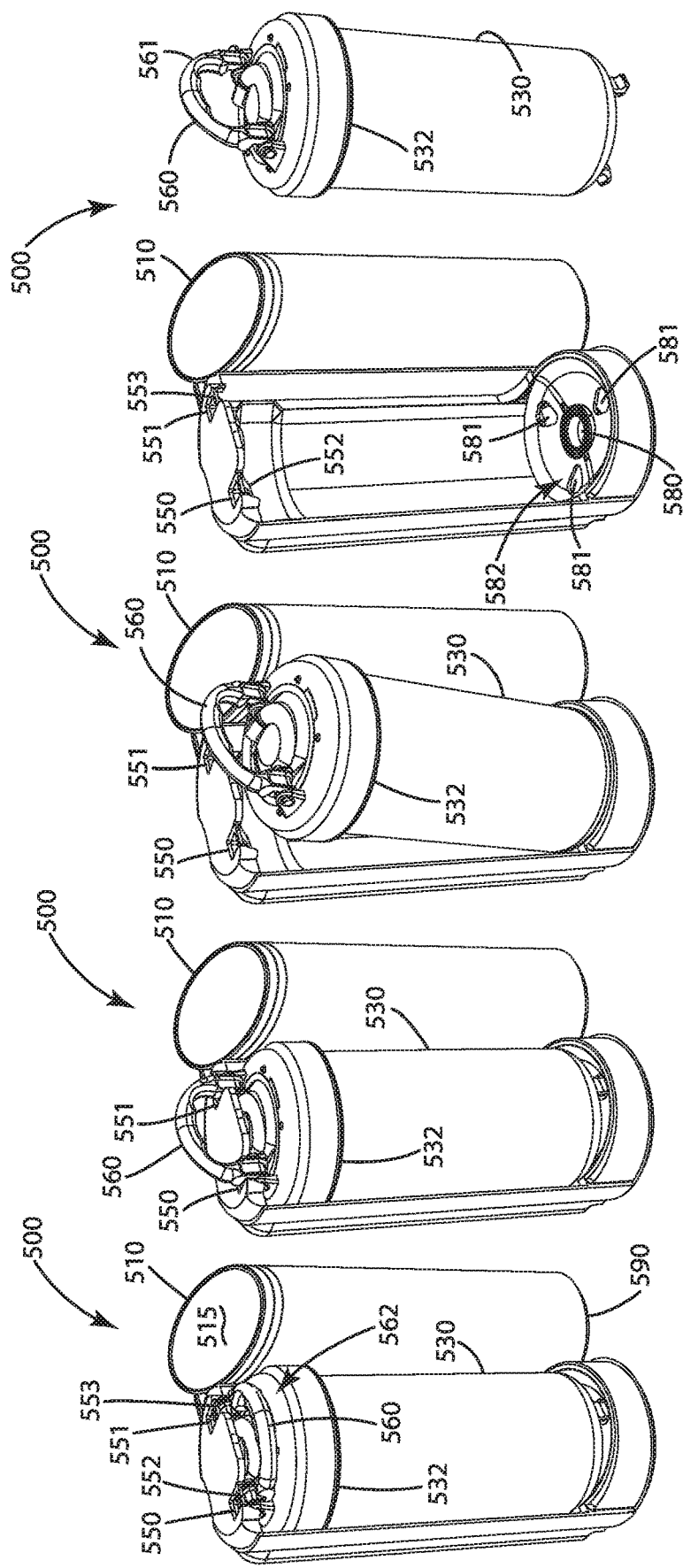
FIGS. 54A-E show perspective views of various stages for installation and removal of a treatment assembly from a base assembly in accordance with one embodiment.

The base assembly 510 in the illustrated embodiment includes a UV reactor 590 and display unit 515, similar to the base assembly 110; however, as can be seen in the illustrated embodiment of FIG. 54A, the placement and housing configuration of the base assembly 510 is different from the base assembly 110 with the UV reactor 590 and display unit 515 provided in a generally side-by-side configuration with the base assembly 510.

The base assembly 510 may include first and second base receivers 550, 551 configured to facilitate connection of the treatment assembly 530 to the base assembly 510, similar to the first and second base receivers 350, 352. However, the first and second base receivers 550, 551 are constructed differently. The first and second base receivers 550, 551 include first and second catches 552, 553 that retain respective first and second engagement members 570, 571 of the closure assembly 532. The first and second catches 552, 553 may respectively provide a) an opening which may receive an engagement member 570, 571 and b) a retainer member that interfaces with the engagement members 570, 571 to facilitate connection of the base assembly 510 and the treatment assembly 530.

The closure assembly 532 in the illustrated embodiment of FIG. 55 shows the engagement members 570, 571 in further detail. The closure assembly 532 is similar to the closure assembly 132 with several exceptions, such as a handle 560 including the first and second engagement members 570, 571 configured differently than the cinch clips 251 of the closure assembly 132.

The closure assembly 532 includes tabs 546, 547 that, in conjunction with handle pins 548 that fit through apertures 549 of the handle 560, enable coupling the handle 560 in a pivotable manner to the closure assembly 532. The first and second engagement members 570, 571 may rotate with the handle 560 such that in an engagement position 562, the first and second engagement members 570, 571 engage with and are retained by the first and second catches 552, 553. Rotating the handle 560 from the engagement position 562, as shown in the progression from FIGS. 54A-B, may disengage the first and second engagement members 570, 571 from the first and second catches 552, 553 to facilitate removal of the treatment assembly 530 from the base assembly 510.

VI. Second Alternative Engagement Construction

A water treatment system in accordance with one embodiment of the present disclosure is shown in FIGS. 56A-F, 57, and 58 and generally designated 600. The water treatment system 600 in the illustrated embodiment includes a treatment assembly 630 and a base assembly 610, similar to the water treatment system 100, including the treatment assembly 130 and the base assembly 110, with several exceptions. For instance, the base assembly 610 in the illustrated embodiments is operable to removably couple to the treatment assembly 630, such that a water treatment assembly outlet 633 of the treatment assembly 630 may a) connect with the base assembly 610 to form a watertight connection and b) disconnect from the base assembly 610. The treatment assembly 630 may include a treatment assembly inlet (not shown), similar to the treatment assembly inlet 131, that is operable to connect to a water supply connector 680 of the base assembly 610. Likewise, the base assembly 610 includes a filter assembly similar to the filter assembly 170 of the water treatment system 100.

The base assembly 610 of the water treatment system 600, similar to the base assembly 110, includes a plurality of base assembly receivers 681, which are incorporated into a treatment assembly receiver 682 of the base assembly 610. The treatment assembly receiver 682 may be configured to accept a lower part of the treatment assembly 630 and to facilitate pivoting of the treatment assembly 630 relative to the base assembly 610. The plurality of base assembly receivers 681 in the illustrated embodiment may align with at least one position of the treatment assembly 630 that facilitates coupling of the treatment assembly 630 with the base assembly 610 such that a watertight connection is formed therebetween.

The base assembly 610 in the illustrated embodiment includes a UV reactor 690 and display unit 615, similar to the base assembly 110.

The base assembly 610 may include a pivotable engagement structure 650 rotatably coupled to a cover assembly 611 via a coupling between a pin 651 and socket 652. The pivotable engagement structure 650 may take the form of a partial loop or strap that pivots to engage a treatment assembly engagement surface 670 and hold the treatment assembly 630 in place with respect to the base assembly 610 and maintain watertight connections between the respective inlets and outlets of the treatment assembly 630 and the base assembly 610. The pivotable engagement structure 650 may be rotated away from the treatment assembly engagement surface 670 to facilitate removal of the treatment assembly 630 from the base assembly 610.

In one embodiment, as depicted in further detail in FIG. 57, the pivotable engagement structure 650 or the treatment assembly engagement surface 670, or both may include a ramped or curved section 672 that facilitates initial engagement of the two components and leads to the friction fit section 671 as the pivotable engagement structure 650 is rotated into engagement. This configuration may aid an end user in re-engaging the pivotable engagement structure 650 without significant effort to push or hold the treatment assembly 630 in place. Additionally, the friction fit section 671 may facilitate maintaining the engagement between the treatment assembly engagement surface 670 and the pivotable engagement structure 650. The illustrated embodiments of FIGS. 56A-E illustrate this progression between rotating the pivotable engagement structure 650 to engage with the treatment assembly engagement surface 670 and installation of the treatment assembly 630 into the base assembly 610.

VII. Display Unit and User Interface Assembly

A display unit in accordance with one embodiment of the present disclosure is shown in FIGS. 44 and 45A-D and generally designated 314. The display unit 314 as discussed herein may include an LED array 424 including a support substrate 426 for a first plurality of LEDs 960 and a second plurality of LEDs 962A-C. The display unit 314 may include a display unit body 423 operable to support the LED array 424 and to direct light in accordance with one or more embodiments described herein. For instance, the display unit body 423 may include one or more apertures 954A-C, 965 operable to accept an optical element 950, 952A-C to facilitate directing light from an LED 960, 962A-C through the graphic mask 422 and through a display panel 970. In one embodiment, the display panel 970 may facilitate providing a display 315, which may be a dead front display, in conjunction with the graphic mask 422, the optical element 950, 952A-C, and the LEDs 960, 962A-C.

In one embodiment, the graphic mask 422 may include graphical elements 956A-C, 966 that allow light to pass through the graphic mask 422. The graphical elements 956A-C, 966 may correspond to an icon pertaining to information that can be recognized by the user. The icon may take the form of a graphical symbol that is a pictorial representation of the information, such as a Wi-Fi symbol or power ON/OFF symbol. The icon, however, is not limited to this form. The graphical elements 956A-C, 966 may correspond to a shape or feature that facilitates conveying information, such as status, to a user. For example, the graphical element 966 is in the form of a vertical strip that extends approximately from an upper portion to a lower portion of the display panel 970. The vertical strip may emit light as discussed herein in a substantially uniform, consistent manner along the length of the vertical strip despite the light being generated from a plurality of point sources in the form of the first plurality of LEDs 960. The first plurality of LEDs 960 may be selectively controlled to produce variable light output via the graphical element 966, such as a waterfall feature, rolling pulses, flashes, or any activation pattern or activation sequence of the LEDs 960, or a combination thereof. It is noted that the LEDs 960, 962 may be controlled, collectively or individually, to generate light of varying intensity. The LEDs 960, 962 are shown and described as light emitting diodes, but the present disclosure is not so limited. The LEDs 960, 962 may be any type of light source.

The display unit may include a connector 990 capable of connecting with the detachable tether 317.

Figures 45A, 45B:
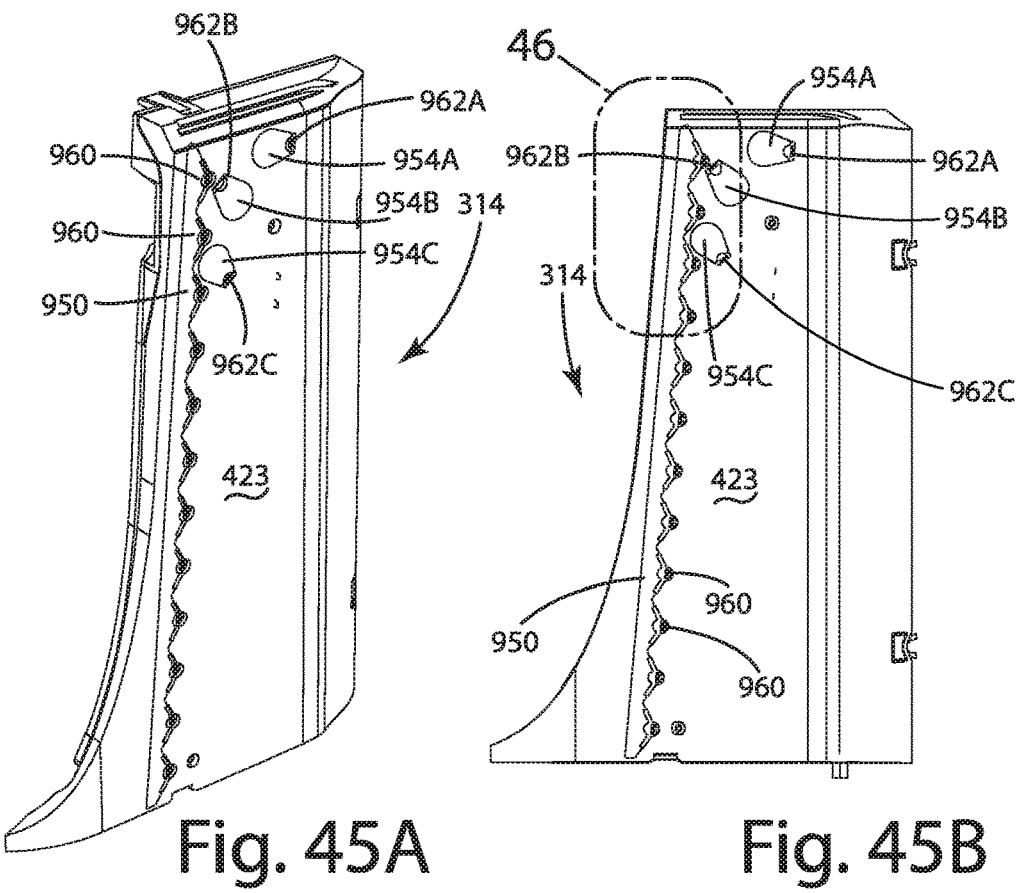
FIGS. 45A-E depicts a display unit of a water treatment system in accordance with one embodiment respectively in a perspective view, a front view, a side view, a rear view, and a top view.
Figures 45C, 45D, 45E:
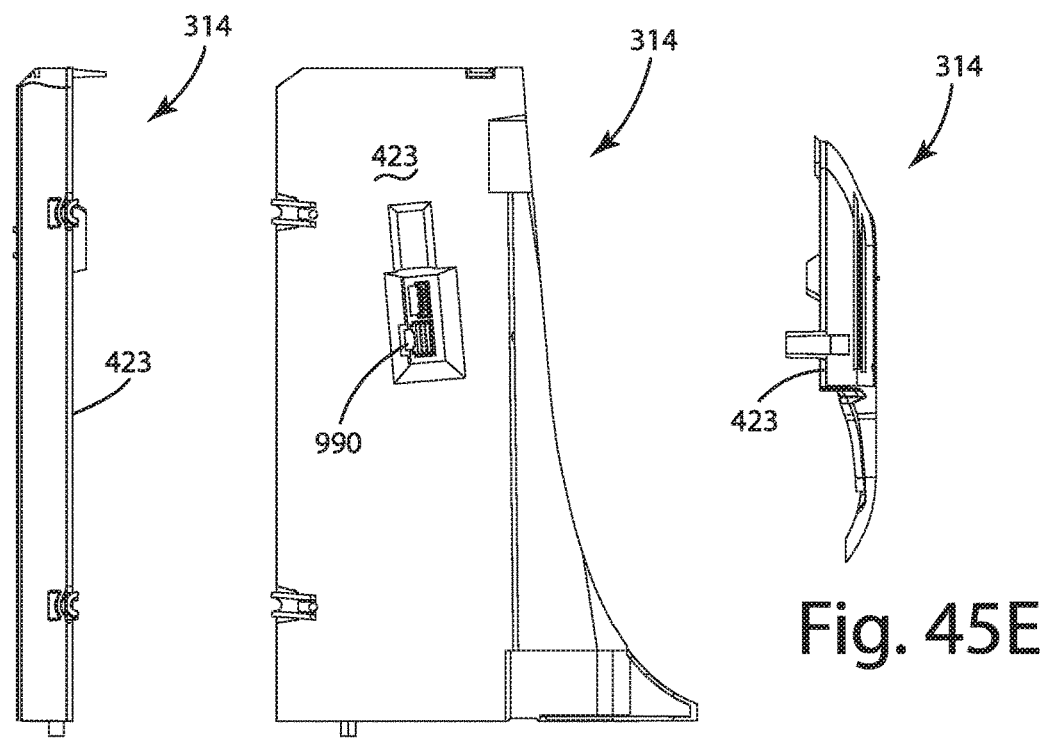
Figure 46:
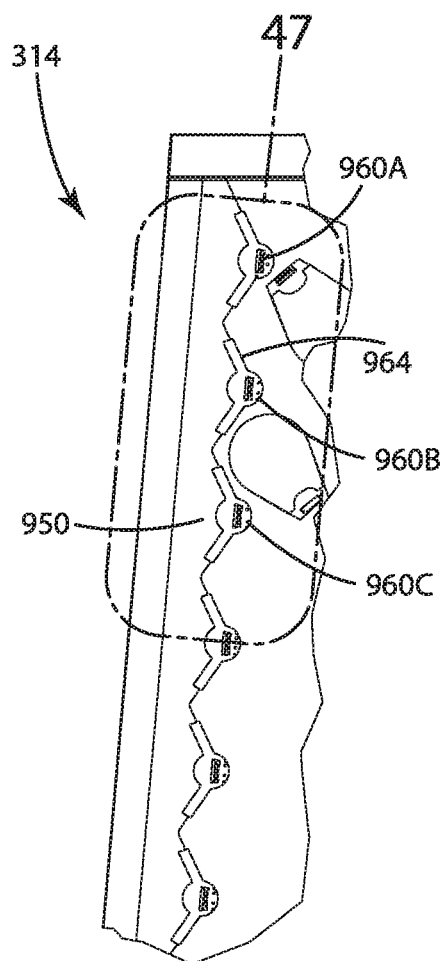
FIG. 46 shows an expanded portion of the display unit of FIG. 45B.
Figure 47:
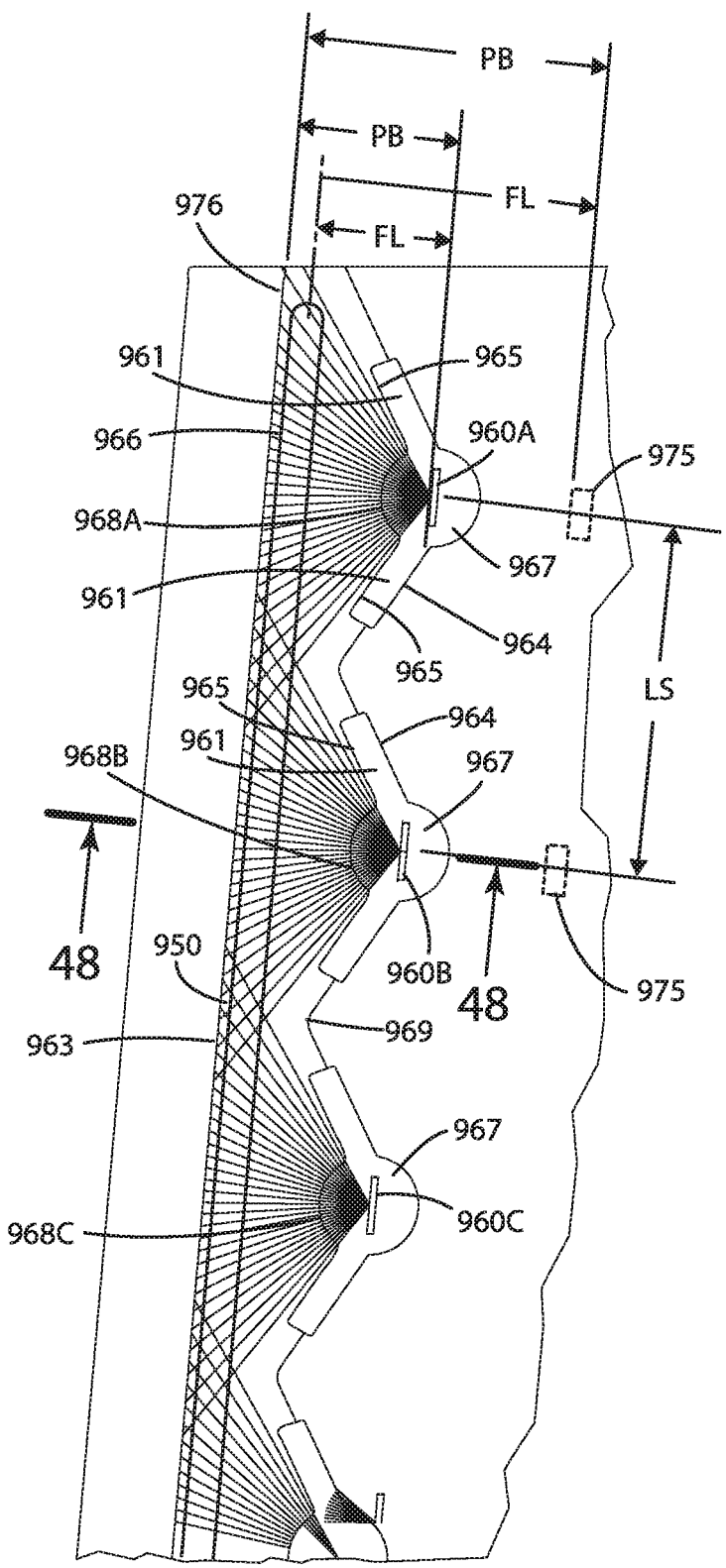
FIG. 47 shows an expanded portion of the display unit of FIG. 46.

The display unit 314 is shown in further detail in accordance with one embodiment in FIGS. 46, 47, and 48A-C. The display unit 314 in the illustrated embodiment of FIG. 46 is an expanded view of FIG. 45B, showing the plurality of LEDs 960, labeled 960A, 960B, 960C for discussion purposes. FIG. 47 shows a further expanded view of the display unit 314 of FIG. 46 with the distribution of light in accordance with a first pass of light energy output respectively from the LEDs 960A-C. The display unit body 423 in the illustrated embodiment at least partially defines a light source generation zone 967 with a body surface 964 that is substantially opaque with respect to light generated from the LEDs 960A-C.

The optical element 950 may include a light receiving surface 968A-C that at least partially defines the light source generation zone 967, and that is curved or shaped relative to the light output from the LEDs 960 to provide a surface that is substantially normal to the light output from the LEDs 960. The LEDs 960 may generate light having an output angle, such as 60°. The angle between each beam of light output from the LEDs 960 and the light receiving surface 968A-C may be substantially 90° or normal such that the boundary formed by the light receiving surface 968A-C does not substantially affect the angle of each beam. In the illustrated embodiment, the light receiving surface 968A-B is concave relative to the LEDs 960A-C and has a curvature with a focal point aligning substantially with the position of the LEDs 960. Avoiding redirecting the light at the light receiving surface 968A-B may substantially avoid efficiency losses associated with such redirection.

In one embodiment, the LEDs 960 and the light receiving surface 968A-C may be operable to direct light output from the LEDs 960 to overlap with light output from adjacent LEDs 960.

In the illustrated embodiment, the body surface 964 and an optical boundary surface 965 of the optical element 950 may be spaced from each by a gap 961. The size of the gap 961 may be selected to form a boundary at the optical boundary surface 965 that provides internal reflection of light encountering the optical boundary surface 965 after the light has entered the optical element 950. The optical boundary surface 965, in one embodiment, may be a polished surface to provide for internal reflection of light. The gap 961 and internal reflection at or near the optical boundary surface 965 may facilitate providing more uniform distribution of light within the optical element 50 despite the light being generated from a plurality of point sources in the form of the LEDs 960. For instance, from the user's perspective, the light output may be uniform such that there is an absence of hot spots or areas of visibly higher light intensity. The gap 961, in one embodiment, may provide for more efficiently distribution of light within the optical element 950.

In the illustrated embodiment, it is noted that the optical element 950 and the body surface 964 are closely positioned, potentially contacting each other, in a region 969 between adjacent gaps 961 defined by the optical boundary surface 965 and the body surface 964. The angle of the gap 961 relative to the output angle of the LEDs 960 may be configured such that light output from the LEDs 960 is not provided directly within or toward the gap 961, whereas the optical boundary surface 965 is proximal the limit of the output beam generated by the LEDs 960 as depicted. This way, light from the LEDs 960 may enter the optical element 950 and be maintained within the optical element 50 in an efficient manner.

The arrangement and configuration of the LEDs 960, the display unit body 423, and the graphical element 966 may provide for substantially uniform light output via the graphical element 966 despite the light being generated from a plurality of point sources. Light visible by a user via the graphical element 966 may be considered substantially uniform as perceived by the user such that significant changes in intensity with respect to the graphical element 966 do not appear to the user. The light density shown in the illustrated embodiment of FIG. 47 is less than substantially uniform with respect to the graphical element 966; however, it is noted that the light beams shown in the illustrated embodiment correspond to the first pass of light through the optical element 950. As discussed herein, the optical element 950 may be configured and positioned such that light internally reflects within and exits the optical element 950 in an area corresponding to the graphical element 966 in a substantially uniform manner.

Figure 48A:
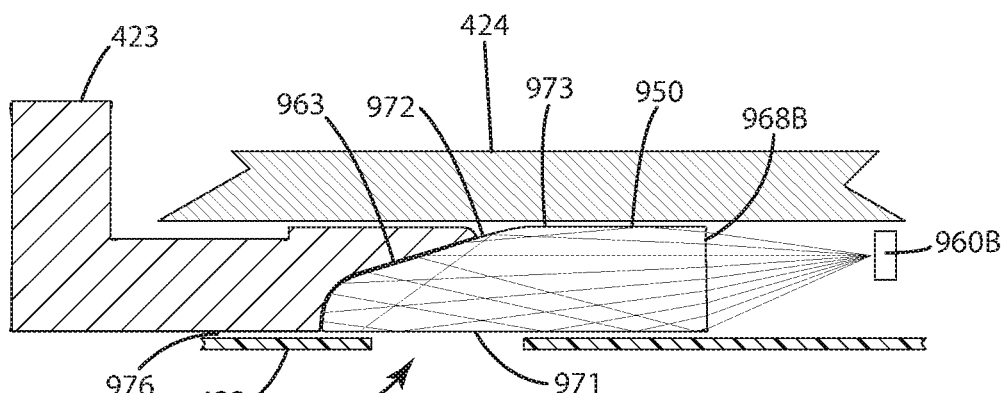
FIGS. 48A-C show a sectional view of FIG. 47 in various modes of operation.
Figure 48B:
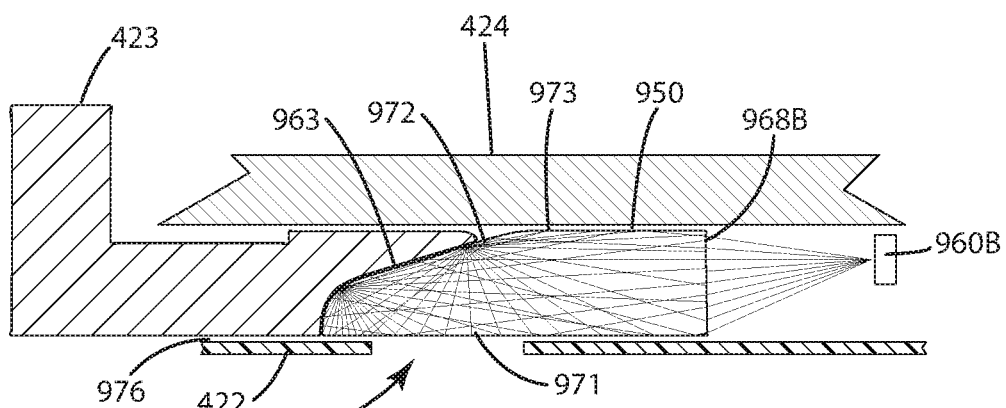
Figure 48C:
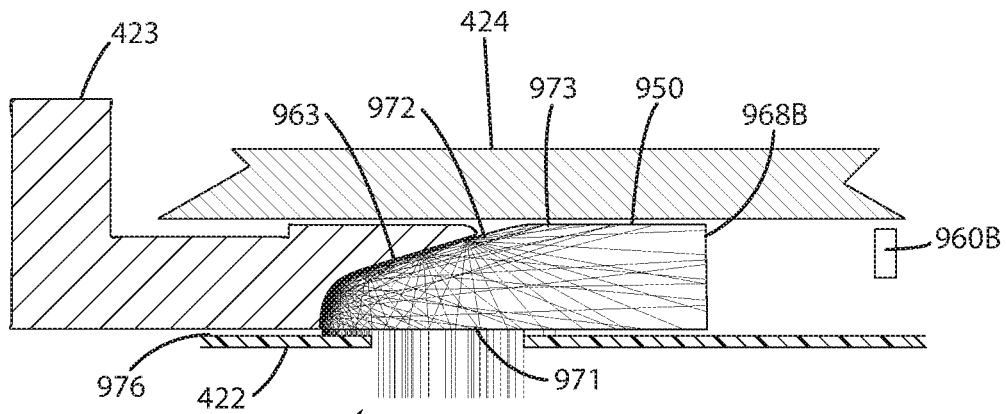

Turning to the illustrated embodiments of FIGS. 48A-C, the path of light within the optical element 950 is shown in further detail. The optical element 950 may be a clear optic or transparent material operable to allow light transmission without substantial power loss. The optical element 950 may include a mask facing surface 971 and a light scattering surface 972, as well as the light receiving surface 968 described herein.

A first pass of light within the display unit 314 is shown in a representative manner in FIG. 48A with light being output from the LED 960B and entering the optical element 950 via the light receiving surface 968, which may be polished and constructed relative to the position of the LED 960B to provide low or minimal light redirection. The light may be reflected within the optical element 950 via the light scattering surface 972, which may be bonded to the display unit body 423 to facilitate light scattering. Light scattering in accordance with one embodiment may involve diffuse reflection or reflection of light from a surface such that a ray incident to the surface is scattered at more than one angle. The light scattering surface 972 in the illustrated embodiment may facilitate internal reflection of light in a scattered manner.

In the illustrated embodiment of FIG. 48B, light scattering within the optical element 950 is shown in a representative manner. The mask facing surface 971 and the rear facing surface 973, as well as the light receiving surface 968 and the optical boundary surface 965, may be constructed to provide internal reflection of light (e.g., these surfaces may be polished). Internal reflection in conjunction with the light scattering surface 972 may facilitate filling the optical element 950 with light in a substantially uniform manner.

The illustrated embodiment of FIG. 48C depicts a representative view of the aggregate scattering and reflection of light within the optical element 950. In the illustrated embodiment, when the incident angle of light with respect to the mask facing surface 971 is greater than an escape angle (e.g., greater than about 45°) and the light corresponds to a location of the graphical element 966, the light may escape the optical element 950 and be externally visible to a user of the water treatment system 100.

The configuration of the light receiving surface 968, the gaps 961, and the positioning of the LEDs 960 may enable a more compact construction relative to the placement of LEDs 975 shown in FIG. 47. It is noted that, by increasing the distances PB and FC, for a given spacing LS between LEDs 960, 975, more uniform light distribution may be achieved with respect to the graphical element 966 without inclusion of the gaps 961 and related construction. However, the light receiving surface 968 and the gaps 961, as well as the surface configurations of the optical element 950, may enable the distance PB and FC to be reduced to provide a more compact construction. In the illustrated embodiment, the distances PB, FC, and LS for the LEDs 960 are approximately 0.46", 0.36", and 1.0", respectively. The distances PB, FC, and LS for the LEDs 975 are approximately 1.0", 0.89", and 1.0", respectively.

In the illustrated embodiment, a substantially uniform distribution of light within the optical element 950 may be provided with a ratio of the distance between the LEDs 960 and a body boundary 976 (e.g., distance PB) and spacing between the adjacent LEDs 960 (e.g., distance LS) may be approximately 0.48 to 1 (e.g., distance LS being approximately two times distance PB). The ratio of the distance between the LEDs 960 and the center of the graphical element 966 (e.g., distance FC) and the distance LS may be approximately 0.35 to 1 (e.g., distance LS being approximately 2.8 times distance FC). In contrast, with respect to the LEDs 975, the ratio of the distance PB to the distance LS may be 1 to 1, and the ratio of the distance FC to the distance LS may be 0.88 to 1. The ratio of the distance PB to the distance LS may be 0.75 to 1 or less (e.g. distance LS being 1.3 or greater times distance PB), an optionally 0.50 or less (e.g., distance LS being 2 or greater times distance PB), where the position of the LEDs 960 and the configuration of the optical element 950 provide for substantially uniform distribution of light within the optical element despite the light being generated from a plurality of point sources in the form of the LEDs 960.

As mentioned herein, portions of the display unit 314 may be receptive to user feedback. Such portions may include capacitive touch sensors operable to detect presence of a user's finger, and to provide information to the control system 318 indicative of a detected presence. The control system 318 may act on the information to change a state of the water treatment system 100 or provide information to the user via the display 315, such as by directing the display unit 314 to change a display characteristic.

Figure 49:
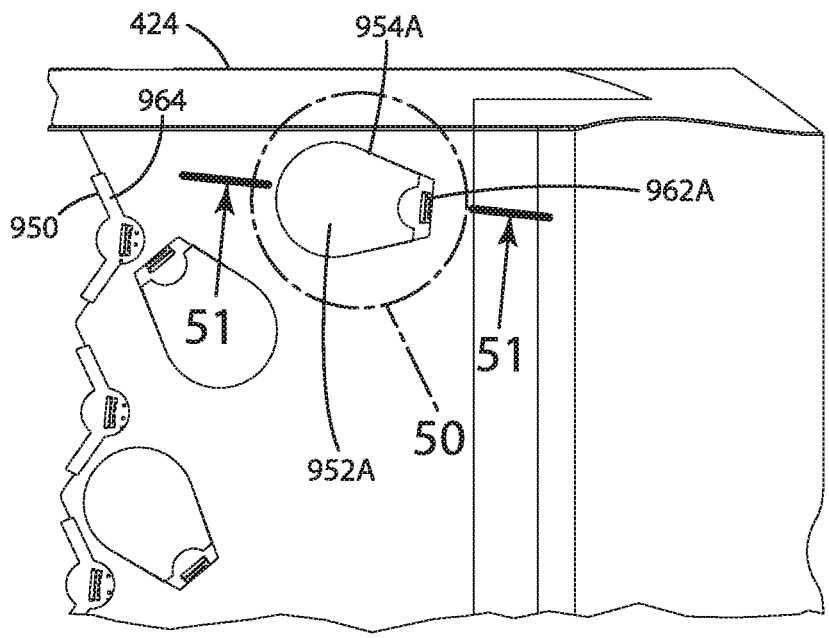
FIG. 49 shows an expanded portion of the display unit of FIG. 45B.
Figure 50A:
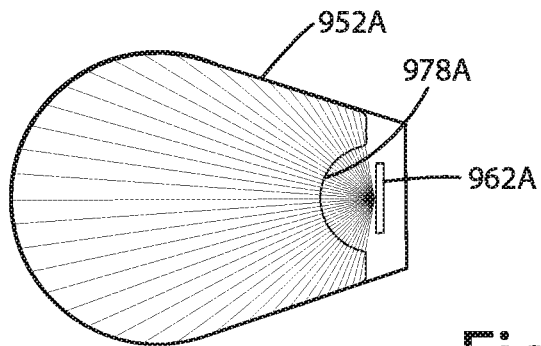
FIGS. 50A-B shows an expanded portion of the display unit of FIG. 49 in various modes of operation, with ray traces according to modes similar to those shown in FIGS. 51A and 51B.
Figure 50B:
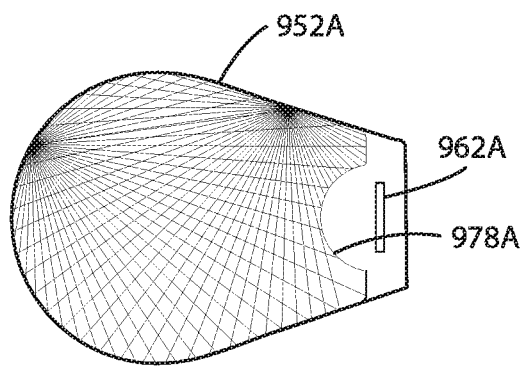

In the illustrated embodiment of FIGS. 49, 50A-B, and 51A-C, aspects of the display unit 314 are shown in further detail. FIG. 49 depicts an expanded view of the display unit 314 of FIG. 45B, and FIGS. 50A-B show a further expanded view of FIG. 49. The display unit 314 may include the optical element 952A and an LED 962A disposed within an aperture 954 of the display unit body 423, which may be opaque. The optical element 952 may be configured to receive light from the LED 962A via a light receiving surface 978A. The light receiving surface 978A may be similar to the light receiving surface 968A such that the light receiving surface 978A may have a curvature and position relative to the LED 962A such that a direction of light received by the optical element 952A by the LED 962A is substantially the same before and after traversing the light receiving surface 978A. For instance, the light receiving surface 978A may be convex with a curvature having a focal point substantially aligned with a location of the LED 962A, such that light generated from the LED 962A traverses the light receiving surface 978 at an angle of approximately 90° or normal to the light receiving surface 978 to substantially avoid redirection of the light entering the optical element 952A.

In the illustrated embodiment of FIGS. 51A-C, the path of light within the optical element 952A is shown in further detail. The optical element 952A may be a clear optic or transparent material operable to allow light transmission without substantially power low. The optical element 952A may include a mask facing surface 981, a light scattering surface 982, and a rear facing surface 983.

A first pass of light within the display unit 314 is shown in a representative manner in FIGS. 50A and 51A with light being output from the LED 962A and entering the optical element 952A via the light receiving surface 978A, which may be polished and constructed relative to the position of the LED 962A to provide low or minimal light redirection. The light may be reflected within the optical element 952A via the light scattering surface 982, which may be bonded to the display unit body 423 to facilitate light scattering. Light scattering in accordance with one embodiment may involve diffuse reflection or reflection of light from a surface such that a ray incident to the surface is scattered at more than one angle. The light scattering surface 982 in the illustrated embodiment may facilitate internal reflection of light in a scattered manner.

In the illustrated embodiment of FIGS. 50B and 51B, light scattering within the optical element 952A is shown in a representative manner. The mask facing surface 981 and the light receiving surface 978A, may be constructed to provide internal reflection of light (e.g., these surfaces may be polished). The rear facing surface 983 may be configured for light scattering (e.g., with a diffuse finish), similar to the light scattering surface 982. Internal reflection in conjunction with the light scattering may facilitate filling the optical element 952A with light in a substantially uniform manner.

The illustrated embodiment of FIG. 48C depicts a representative view of the aggregate scattering and reflection of light within the optical element 952A. In the illustrated embodiment, when the incident angle of light with respect to the mask facing surface 981 is greater than an escape angle (e.g., greater than about 45°) and the light corresponds to a location of the graphical element 956A, the light may escape the optical element 952A and be externally visible to a user of the water treatment system 100.

VIII. Alternative User Interface Assembly

Figure 60:
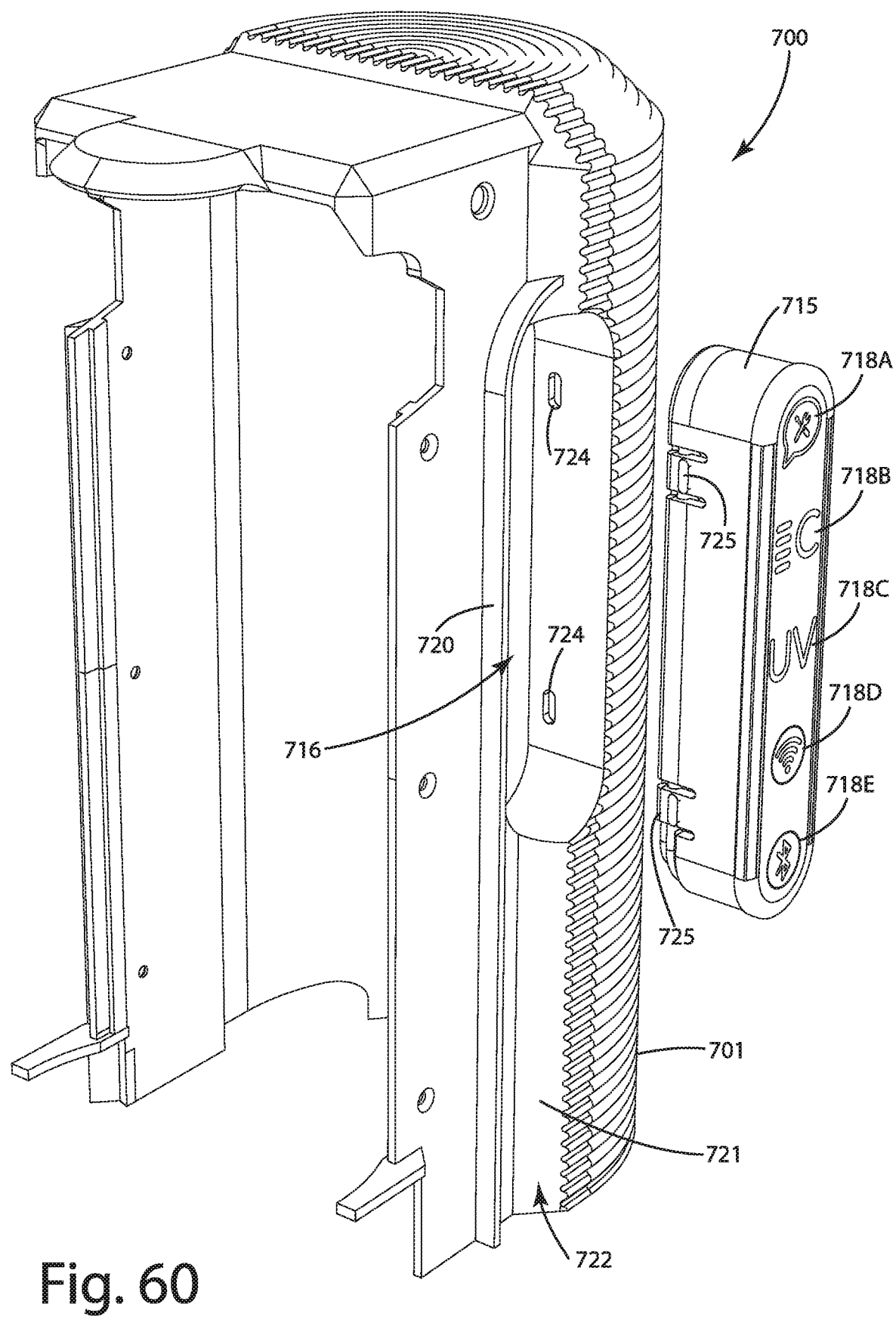
FIG. 60 shows a perspective view of a cover assembly and a display unit in accordance with one embodiment.

A display unit in accordance with one embodiment of the present disclosure is shown in FIG. 60, and generally designated 715. The display unit 715 is similar to the display unit 314 described in conjunction with the water treatment system 100, but with several exceptions. The display unit 715 in the illustrated embodiment in conjunction with the cover 700 and water treatment system 100 may provide a user interface assembly for operation of the water treatment system 100.

The display unit 715 in the illustrated embodiment may be a modular unit that can be engaged with a cover 700, which, in a manner similar to the display unit 715, may be similar to the cover 310 described in conjunction with the water treatment system 100, but with several exceptions. For instance, in the illustrated embodiment, the cover 700 may include a plurality of ribs 701 disposed on an external surface of the cover 700. Additionally, the cover 700 may include a display unit receiver 716 constructed to engage with and hold the display unit 715 in place for operation. The display unit receiver 716 may include a space that receives the display unit 715 and one or more depressions or apertures 724 operable to receive one or more respective protrusions 725 disposed on the display unit 715. In the illustrated embodiment, the display unit 715 may engage the display unit receiver 716 by "snapping" or "clicking" the display unit 715 into the display unit receiver 716 via engagement of one or more protrusions 725 with one or more apertures 724. The display unit receiver 716 may be configured such that, after the display unit 715 is engaged with the display unit receiver 716, removal of the display unit 715 may be substantially impeded without removal of the cover 700 and access to one or more apertures 724 from within the inner space of the cover 700. Although not shown, the display unit receiver 716 may include an electrical connector operable to mate and form an electrical connection with a corresponding electrical connector provided on the display unit 715. This way, the display unit 715 may receive power from the water treatment system 100 and communicate with the control system 318 of the water treatment system 100 (e.g., via one or more serial communication links or one or more discrete inputs and outputs, or any combination thereof).

In the illustrated embodiment of FIG. 60, the cover 700 may include a reflector 720 operable to reflect light received from the display unit 715 and at least one of back toward the display unit 715 and within a channel 722 provided between the reflector 720 and a cover surface 721 that operates as a reflector, like the reflector 720. However, in the illustrated embodiment, the cover surface 721 instead of receiving light directly from the display unit 715 may receive such light indirectly via reflection from the reflector 720.

Figure 59:
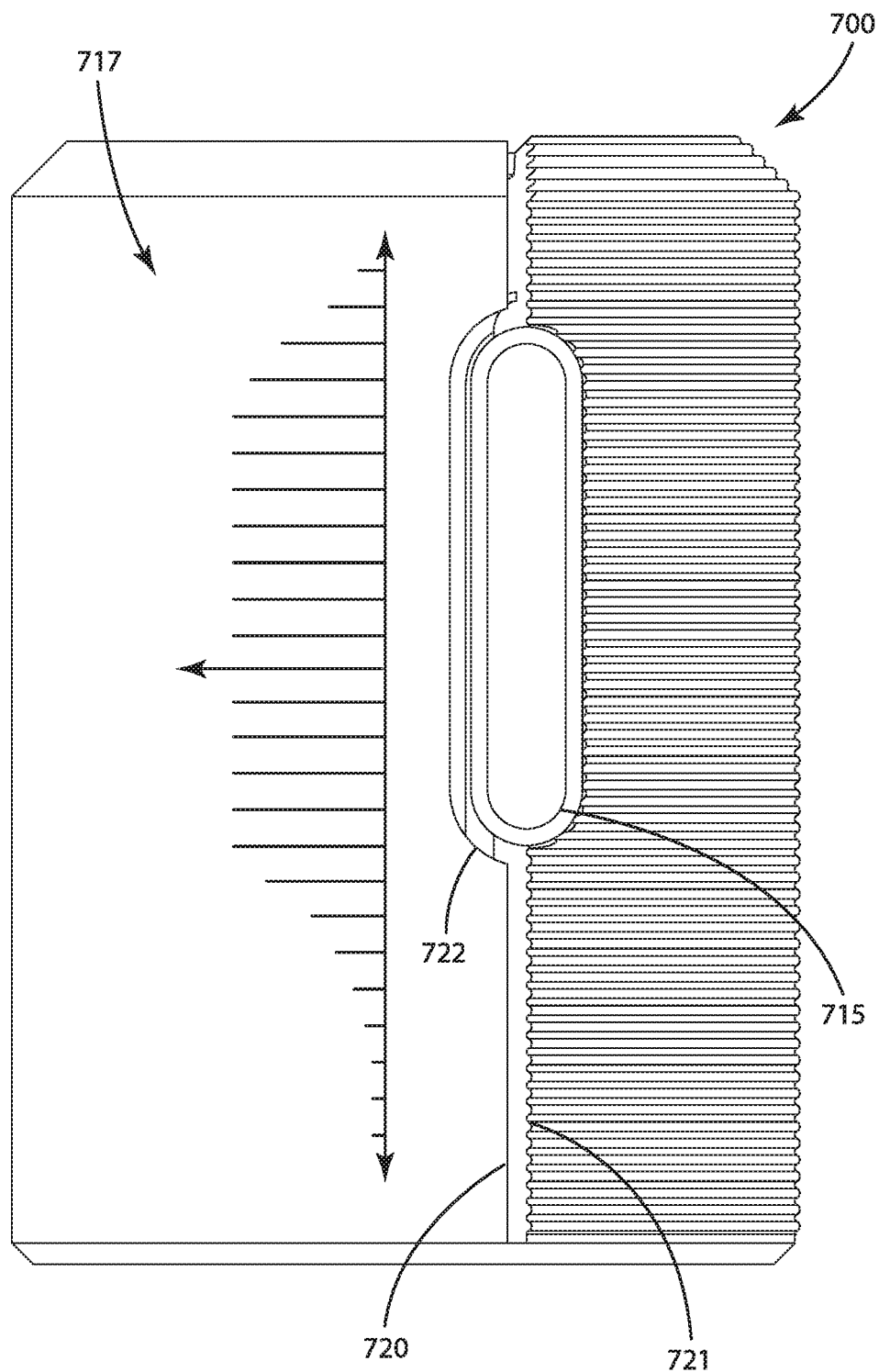
FIG. 59 shows a side view of a water treatment system in accordance with one embodiment.

The display unit 715, the reflector 720, and the cover surface 721 may operate in conjunction with each other to provide light within the channel 722. Such light within the channel 722 may include one or more lighting effects, such as a fading effect provided by successive reflection of light between the reflector 720 and the cover surface 721. The fading effect can be seen in accordance with one embodiment in FIG. 59 with a light intensity diagram 717 depicted alongside the channel 722 of the cover 700. The light intensity diagram 717 shows the light intensity near a light source or central portion of the display unit 715 being greater within the channel 722 relative to the light intensity within portions of the channel distal from the light source or central portion of the display unit 715.

The light within the channel 722 may be controlled via light output from the display unit 715 to provide end-user status information with respect to operation of the water treatment system 100. In one embodiment, the light within the channel 722 may provide such status information that can be seen at a glance from a distance (e.g., more than an arm's length away). As an example, the display unit 715 may light up the channel 722 with light that varies in color depending on the status of the water treatment system 100. Blue light, for instance, may be displayed when the system is active and operating to comply with one or more operating condition parameters. Red light may be displayed when the system is active but operating in a manner that does not comply with one or more operating condition parameters. In one embodiment, the display unit 715 may also blink the light on and off to convey information to the end-user, such as indicating that the water treatment system 100 is operating to treat water by blinking blue on and off. The display unit 715, in turning a light on or off, may fade between the two states so that the change in state is not abrupt. It should be understood that light output from the display unit 715 may be controlled in a variety of ways and is not limited to those described herein.

The display unit 715 may also include one or more feedback indicators 718A-E. The feedback indicators 718A-E may convey status information to an end-user that can be understood at a closer distance than the light provided to the channel 722 by the display unit 715. For instance, in the illustrated embodiment, the feedback indicator 718A provides a maintenance indicator instructing an end-user that the water treatment system 100 may require maintenance, the feedback indicator 718B may be a level indicator showing a remaining operational life for a carbon block filter, the feedback indicator 718C may identify whether the UV reactor is operational and if so whether the UV reactor is operating in compliance with one or more operating parameters (e.g., blue for compliance and red for noncompliance). The feedback indicator 718D may identify whether the water treatment system 100 is operably connected to a first type of wireless network, such as a Wi-Fi network. The feedback indicator 718E may identify whether the water treatment system 100 is operably connected to a second type of wireless network, such as a Bluetooth network. The one or more feedback indicators 718 may be configured to provide a variety of lighting effects as described herein, but it is to be understood that the present disclosure is not so limited. Any type of lighting effect may be provided by a feedback indicator 718.

In the illustrated embodiment, a feedback indicator 718 may be, additionally or alternatively, associated with a user input. The user input may take the form of a capacitive input or other type of touch-based input. Circuitry for such touch-based input may be provided near or on the surface of the display unit that is accessible to the end-user.

Figure 61:
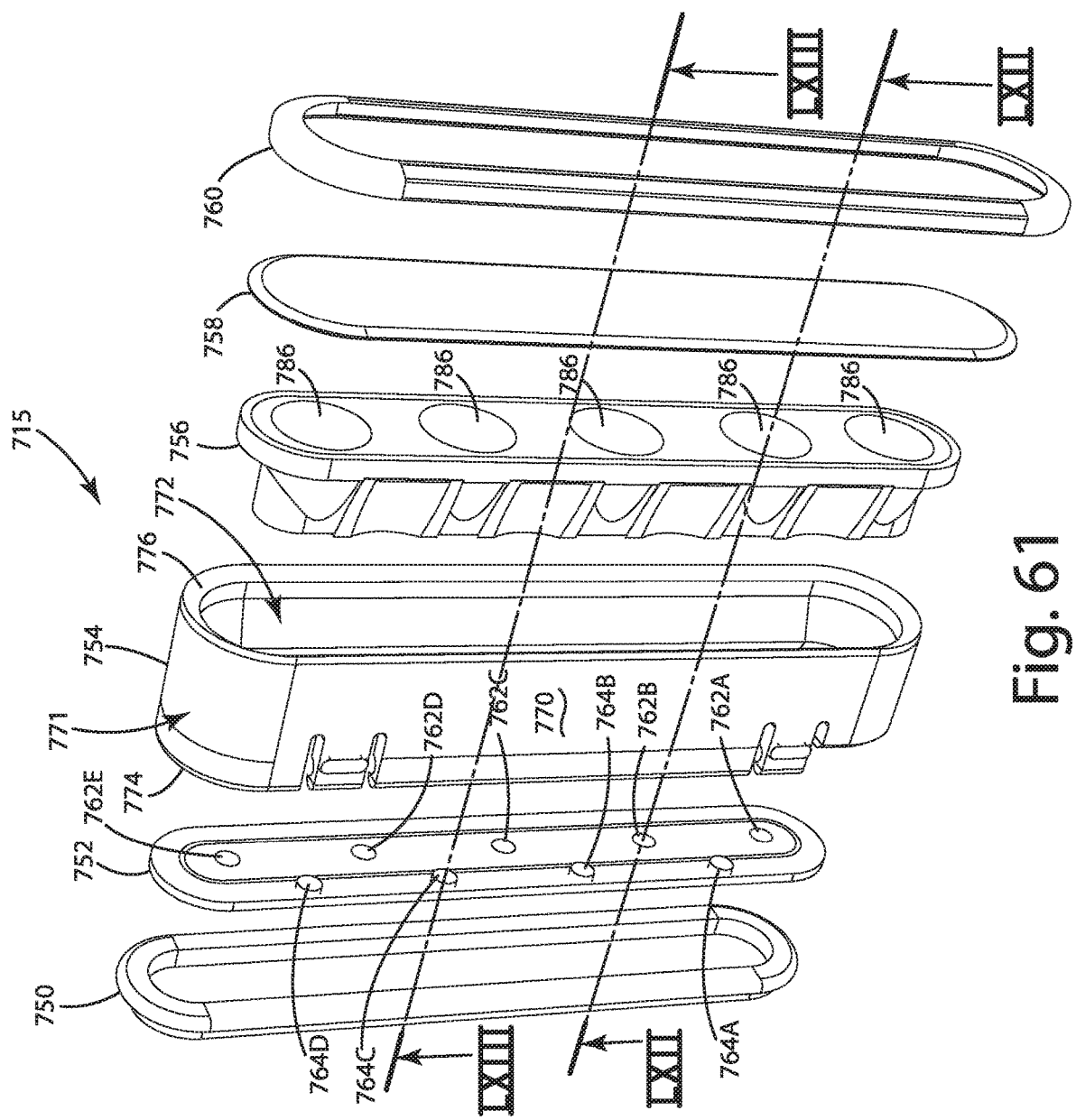
FIG. 61 depicts an exploded view of a display unit in accordance with one embodiment.
Figure 62:
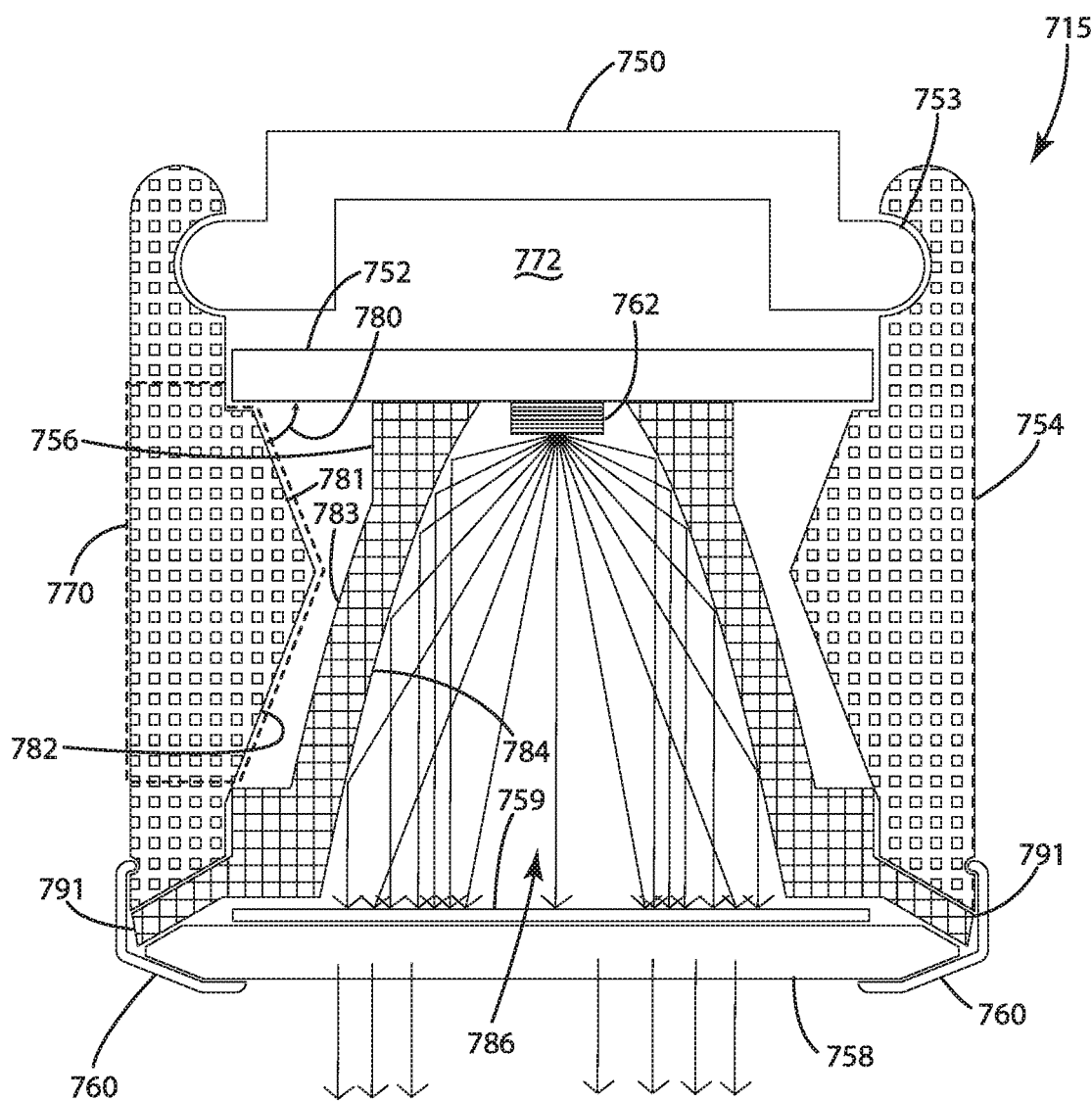
FIG. 62 shows a sectional view of the display unit of FIG. 61.
Figure 63:
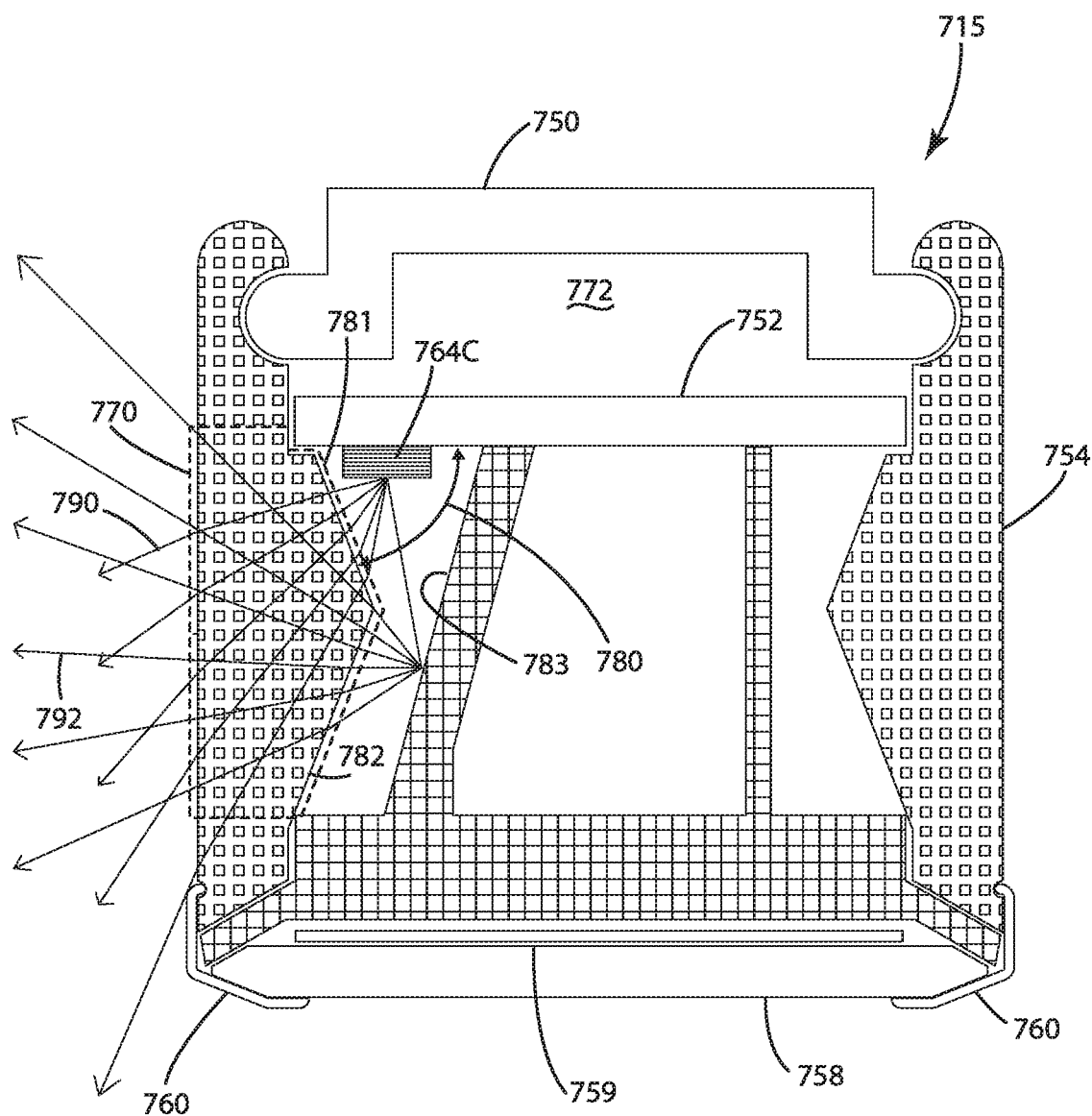
FIG. 63 shows a sectional view of the display unit of FIG. 61.

Turning to the illustrated embodiment of FIGS. 61-63, the display unit 715 is shown in further detail in an exploded view and two sectional views. The display unit 715 may include one or more of the following components: a back cover 750, display unit circuitry 752, a housing 754, a director assembly 756, an optical cover 758, and trim assembly 760. The director assembly 756 may include one or more light directors 786 constructed to interface with one or more light sources provided by the display unit circuitry 752 and to direct light therefrom to the optical cover 758. In the illustrated embodiment, the optical cover 758 may include an optical mask 759 that enables light to pass from the light director 786 to areas external to the water treatment system 100 in accordance with the mask area associated with the light director 786. For instance, the optical mask 759 may respectively define the one or more symbols associated with the one or more feedback indicators 718A-E to allow light from an optical director 786 to illuminate an area that is unmasked by the optical mask 759.

The housing 754 in the illustrated embodiment includes an internal space 772 defined by a sidewall 771 constructed to accept the director assembly 756 and the display unit circuitry 752. The housing 754 includes an output opening 776 through which light may pass from the director assembly 756. The housing 754 may include a rear opening 774, which may be covered by the back cover 750 in an assembled condition. In the illustrated embodiment, the housing 754 may include a depression 753 disposed about an internal perimeter of the housing 754 in proximity to the rear opening 774. The back cover 750 may be constructed to at least partially fit within the depression 753, thereby maintaining an installed position of the back cover 750 and facilitating holding components within the housing 754 or protecting such components, or a combination thereof.

The display unit 715 and illustrated embodiment includes display unit circuitry 752 constructed to provide power circuitry for supplying energy to a primary light source 762 and to a secondary light source 764, alternatively described herein respectively as a first light source and a second light source. The primary light source 762 may be disposed in proximity to the central longitudinal axis of the display unit circuitry 752, and the secondary light source 764 may be disposed in proximity to a perimeter of the display unit circuitry 752. In the illustrated embodiment, the display unit circuitry 752 includes a plurality of the primary light source 762A-E and a plurality of the secondary light source 764A-D. The secondary light sources 764 may be disposed in proximity to the sidewall portion 770, optionally on one side of the display unit circuitry 752.

In the illustrated embodiment, the housing 754 includes a sidewall portion 770, which, for purposes of disclosure, is shown in phantom lines in the illustrated embodiment of FIGS. 61-63. It is to be understood that the sidewall portion 770 may comprise any part of the housing 754, including the entirety of the housing 754. The sidewall portion 770 in the illustrated embodiment is at least translucent, and optionally transparent, with respect to light generated from the secondary light source 764 of the display unit 715. The sidewall portion 770 in the illustrated embodiment is a lens through which light from the secondary light source 764 of the display unit 715 may be directed. The lens includes a first lens surface 781, and a second lens surface 782 in the illustrated embodiment.

The housing 754 in the illustrated embodiments of FIGS. 62-63 is configured to receive the display unit circuitry 752, such that a printed circuit board of the display unit circuitry 752 and the position of the primary and secondary light sources 762, 764 aligns a primary light source 762 with an optical director 786 and aligns the secondary light source 764 with the lens defined by the sidewall portion 770. The optical director 786 and the printed circuit board of the display unit circuitry 752 may interface with each other to provide a light-tight construction or an interface that spatially prevents light generated from the primary light source 762 from leaking into a space defined between the sidewall portion 770 and the optical director 786. Likewise, the interface between the optical director 786 in the printed circuit board of the display unit circuitry 752 may prevent light leakage with respect to light generated from the secondary light source 764 into an internal cavity of the optical director 786.

The director assembly 756 in the illustrated embodiment may be received by the housing 754 in the internal space 772 thereof. A lip 791 of the director assembly 756 may engage the sidewall 771 of the housing 754 in proximity to the optical output opening 776. The optical cover 758, including the optical mask 759, may be positioned to contact the lip 791 of the director assembly 756. The trim assembly 760 may be fitted about a perimeter of the optical cover 758 and constructed to engage a depression defined by the sidewall 771 of the housing 754 in order to hold both the optical cover 758 and the director assembly 756 in position.

In one embodiment, the back cover 750 may be configured to interface with the printed circuit board of the display unit circuitry 752 in order to position and hold the printed circuit board of the display unit circuitry 752. For instance, the back cover 750 may interface with the printed circuit board to sandwich the printed circuit board between a) at least one of the housing 754 and the director assembly 756 and b) the back cover 750.

The optical director 786 in the illustrated embodiment includes a reflector surface 784 constructed to define the internal cavity of the optical director 786, in which light from the primary light source 762 is directed. In one embodiment, the reflector surface 784 may define a developed shape or an intentional shape.

The reflector surface 784 may be shaped in a variety of ways, depending on the application, in order to direct light from the primary light source 762 toward the optical cover 758. In one embodiment, the reflector surface 784 may be constructed to provide a substantially even distribution of light on the optical mask 759 of the optical cover 758, thereby facilitating a substantially even distribution of light transmitted externally from the optical cover 758. In the illustrated embodiment, the reflector surface 784 is defined substantially by a parabolic surface (e.g., a circular paraboloid) configured to direct light from the first or primary light source 762 toward the optical cover 758. Such a configuration may yield light distribution across the internal surface of the optical cover 758 in a substantially even manner.

The first lens surface 781 shown in the illustrated embodiment of FIG. 63 is provided at an angle 780 that is acute relative to a plane defined by the printed circuit board of the display unit circuitry 752. The plane may be normal to an axis of the secondary light source 764 that defines its primary direction of light emission. It is to be understood that the angle 780 may vary from application to application, depending on design parameters. The angle 780 may be determined to facilitate directing light from the secondary light source 764 to the sidewall portion 770, and potentially toward the reflector 720 in accordance with one embodiment described herein. The first lens surface 781 may be configured to receive light directly from the secondary light source 764. The primary light path 790 shows this direct path from the secondary light source 764 through the first lens surface 781 and external to the sidewall portion 770.

As depicted in the illustrated embodiment of FIGS. 62-63, a portion of the internal space 772 (e.g., air) may be present between the secondary light source 764 and the first lens surface 781. It is to be understood that this space between the secondary light source 764 and the first lens surface 781 may be filled with a substance other than air, such as a solid optical waveguide.

The second lens surface 782 of the sidewall portion 770 in the illustrated embodiment may be configured to receive light indirectly from the secondary light source 764 via reflection from another surface. For instance, in the illustrated embodiment, the director assembly 756 may include a reflector surface 783 that is integral to the director assembly 756 and external to the internal cavity defined by the reflector surface 784. The secondary light path 792 shows this indirect path provided from the secondary light source 764, reflected off the reflector surface 783, through the second lens surface 782, and external to the sidewall portion 770.

The primary light path 790 may provide the primary illumination beam for light generated from the display unit 715 and external to the sidewall portion 770. The secondary light path 792 may provide a secondary illumination beam, potentially a smoothing infill beam, for light generated from the display unit 715 and external to the sidewall portion 770.

The secondary lens surface 782 may provide at an angle (relative to the plane of the printed circuit board) to facilitate generation of the secondary illumination beam. Additionally or alternatively, the angle of the secondary lens surface 782 may be determined to facilitate providing space within the internal space 772 to accept the director assembly 756 and to enable reflection of light from the reflector surface 783 of the director assembly 756.

The positioning of the primary and secondary light sources 762, 764 on the printed circuit board of the display unit circuitry 752 may vary from application to application. In the illustrated embodiment, the primary light sources 764 are disposed on the printed circuit board to align respectively with each of the optical directors 786 of the director assembly 756. The secondary light sources 764 are provided on the printed circuit board in a staggered position relative to the primary light sources 762 along the longitudinal axis of the printed circuit board. This staggered positioning may facilitate packaging the primary and secondary light sources 762, 764 and construction of the director assembly 756 to enable directing light from the secondary light sources 764 through the sidewall portion 770.

Figure 65:
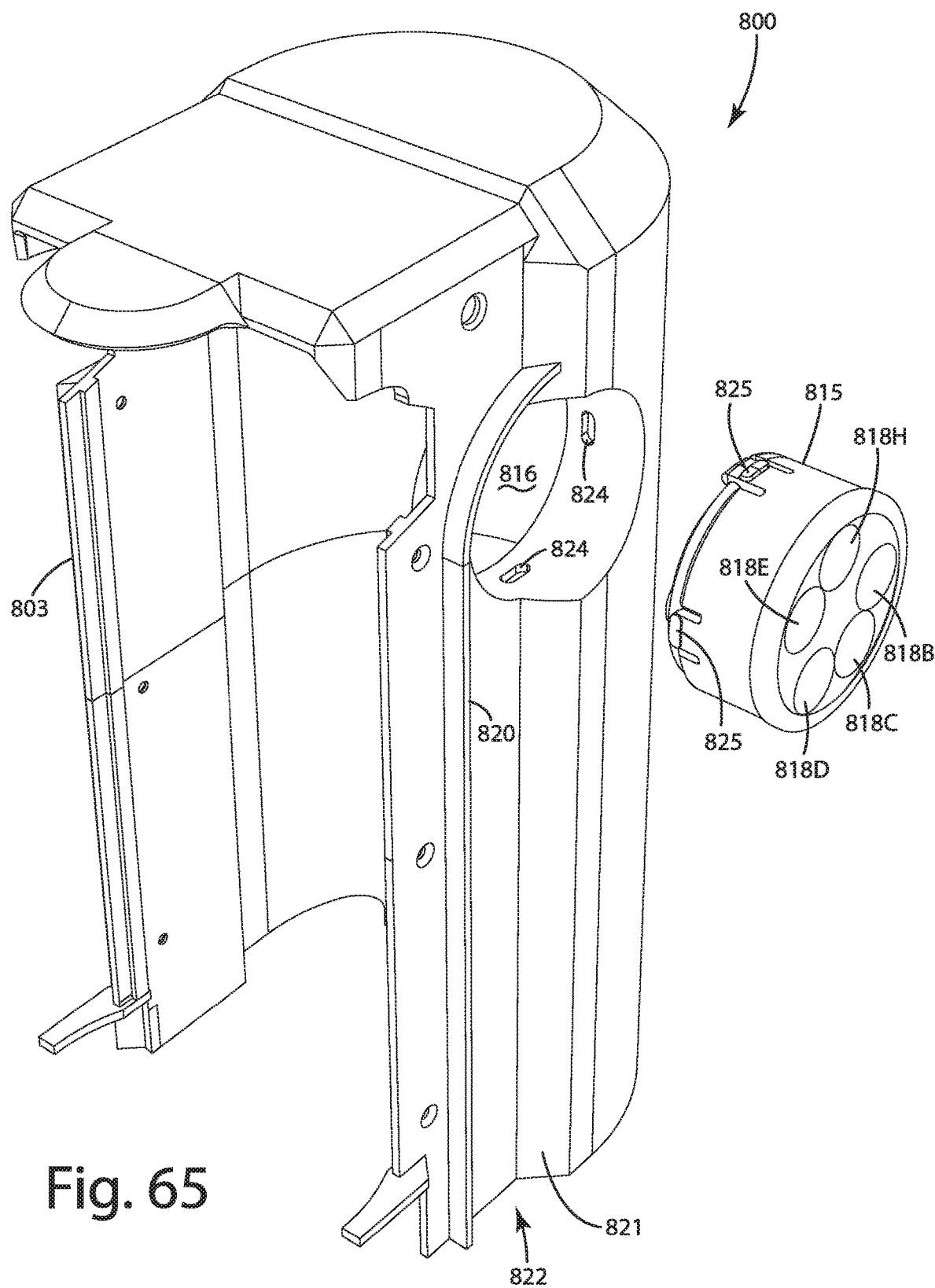
FIG. 65 shows a perspective view of a cover assembly and a display unit in accordance with one embodiment.
Figure 66:
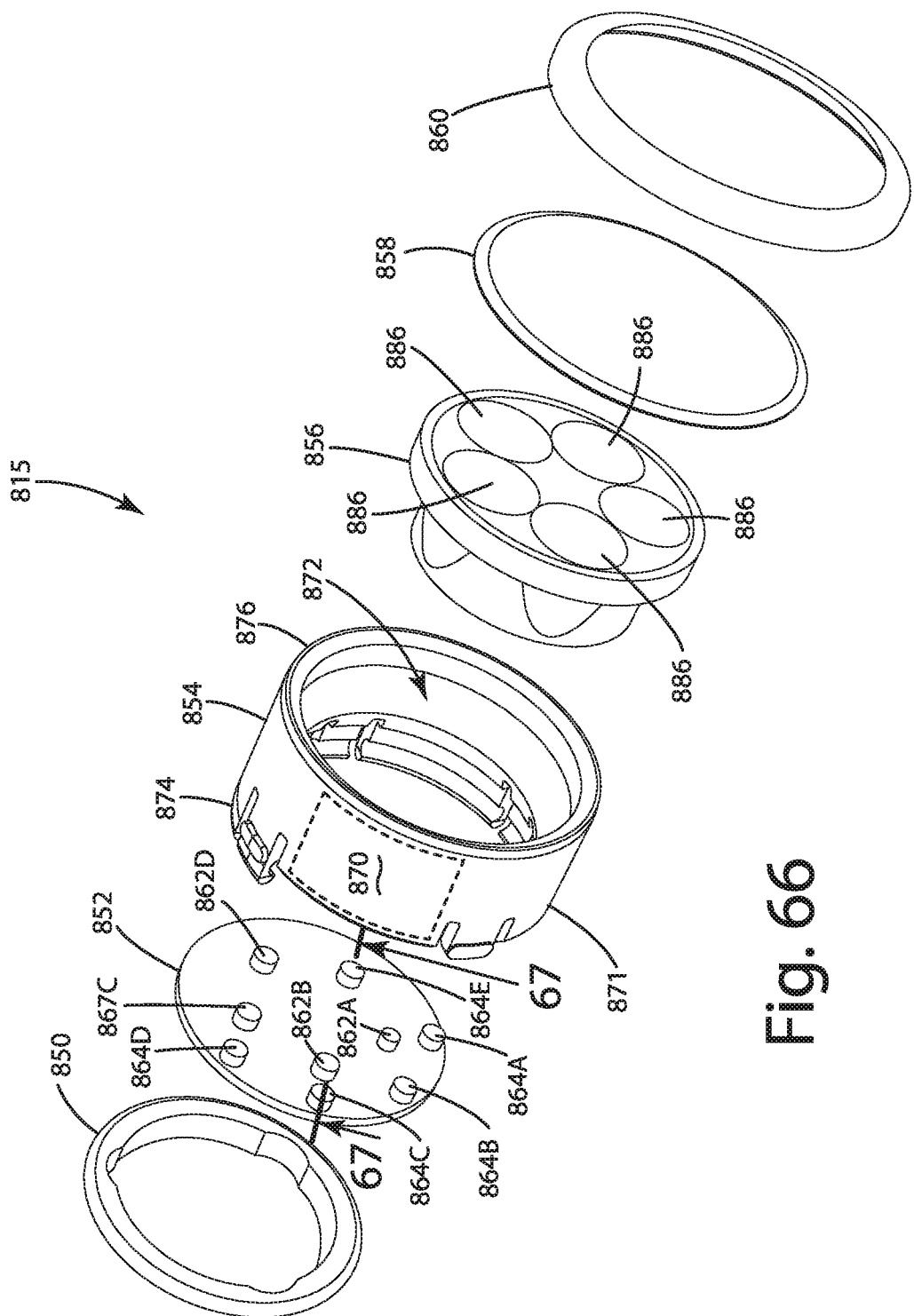
FIG. 66 depicts an exploded view of a display unit in accordance with one embodiment.
Figure 67:
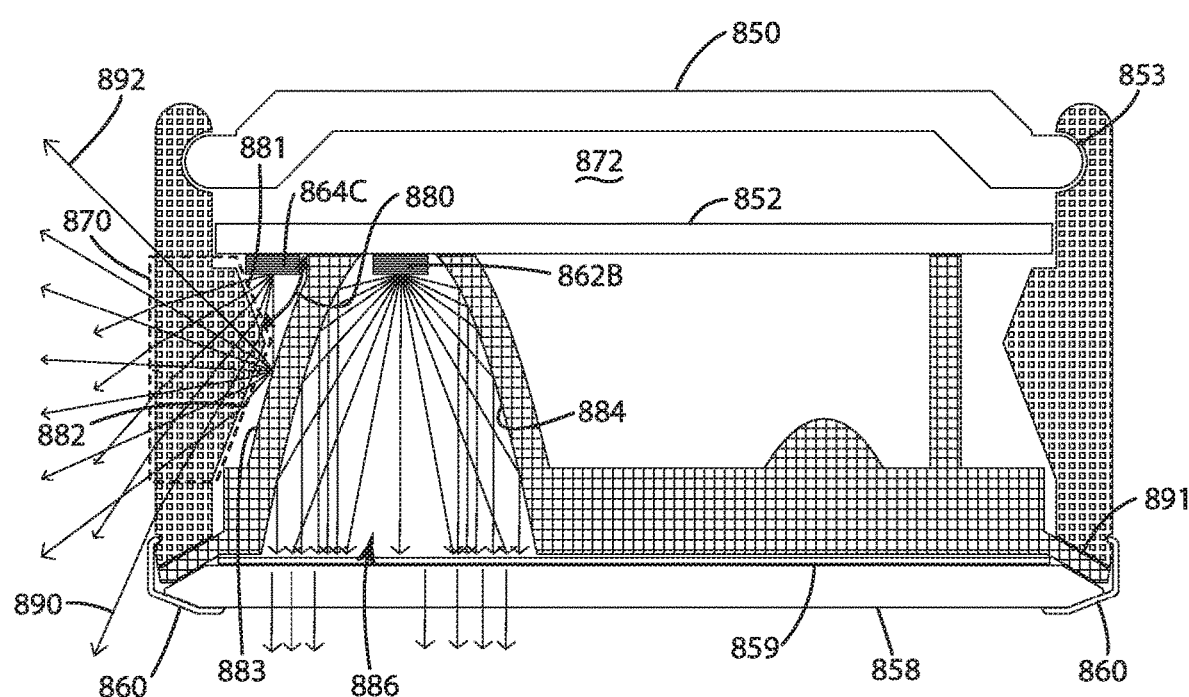
FIG. 67 shows a sectional view of the display unit of FIG. 66.

An alternative embodiment of the user interface assembly in accordance with one embodiment of the present disclosure is shown in FIGS. 65-67. The water treatment system 100 in accordance with one embodiment may include a cover 800, similar to the cover 700 but with several exceptions, including a differently shaped display unit 815. The cover 800 in the illustrated embodiment may include a display unit receiver 816 constructed to engage with and hold the display unit 815. The display unit receiver 816 may include one or more depressions or apertures 824 operable to receive one or more respective protrusions 825 with the one or more apertures 824, similar to the cover 700 and the display unit 715.

Figure 64:
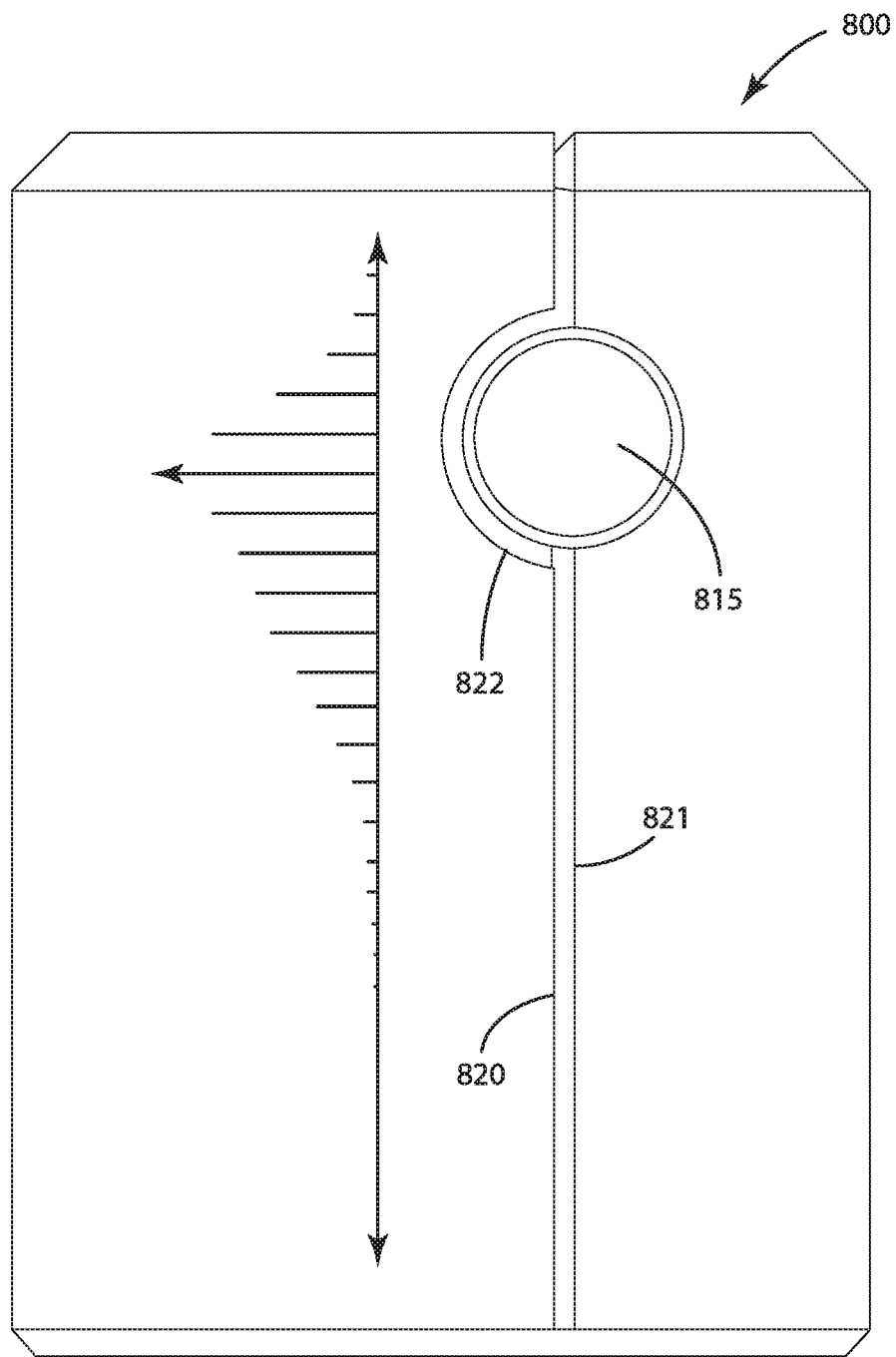
FIG. 64 shows a side view of a water treatment system in accordance with one embodiment.

The cover 800 may include a reflector 820 that, in conjunction with a cover surface 821, may define a channel 822 in which light may be provided from the display unit 815. The channel 822 in conjunction with output from the display unit 815 may provide one or more types of lighting effects that can convey information to the end-user from a distance. Example lighting effects include changes in color, blinking colors in accordance with a pattern, fade-in and fade-out with respect to changes in color or a change from ON to OFF or OFF to ON, or any combination thereof. Additionally, or alternatively, the construction of the channel 822 and the display unit 815, in one embodiment, may yield a lighting effect with greater light intensity in the channel 822 in proximity to the sidewall portion 870 of display unit 815 than areas of the channel 822 distal from the display unit 815. The chart 817 in the illustrated embodiment of FIG. 64 shows the distribution of light intensity along the channel in conjunction with one configuration of the cover 800 and display unit 815.

The display unit 815 in accordance with one embodiment of the present disclosure is shown in further detail in FIGS. 66-67. The display unit 815 is similar to the display unit 715 described herein, but with several exceptions. The display unit 815 in the illustrated embodiment in conjunction with the cover 800 and water treatment system 100 may provide a user interface assembly for operation of the water treatment system 100. The display unit may include one or more feedback indicators 818, similar to the feedback indicators 718 of the display unit 715, but arranged differently in a circular manner. The feedback indicators 818 may be configured to convey information (e.g., status information) about the water treatment system 100 to the end user. Additionally, or alternatively, the feedback indicators 818 may be constructed to accept user input, such as by capacitive touch sensing or other type of touch-based input, to enable the end user to control one or more operations of the water treatment system 100.

The display unit 815 includes one or more of the following components: a back cover 850, display unit circuitry 852, a housing 854, a director assembly 856, an optical cover 858, and trim assembly 860. These components may be similar in many respects to their respectively named components of the display unit 715, but modified in accordance with the differently shaped housing construction of the display unit 815 relative to the display unit 715. For instance, the director assembly 856 and the display unit circuitry 852 are constructed differently (e.g., in a circular arrangement) relative to the director assembly 756 and the display unit circuitry 752. Although the construction and packing of these components are different, the functionality of the director assembly 856 and the display unit circuitry 852, however, in providing light via the director assembly 856 or a sidewall portion 870 of the housing 854, or both, are similar to the counterpart components of the display unit 715.

The director assembly 856 in the illustrated embodiment may include one or more light directors 886 constructed to interface with one or more light sources provided by the display unit circuitry 852 and to direct light therefrom to the optical cover 858. The optical cover 858 may include an optical mask 859, similar to the optical mask 759.

In the illustrated embodiment, the housing 854 includes an internal space 872 defined by a sidewall 871 constructed to accept the director assembly 856 and the display unit circuitry 852. The housing 854 may include a rear opening 874, and where the back cover 850 may interface with the housing 854 to cover the rear opening 874 in an assembled state. For instance, the housing 854 may include a depression 853, which is annular about at least a portion of the inside perimeter of the sidewall 871, and which is configured to receive the back cover 850.

The display unit circuitry 852 may include power circuitry for supplying energy to a primary light source 862 and a secondary light source 864. The secondary light source 864 in the illustrated embodiment is disposed near a perimeter of a printed circuit board of the display unit circuitry 852, and the primary light source 862 may be disposed near a central area of the printed circuit board. In other words, the secondary light source 864 may be disposed closer to the perimeter edge of the printed circuit board than the primary light source 862. Similar to the display unit 715, there may be a plurality of primary and secondary light sources 862, 864.

Similar to the display unit 715, the secondary light sources 864 may be disposed on the display unit circuitry 852 near the sidewall portion 870. The primary light sources 862A-E are shown generally evenly distributed around the entire central area of the display unit circuitry 852, whereas the secondary light sources 864A-D are distributed around a portion of the central area that is provided in proximity to the sidewall portion 870.

The sidewall portion 870 of the housing 854, which is shown in phantom lines for purposes of disclosure, may at least be translucent, and optionally transparent, with respect to light generated from the secondary light source 864 of the display unit 815. Although shown as a portion of the sidewall 871 of housing 854, the sidewall portion 870 may include any part of the housing 854, including the entirety of the housing 854. The sidewall portion 870 illustrated embodiment may form a lens through which light from the secondary light source 864 may be directed. Similar to the sidewall portion 770 of the display unit 715, the sidewall portion 870 may include first and second lens surfaces 881, 882.

The director assembly 856 of the display unit 815 may be constructed such that the primary and secondary light sources 862, 864 may be aligned along an axis that intersects the central axis of the display unit 815. In this way, unlike the staggered arrangement of the primary and secondary light sources 762, 764 of the display unit 715, the secondary light source 864 may be configured to reflect light from the reflector 883 in an area of the director assembly 856 that is opposite the reflector surface 884 of the optical director 886. In other words, in one embodiment in which the reflector 883 is integral to the optical director 886, the reflector 883 may be provided on a surface of the optical director 886 that is directly opposite the reflector surface 884 that defines the internal cavity of the optical director 886.

Similar to the packaging configuration of the display unit 715, the display unit 815 may include receiving the director assembly 856 within the internal space 872 of the housing 854. A lip 891 of the director assembly 856 may engage the sidewall 871 of the housing 854 in proximity to the optical opening 876. The optical cover 858 may be positioned to contact a lip 891, and a trim assembly 860 may be engaged with the sidewall 871 about a perimeter of the optical cover 858. The trim assembly 860 may potentially hold the director assembly 856 and the optical cover 858 within the internal space 872 of the housing 854. The back cover 850 may interface with the housing 854 to all the display unit circuitry 852, including the printed circuit board, in position with respect to the director assembly 856.

The optical director 886 in the illustrated embodiment, as described herein, includes a reflector surface 884 that defines the internal cavity of the optical director 886. The reflector surface 884 may be similar to the reflector surface 784 and it may be shaped in a variety of ways depending on the application in order to direct light from the primary light source 862 toward the optical cover 858. For instance, the reflector surface 84 in the illustrated embodiment is a parabolic surface configured to direct light from the primary light source 862 toward the optical cover 858.

The first lens surface 881 in the illustrated embodiment of FIG. 67, similar to the first lens surface 781, is provided at an angle 880 that is acute relative to a plane defined by the printed circuit board of the display unit circuitry 852, and where the plane may be normal to an axis of the secondary light source 864 that defines its primary direction of light admission. However, it is to be understood that the angle 880 may vary from application to application, and is not limited to the angle depicted in the illustrated embodiments. The angle 880 with respect to the secondary light source 864 may be determined to facilitate direct transmission of light emitted from the secondary light source 864 through the sidewall portion 870. Such direct light emission is designated as 890 in the illustrated embodiment.

The second lens surface 882 of the sidewall portion 870 in the illustrated embodiment of FIG. 67 may be configured to receive light indirectly from the secondary light source 864C. Indirect reception of light may be achieved via reflection of light from the reflector 883, where the light is emitted from the secondary light source 864C. This indirect light admission is designated as 892 in the illustrated embodiment, and may provide infill light with respect to the direct light admission or primary light beam 890. The angle of the second lens surface 882 may vary from application to application depending on target parameters and design constraints. In the illustrated embodiment, the angle is determined primarily as a function of providing clearance for the director assembly 856 and space for light to reflect from the reflector 883 to the second lens surface 882. As described herein, the space between the reflector 883 and the secondary lens surface 82 may be filled with any type of substance, including air. Alternatively, the space may comprise a vacuum.

In the illustrated embodiment, the reflector 883 is shown as an integral component of the director assembly 856. It is to be understood that the reflector 883 may be separate from the director assembly 856.

Figure 69:
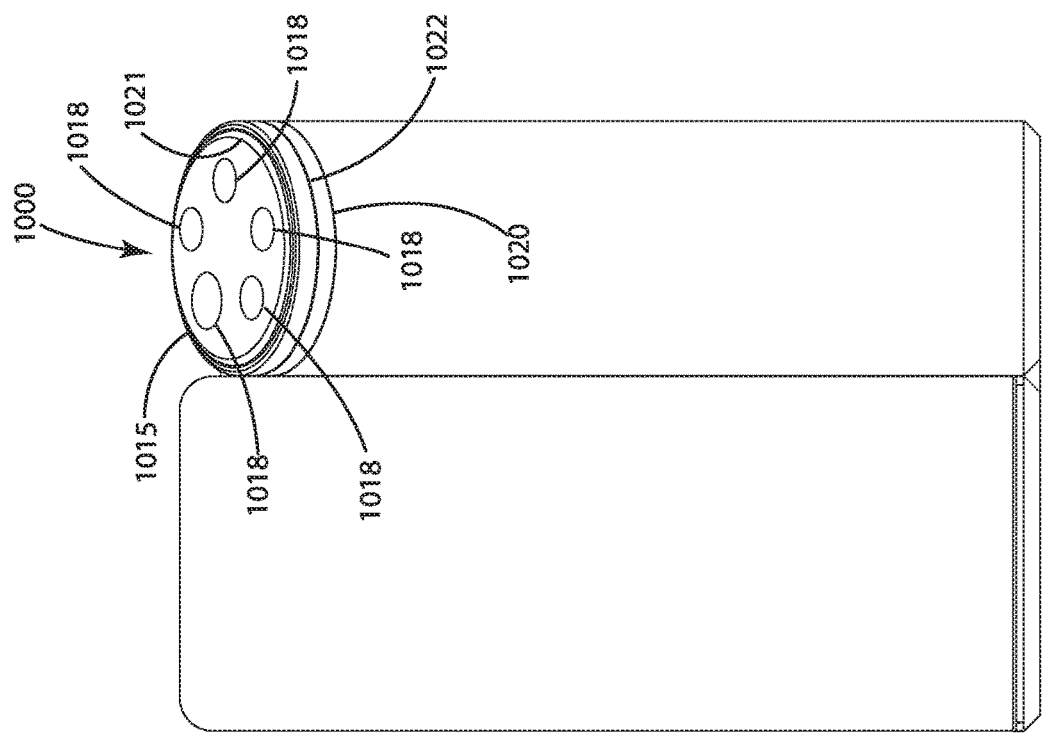
FIG. 69 shows a side view of a water treatment system in accordance with one embodiment.
Figure 68:
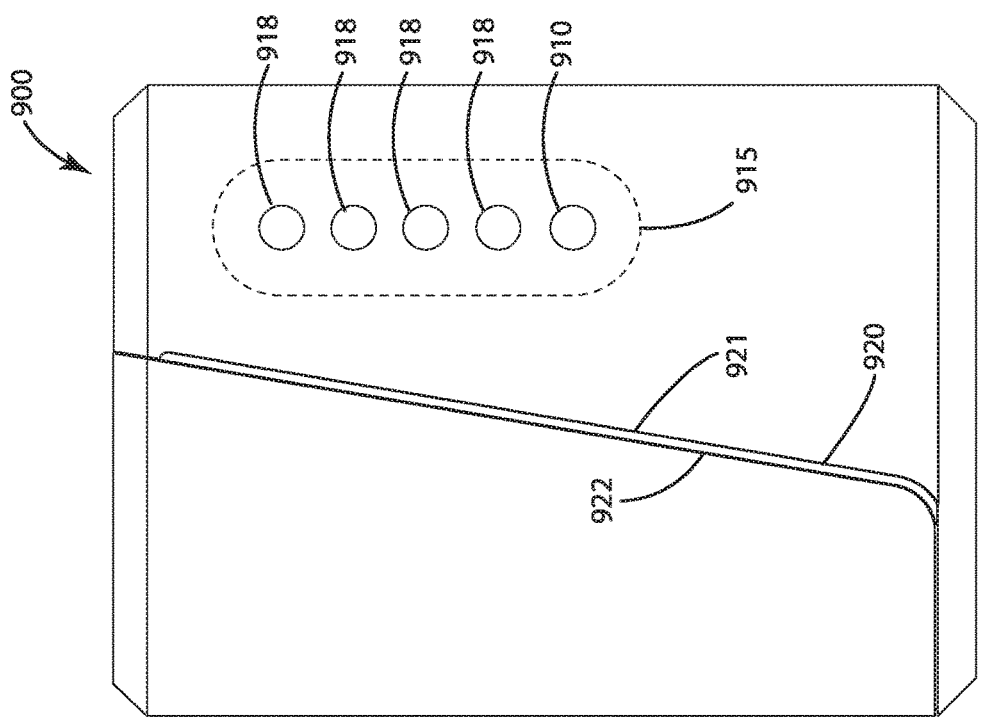
FIG. 68 shows a side view of a water treatment system in accordance with one embodiment.

Further alternative constructions of the user interface assembly are depicted in the illustrated embodiment of FIGS. 68-69 with cover assemblies designated respectively as 900, 1000. The cover assembly 900 includes a reflector 920, a cover surface 921 and a channel 922 defined therebetween. The user interface assembly includes a display unit 915 configured similar to the display unit 715, but with the exception of providing a type of dead front display for which the feedback indicators 918 and the optical cover 858 are integral with the cover assembly 900. The cover assembly 1000 includes a reflector 1020, a cover surface 1021, and a channel 1022 defined therebetween. The display unit 1015 may be similar to the display unit 815, but with the exception of providing a type of dead-front display similar to the display unit 915.

It should be understood that, although the channel 1022 and other channels described herein with respect to the display unit are shown to include an air gap, the channel may be filled with another type of substance, including a polymer-based substance that facilitates light transmission.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A display for a water treatment system, said display comprising:
   first and second light sources operable to generate light, said first and second light sources being separated by a light source distance;
   a graphic mask including a graphic element configured to allow passage of light;
   an optical element having first and second light receiving surfaces operable to receive light respectively from the first and second light sources, the first and second light receiving surfaces being opposed by an optical element surface of the optical element, wherein at least one of the first and second light sources being spaced from the optical element surface by an optical element distance;
   wherein the optical element includes a mask facing surface adjacent to the graphic mask and defined between a) at least one of the first and second surfaces and b) the optical element surface, wherein light received by the first and second light receiving surfaces reflects internally within the optical element with respect to the optical element surface and the mask facing surface; and
   wherein the light source distance is greater than the optical element distance.

2. The display of claim 1 wherein light generated by the first and second light sources and permitted to pass through the graphic element appears substantially uniform with respect to a perspective of an operator.

3. The display of claim 1 wherein the light source distance is N times the optical element distance, wherein N is greater than 1.

4. The display of claim 3 wherein N is approximately 2.

5. The display of claim 1 wherein the graphic element of the graphic mask corresponds to an opening in the graphic mask.

6. The display of claim 1 wherein the graphic element of the graphic mask corresponds to a light transmissive portion of the graphic mask.

7. The display of claim 1 wherein the graphic element corresponds to a strip extending parallel to the optical element surface.

8. The display of claim 1 wherein the first and second light receiving surfaces are curved to substantially prevent redirection of light output respectively from the first and second light sources.

9. The display of claim 1 wherein the optical element surface is configured to reflect light in a scattering manner within the optical element.

10. The display of claim 1 wherein light escapes the optical element in response to encountering the mask facing surface at an escape angle of greater than 45° with respect to an area corresponding to the graphic element.

11. A water treatment system comprising:
    a treatment assembly having a filter assembly that is capable of removing particulates from water;
    a base assembly operable to discharge treated water to a point-of-use, the base assembly including a frame configured to support the treatment assembly;
    the base assembly including a UV reactor configured to disinfect water by applying UV energy to water flowing through the UV reactor for disinfection, the UV reactor being fixedly coupled to the frame of the base assembly; and
    a display operable to convey information pertaining to operation of the water treatment system, the display comprising:
      first and second light sources operable to generate light, said first and second light sources being separated by a light source distance;
      a graphic mask including a graphic element configured to allow passage of light;
      an optical element having first and second light receiving surfaces operable to receive light respectively from the first and second light sources, the first and second light receiving surfaces being opposed by an optical element surface of the optical element, at least one of the first and second light sources being spaced from the optical element surface by an optical element distance;
      wherein the optical element includes a mask facing surface adjacent to the graphic mask and defined between a) at least one of the first and second surfaces and b) the optical element surface, wherein light received by the first and second light receiving surfaces reflects internally within the optical element with respect to the optical element surface and the mask facing surface; and
      wherein the light source distance is greater than the optical element distance.

12. The water treatment system of claim 11 wherein the filter assembly includes a replaceable filter medium, and wherein the base assembly is operable to removably couple to the treatment assembly.

13. The water treatment system of claim 11 wherein light generated by the first and second light sources and permitted to pass through the graphic element appears substantially uniform with respect to a perspective of an operator.

14. The water treatment system of claim 11 wherein the light source distance is N times the optical element distance, wherein N is greater than 1.

15. The water treatment system of claim 14 wherein N is approximately 2.

16. The water treatment system of claim 11 wherein the graphic element of the graphic mask corresponds to an opening in the graphic mask.

17. The water treatment system of claim 11 wherein the graphic element of the graphic mask corresponds to a light transmissive portion of the graphic mask.

18. The water treatment system of claim 11 wherein the graphic element corresponds to a strip extending parallel to the optical element surface.

* * * * *